(12) United States Patent
Grybush

(10) Patent No.: US 7,328,678 B2
(45) Date of Patent: Feb. 12, 2008

(54) MECHANICAL COMPRESSION AND VACUUM RELEASE MECHANISM

(75) Inventor: Anthony F. Grybush, Kiel, WI (US)

(73) Assignee: Tecumseh Power Company

( * ) Notice: Subject to any disclaimer, the term of this patent is extended or adjusted under 35 U.S.C. 154(b) by 0 days.

(21) Appl. No.: 11/462,776

(22) Filed: Aug. 7, 2006

(65) Prior Publication Data

US 2007/0074694 A1 Apr. 5, 2007

Related U.S. Application Data

(63) Continuation-in-part of application No. 11/346,907, filed on Feb. 3, 2006, now Pat. No. 7,174,871.

(60) Provisional application No. 60/688,023, filed on Jun. 7, 2005.

(51) Int. Cl.
*F02N 17/00* (2006.01)
*F01L 13/08* (2006.01)

(52) U.S. Cl. .................................. 123/182.1
(58) Field of Classification Search .............. 123/182.1
See application file for complete search history.

(56) References Cited

U.S. PATENT DOCUMENTS

| | | | |
|---|---|---|---|
| 3,314,408 A | 4/1967 | Fenton | |
| 3,362,390 A * | 1/1968 | Esty | 123/182.1 |
| 3,381,676 A | 5/1968 | Campen | |
| 3,496,922 A | 2/1970 | Campen | |
| 3,511,219 A | 5/1970 | Esty | |
| 3,620,203 A | 11/1971 | Harkness | |
| 3,897,768 A | 8/1975 | Thiel | |
| 3,901,199 A | 8/1975 | Smith | |
| 3,981,289 A | 9/1976 | Harkness | |
| 4,453,507 A | 6/1984 | Braun et al. | |
| 4,590,905 A | 5/1986 | Matsuki et al. | |
| 4,610,227 A | 9/1986 | Nakano et al. | |
| 4,615,313 A | 10/1986 | Tsumiyama | |
| 4,651,687 A | 3/1987 | Yamashita et al. | |
| 4,892,068 A | 1/1990 | Coughlin | |
| 4,898,133 A | 2/1990 | Bader | |
| 4,977,868 A | 12/1990 | Holschuh | |
| 5,065,720 A | 11/1991 | Nishiyama et al. | |

(Continued)

*Primary Examiner*—Stephen K. Cronin
*Assistant Examiner*—Arnold Castro
(74) *Attorney, Agent, or Firm*—Baker & Daniels LLP

(57) ABSTRACT

Mechanical compression and vacuum release mechanisms for internal combustion engines. The compression and vacuum release mechanism may include a pair of centrifugally responsive flyweights pivotally mounted to the cam gear. One of the flyweights actuates a vacuum release member having a vacuum release cam and the other of the flyweights actuates a compression release member having a compression release cam. In another embodiment, the compression and vacuum release mechanism includes a single flyweight having structure associated therewith to actuate a vacuum release member and a compression release member having respective vacuum and compression release cams. The compression and vacuum release cams are in lifting engagement with the valve actuation structure of one of the intake or exhaust valves of the engine during engine starting to relieve compression and vacuum within the combustion chamber and thereby facilitate easier engine starting. After the engine is started and reaches running speed, centrifugal force causes the compression and vacuum release cams to move out of engagement with the valve actuation structure of the intake or exhaust valve to allow the engine to operate normally.

21 Claims, 45 Drawing Sheets

U.S. PATENT DOCUMENTS

| | | |
|---|---|---|
| 5,085,184 A | 2/1992 | Yamada et al. |
| 5,150,674 A | 9/1992 | Gracyalny |
| 5,184,586 A | 2/1993 | Buchholz |
| 5,197,422 A | 3/1993 | Oleksy et al. |
| 5,317,999 A | 6/1994 | Kern et al. |
| 5,711,264 A | 1/1998 | Jezek et al. |
| 5,809,958 A | 9/1998 | Gracyalny |
| 5,943,952 A | 8/1999 | Monti |
| 5,943,992 A | 8/1999 | Kojima et al. |
| 6,223,708 B1 | 5/2001 | Kampichler et al. |
| 6,343,582 B1 | 2/2002 | Peng |
| 6,394,054 B1 | 5/2002 | Rado et al. |
| 6,494,175 B2 | 12/2002 | Gracyalny |
| 6,536,393 B2 | 3/2003 | Novak et al. |
| 6,539,906 B2 | 4/2003 | Rado et al. |
| 6,672,269 B1 | 1/2004 | Bonde et al. |
| 6,782,861 B2 | 8/2004 | Gracyalny et al. |
| 7,137,375 B2 * | 11/2006 | Maeda et al. ............ 123/182.1 |
| 7,174,871 B2 * | 2/2007 | Grybush .................. 123/182.1 |
| 2002/0139339 A1 * | 10/2002 | Rado et al. .............. 123/182.1 |
| 2003/0024495 A1 | 2/2003 | Gracyalny et al. |
| 2004/0112321 A1 | 6/2004 | Gracyalny et al. |

* cited by examiner

FIG_1

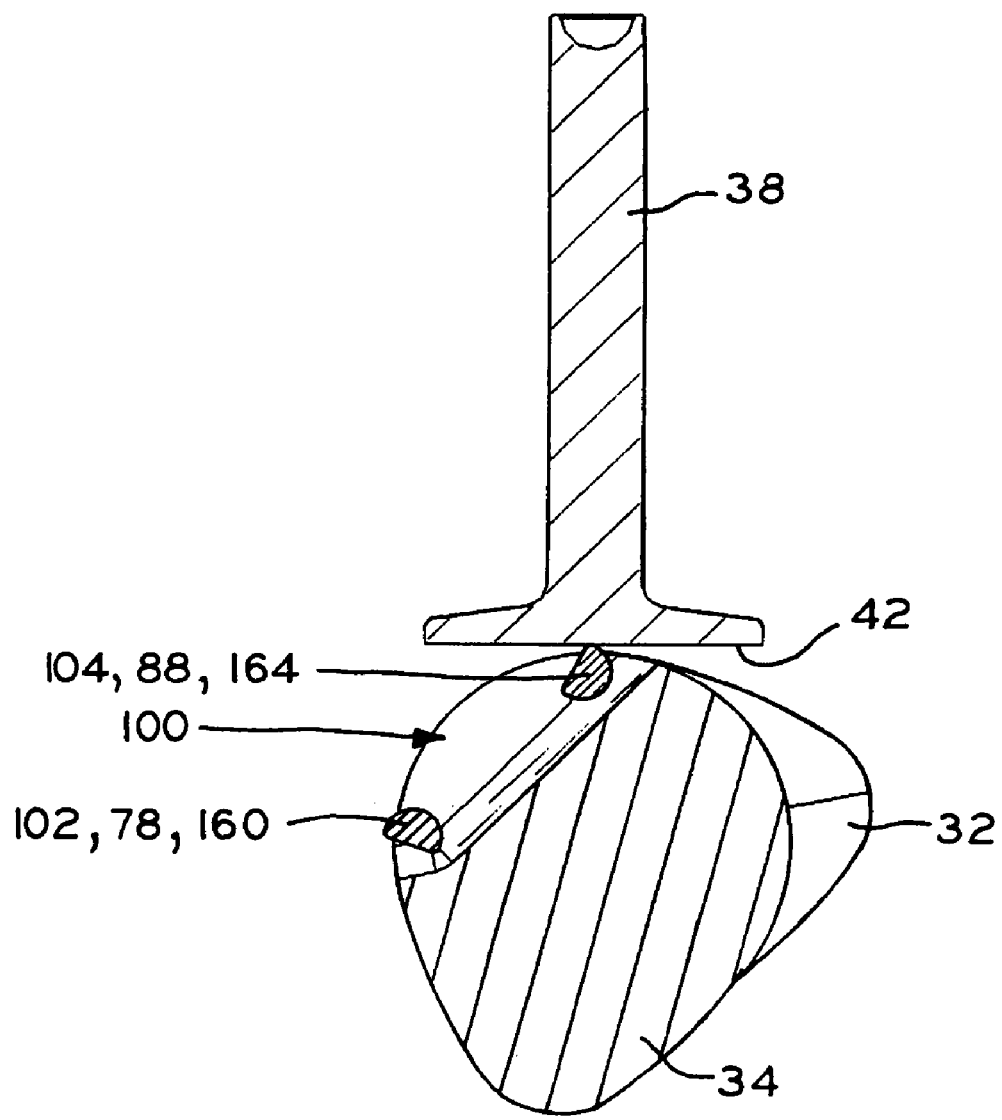
FIG_6A

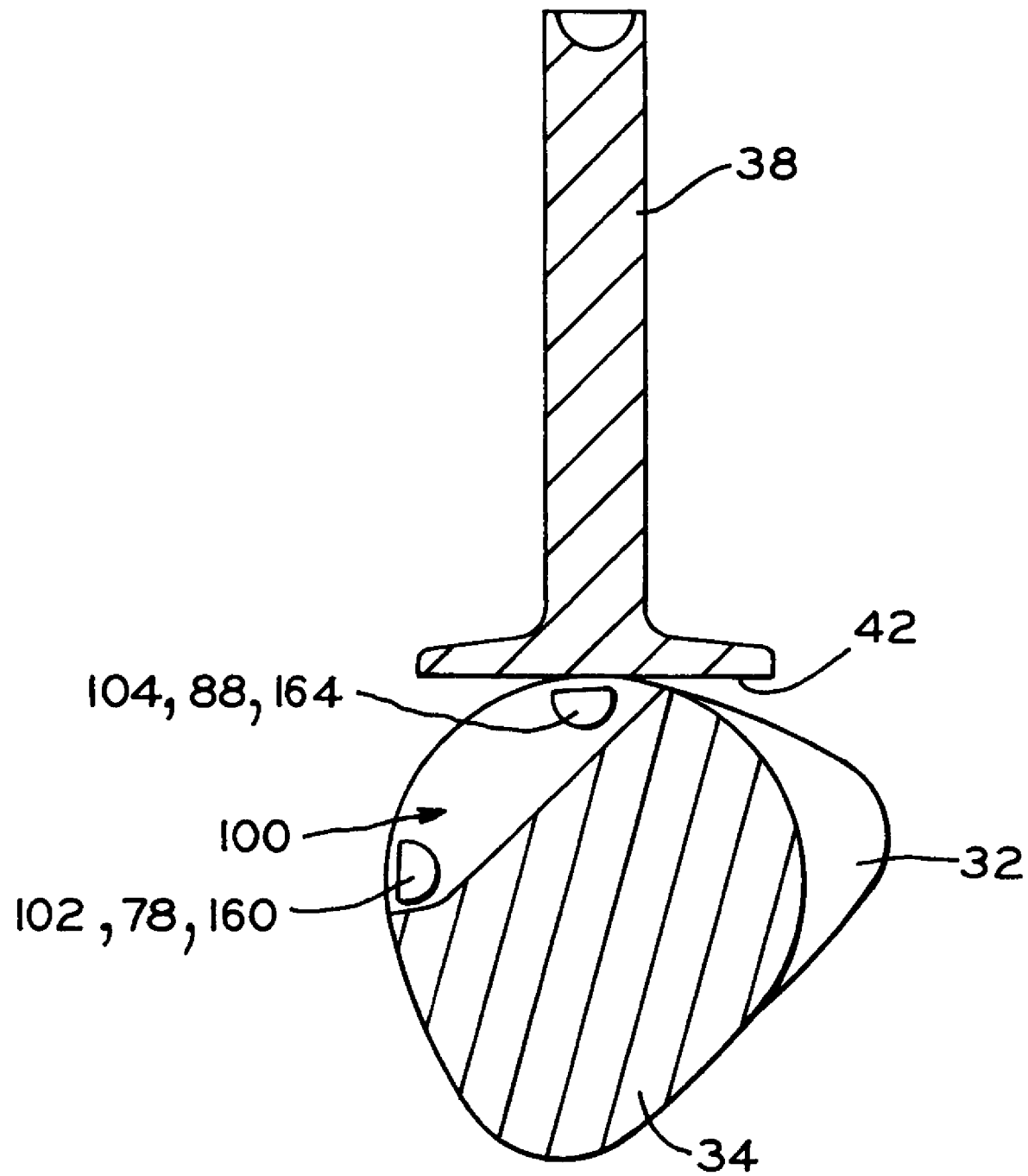
FIG_6B

FIG_8

FIG_11

FIG_15

FIG_16

FIG_17

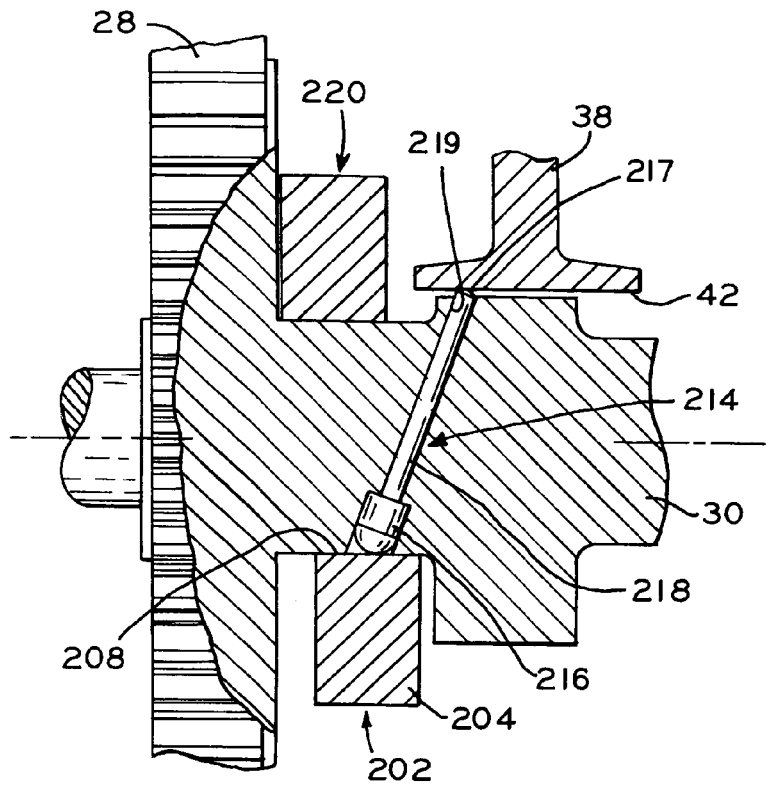
FIG_21
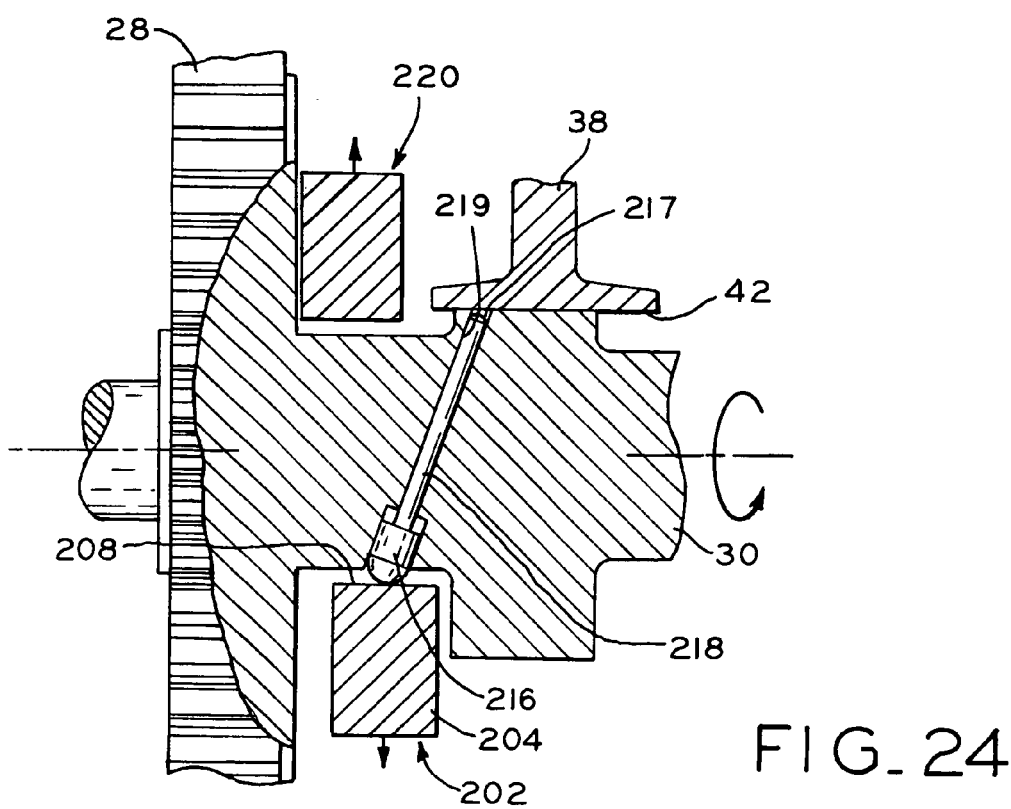
FIG_24

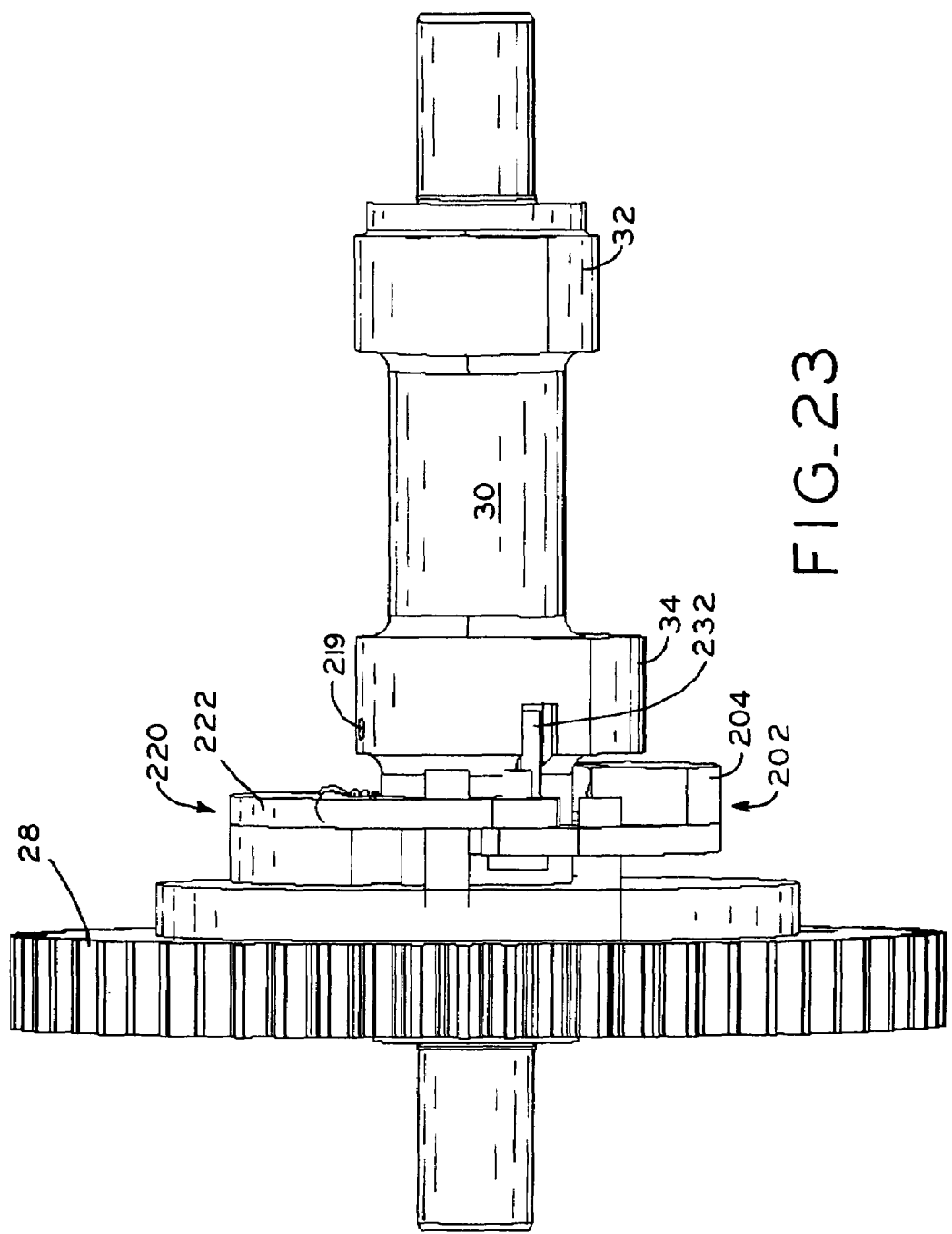

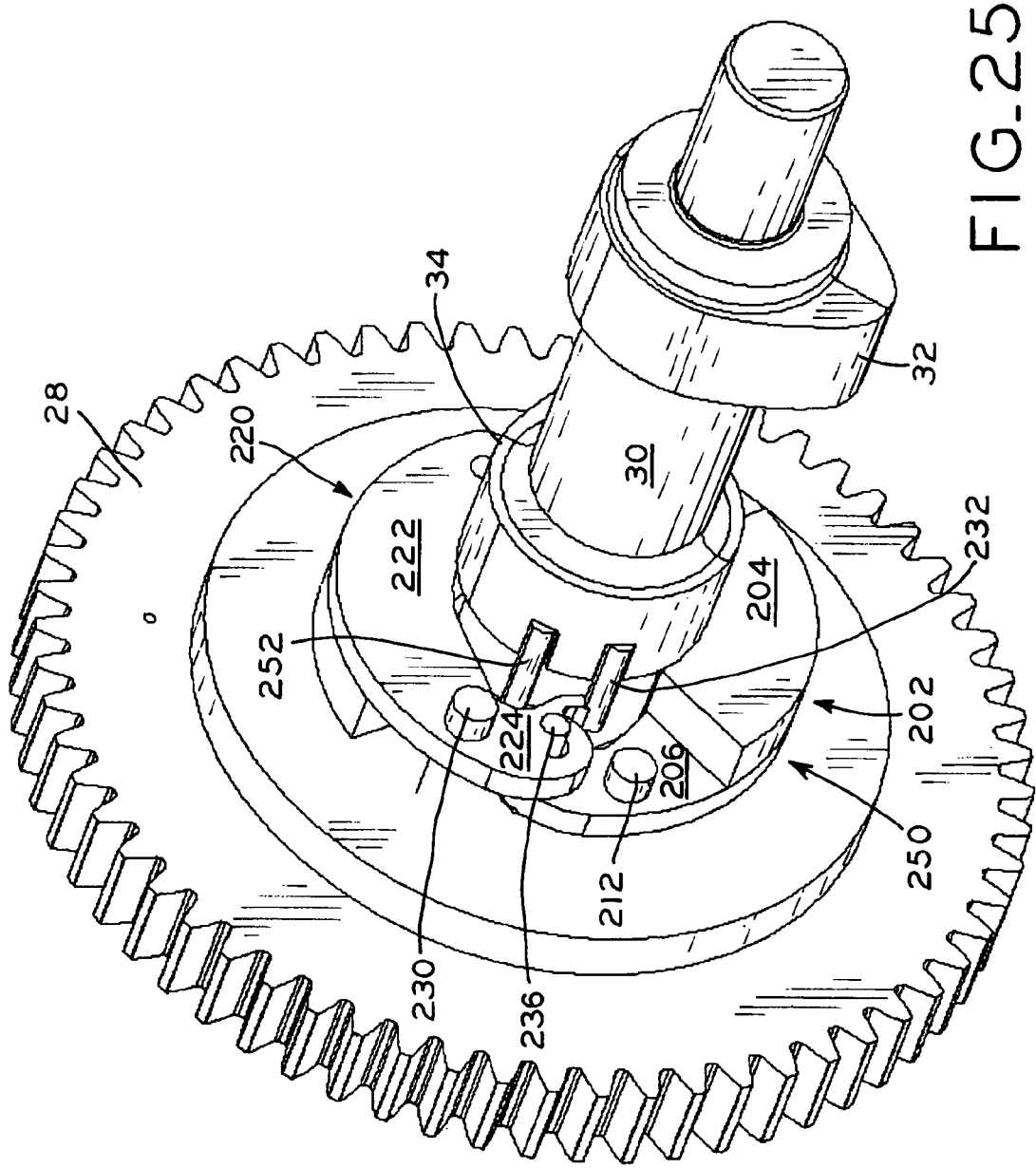

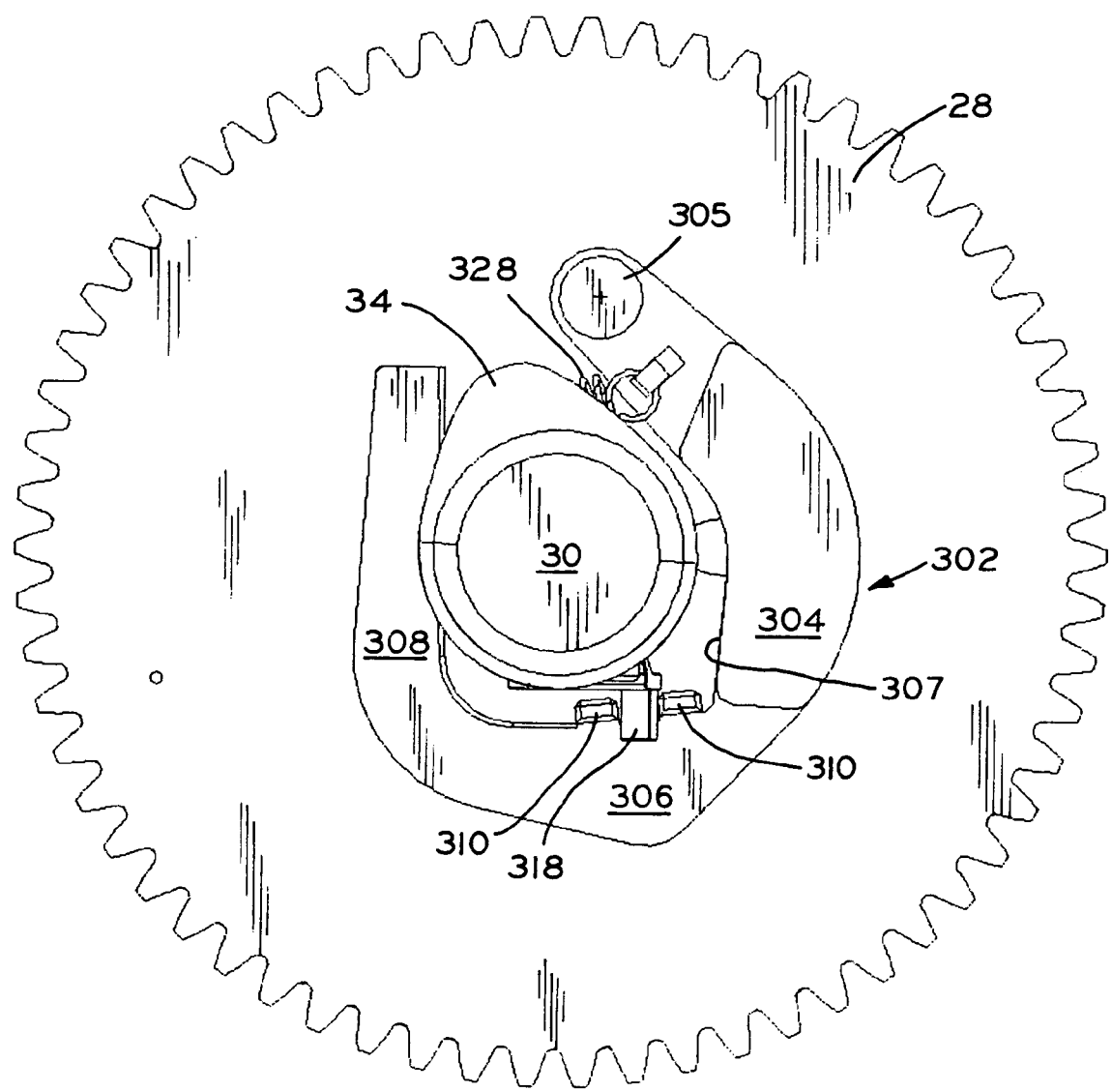
FIG_31

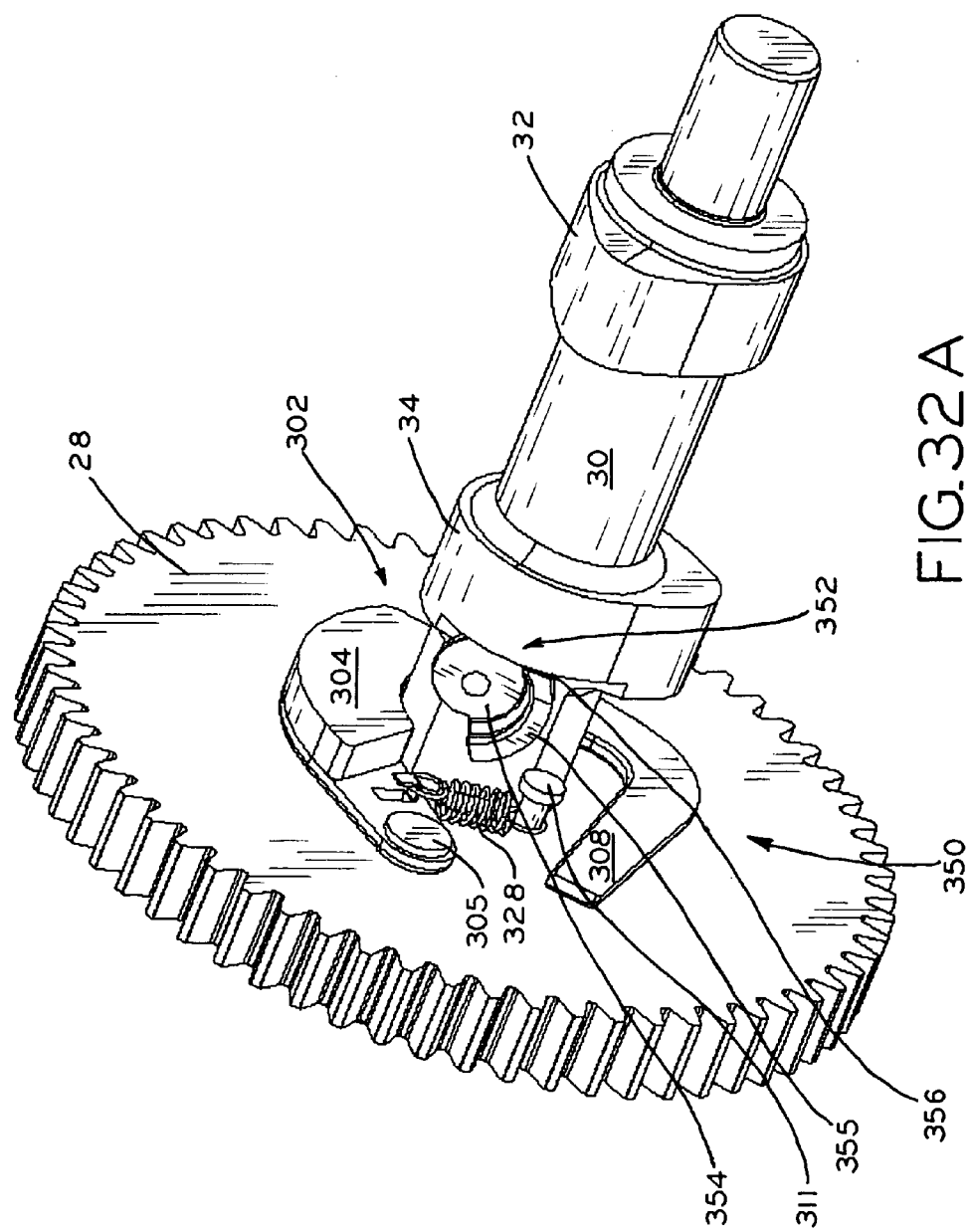

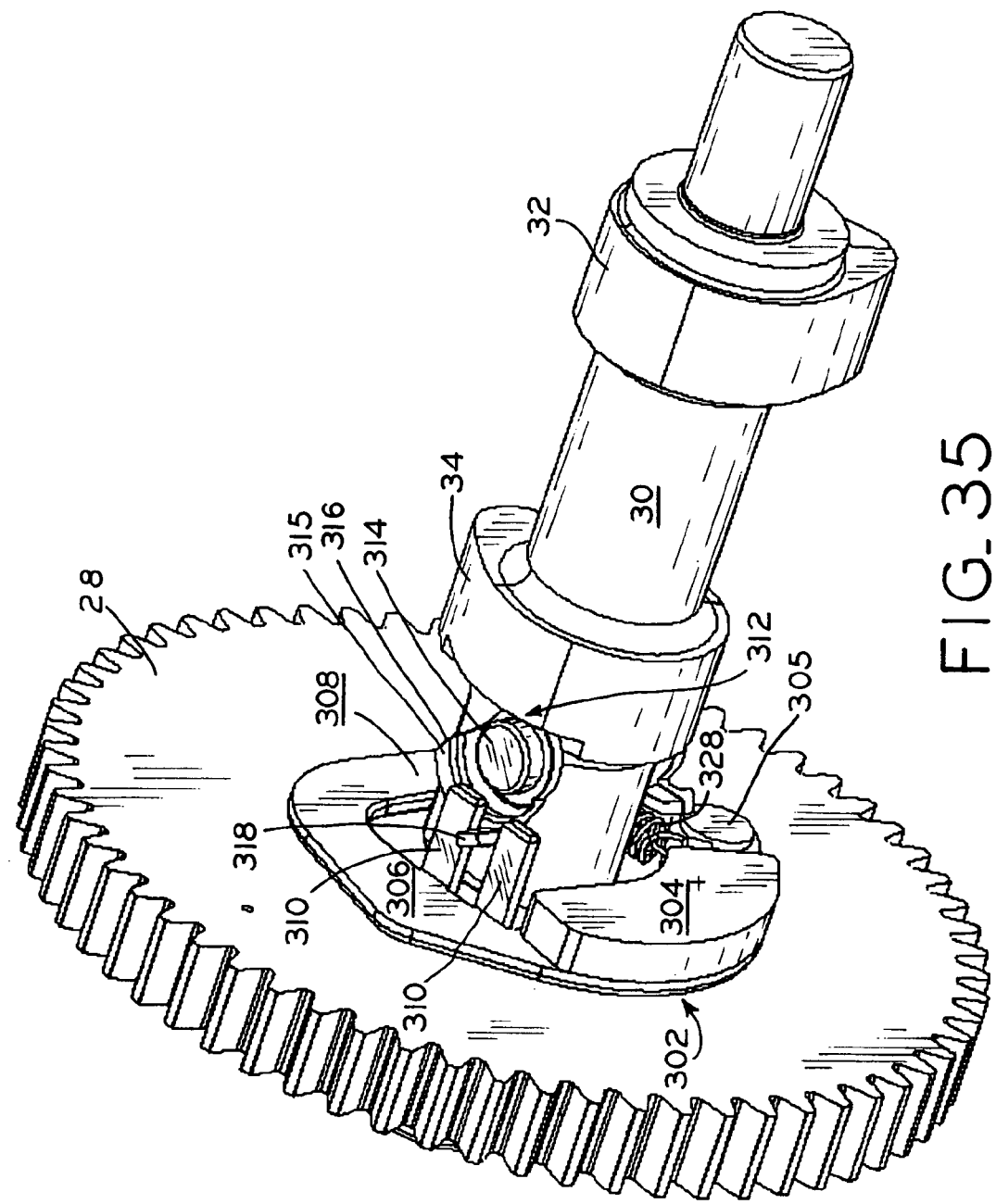

FIG_40

MECHANICAL COMPRESSION AND VACUUM RELEASE MECHANISM

CROSS-REFERENCE TO RELATED APPLICATIONS

This application is a Continuation-In-Part of U.S. patent application Ser. No. 11/346,907, entitled MECHANICAL COMPRESSION AND VACUUM RELEASE MECHANISM, filed on Feb. 3, 2006, now U.S. Pat. No. 7,174,871 which claims the benefit under Title 35, U.S.C. §119(e) of U.S. Provisional Application Ser. No. 60/688,023, entitled MECHANICAL COMPRESSION AND VACUUM RELEASE, filed on Jun. 7, 2005, the disclosures of which are expressly incorporated by reference herein.

BACKGROUND

1. Field of the Invention

The present invention relates to internal combustion engines of the type used with lawnmowers, lawn and garden tractors, snow throwers, generators, other small utility implements, and sport vehicles, and more particularly, relates to a compression and vacuum release mechanism for small four-stroke cycle engines.

2. Description of the Related Art

Compression release mechanisms for four-stroke cycle engines are well known in the art. Generally, means are provided to hold one of the intake and exhaust valves in the combustion chamber of the cylinder head slightly open during the compression stroke of the piston while cranking the engine during starting. This action partially relieves the force of compression in the cylinder during starting, so that starting torque requirements of the engine are greatly reduced. When the engine starts and reaches running speeds, the compression release mechanism is rendered inoperable so that the four-stroke cycle of the engine may function normally and the engine may achieve full performance. It is typical for the compression release mechanism to be associated with the exhaust valve so that the normal flow of the fuel/air mixture into the chamber through the intake valve, and the elimination of spent gases through the exhaust valve is not interrupted, and the normal direction of flow through the chamber is not reversed. Examples of compression release mechanisms for four-stroke engines are shown in U.S. Pat. Nos. 3,381,676; 3,496,922; 3,897,768; 4,453,507; 4,977,868; 5,150,674 and 5,184,586. Although known compression release mechanisms are generally effective for relieving compression in the cylinder during cranking the engine, these mechanisms are typically designed to provide compression relief and do not remedy the significant torque established by vacuum in the combustion chamber during the power stroke.

Conventional four-stroke engines may require a significant amount of torque to turn the engine over during the power stroke when combustion is not taking place, because the piston is moving downwardly against a pressure difference due to increasing suction or vacuum in the combustion chamber resulting from the partial discharge of gas from the combustion chamber during the immediately preceding compression stroke. The increase of torque required corresponds to a substantial operator or starter force required to drive the piston downwardly against such pressure difference.

Accordingly, it is desired to provide a release mechanism that addresses the significant torque developed by both the compression and power strokes, is effective in operation, and is relatively simple in construction.

SUMMARY

The present invention provides mechanical compression and vacuum release mechanisms which are of simple construction and which significantly reduce the effort required to start an internal combustion engine. In one embodiment, the compression and vacuum release mechanism includes a pair of centrifugally responsive flyweights pivotally mounted to the cam gear. One of the flyweights actuates a vacuum release member having a vacuum release cam and the other of the flyweights actuates a compression release member having a compression release cam. In another embodiment, the compression and vacuum release mechanism includes a single flyweight having structure associated therewith to actuate a vacuum release member and a compression release member having respective vacuum and compression release cams. In all embodiments, the compression and vacuum release cams are in lifting engagement with the valve actuation structure of one of the intake or exhaust valves of the engine during engine starting to relieve compression and vacuum within the combustion chamber and thereby facilitate easier engine starting. After the engine is started and reaches running speed, the flyweight(s) pivots responsive to centrifugal force and in turn move the compression and vacuum release cams out of engagement with the valve actuation structure of the intake or exhaust valve to allow the engine to operate normally.

In one form thereof, the present invention provides an internal combustion engine including an engine housing; a crankshaft rotatably supported within the engine housing; a piston coupled to the crankshaft for reciprocation within a cylinder bore between top dead center and bottom dead center positions; a combustion chamber defined between the piston and the engine housing, the combustion chamber having a relatively smaller volume when the piston is in the top dead center position and a relatively larger volume when the piston is in the bottom dead center position; a camshaft driven from the crankshaft, the camshaft including a pair of cam lobes periodically engaging valve actuation structure associated with a pair of intake and exhaust valves; and a compression and vacuum release mechanism, including a pair of movable flyweights; a compression release member and a vacuum release member respectively coupled to the flyweights, the compression release member including a compression release cam and the vacuum release member including a vacuum release cam; and the flyweights movable responsive to centrifugal forces between a first position corresponding to engine cranking speeds in which the compression and vacuum release cams are each positioned for operative engagement with the valve actuation structure and a second position corresponding to engine running speeds in which the compression and vacuum release cams are each positioned out of operative engagement with the valve actuation structure, and wherein in the first position, the compression release cam engages the valve actuation structure as the piston moves toward the top dead center position and the vacuum release cam engages the valve actuation structure as the piston moves toward the bottom dead center position.

In another form thereof, the present invention provides an internal combustion engine including an engine housing; a crankshaft rotatably supported within the engine housing; a piston coupled to the crankshaft for reciprocation within a cylinder bore between top dead center and bottom dead center positions; a combustion chamber defined between the piston and the engine housing, the combustion chamber having a relatively smaller volume when the piston is in the top dead center position and a relatively larger volume when the piston is in the bottom dead center position; a camshaft driven from the crankshaft, the camshaft including a pair of cam lobes periodically engaging valve actuation structure associated with a pair of intake and exhaust valves; and a compression and vacuum release mechanism including a flyweight movably mounted to the camshaft; a shaft extending at an angle with respect to the camshaft and coupled with the flyweight; and a compression release member and a vacuum release member respectively coupled to the flyweight, at least one of the compression and vacuum release members rotatable with the shaft, the compression release member including a compression release cam and the vacuum release member including a vacuum release cam; the flyweight movable responsive to centrifugal forces between a first position corresponding to engine cranking speeds in which the compression and vacuum release cams are each positioned for operative engagement with the valve actuation structure and a second position corresponding to engine running speeds in which the compression and vacuum release cams are each positioned out of operative engagement with the valve actuation structure, and wherein in the first position, the compression release cam engages the valve actuation structure as the piston moves toward the top dead center position and the vacuum release cam engages the valve actuation structure as the piston moves toward the bottom dead center position.

In yet another form thereof, the present invention provides an internal combustion engine including an engine housing; a crankshaft rotatably supported within the engine housing; a piston coupled to the crankshaft for reciprocation within a cylinder bore between top dead center and bottom dead center positions; a combustion chamber defined between the piston and the engine housing, the combustion chamber having a relatively smaller volume when the piston is in the top dead center position and a relatively larger volume when the piston is in the bottom dead center position; a camshaft driven from the crankshaft, the camshaft including a pair of cam lobes periodically engaging valve actuation structure associated with a pair of intake and exhaust valves; and a compression and vacuum release mechanism including a flyweight movably mounted to the camshaft; and a compression release member and a vacuum release member respectively coupled to the flyweight, the compression release member comprising a pin extending at an angle with respect to the camshaft and abuttingly coupled with the flyweight, the vacuum release member comprising a pin extending at an angle with respect to the camshaft and abuttingly coupled with the flyweight, the compression release member including a compression release cam and the vacuum release member including a vacuum release cam; the flyweight movable responsive to centrifugal forces between a first position corresponding to engine cranking speeds in which the compression and vacuum release cams are each positioned for operative engagement with the valve actuation structure and a second position corresponding to engine running speeds in which the compression and vacuum release cams are each positioned out of operative engagement with the valve actuation structure, and wherein in the first position, the compression release cam engages the valve actuation structure as the piston moves toward the top dead center position and the vacuum release cam engages the valve actuation structure as the piston moves toward the bottom dead center position.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 6A is a sectional view taken along line 6A-6A of FIG. 5, illustrating the components of the mechanical compression and vacuum release mechanism in the first or start position;

FIG. 6B is a sectional view taken along line 6B-6B of FIG. 8, illustrating the components of the mechanical compression and vacuum release mechanism in the second or run position;

FIG. 21 is a sectional view of a portion of FIG. 20, illustrating the components of the mechanical compression and vacuum release mechanism in the first or start position;

FIG. 23 is an elevational view of the camshaft and cam gear of FIG. 18, showing the components of the mechanical compression and vacuum release mechanism of the fifth embodiment in the second or run position;

FIG. 24 is a sectional view of a portion of FIG. 23, illustrating the components of the mechanical compression and vacuum release mechanism in the second or run position;

FIG. 25 is a perspective view of the camshaft and cam gear assembly of the engine of FIG. 1, showing components of a mechanical compression and vacuum release mechanism according to a sixth embodiment;

FIG. 31 is an inboard end view of the cam gear of FIG. 30A, showing the components of the mechanical compression and vacuum release mechanism of the seventh embodiment in the second or run position;

FIG. 32A is a perspective view of the camshaft and cam gear assembly of the engine of FIG. 1, showing components of a mechanical compression and vacuum release mechanism according to an eighth embodiment in a first or start position;

FIG. 35 is a perspective view of the camshaft and cam gear assembly of the engine of FIG. 1, showing the components of the mechanical compression and vacuum release mechanism according to the eighth embodiment in a second or run position;

Corresponding reference characters indicate corresponding parts throughout the several views. The exemplifications set out herein illustrate several exemplary embodiments, and such exemplifications are not to be construed as limiting the scope of the invention in any manner.

DETAILED DESCRIPTION

Figure 1:
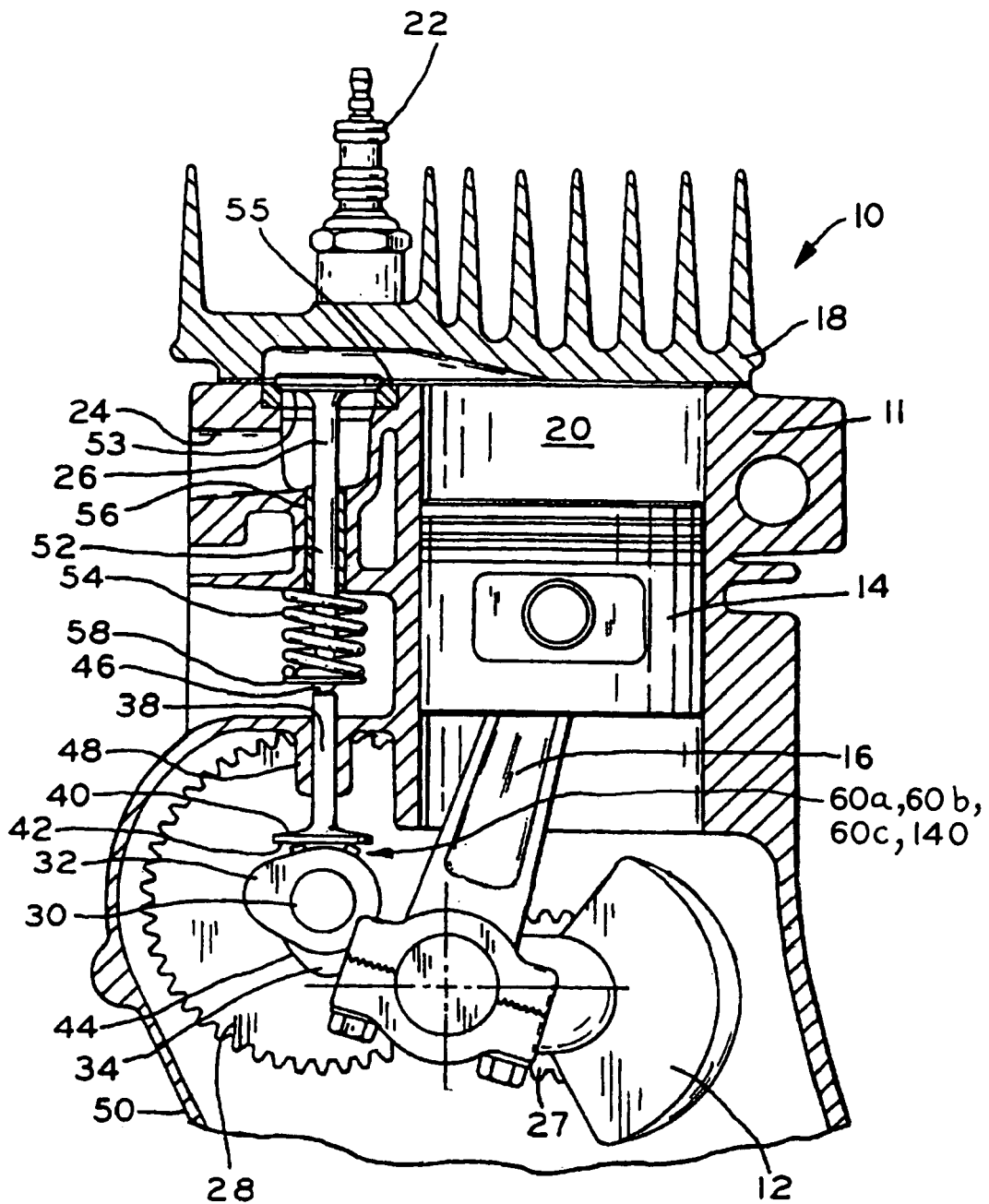
FIG. 1 is a partial sectional view of an exemplary single cylinder, four-stroke internal combustion engine including a mechanical compression and vacuum release mechanism in accordance with a first embodiment.

Referring to FIG. 1, there is shown a vertical crankshaft, single cylinder, four-stroke internal combustion engine 10 including a compression and vacuum release mechanism according to one embodiment of the present invention. Other compression and vacuum release mechanisms are disclosed in U.S. Pat. Nos. 6,394,094, 6,536,393 and 6,539,906, each assigned to the assignee of the present invention, the disclosures of which are expressly incorporated herein by reference.

As is customary, engine 10 includes cylinder block 11, crankshaft 12 and piston 14, the piston being operatively connected to crankshaft 12 via connecting rod 16. Piston 14 cooperates with cylinder block 11 and cylinder head 18 to define combustion chamber 20. Spark plug 22 secured in cylinder head 18 ignites the fuel/air mixture after it has been drawn into combustion chamber 20 through the intake valve (not shown) during the intake stroke and has been compressed during the compression stroke of piston 14. The spark is normally timed to ignite the fuel/air mixture just before piston 14 completes its ascent on the compression stroke toward its top dead center ("TDC") position. The fuel/air mixture is drawn into combustion chamber 20 from the carburetor of the engine through an intake passage controlled by a conventional intake valve (not shown), and the products of combustion are expelled from the cylinder during the exhaust stroke through exhaust port 24 controlled by poppet-type exhaust valve 26. Although either the intake valve or exhaust valve 26 may be opened to vent compression and vacuum during start-up, it is recognized that preferably exhaust valve 26 functions as the compression and vacuum release valve in a manner to be discussed hereinafter.

Other conventional parts of the valve operating mechanism, or valve assembly, include timing gear 27 mounted on crankshaft 12 for rotation therewith, and camshaft gear 28 mounted on camshaft 30 and rotatably driven by timing gear 27 to thereby rotate camshaft 30 at one-half crankshaft speed. Camshaft 30 includes conventional pear-shaped intake and exhaust camshaft lobes 32 and 34, respectively, (FIGS. 1 and 2) which rotate with camshaft 30 to impart reciprocating motion to the intake and exhaust valves via tappets or cam followers 36 (not visible in FIG. 1) and 38, respectively. Although FIG. 1 illustrates the compression and vacuum release mechanism in a side valve engine, this is but one engine type, and the compression and vacuum release mechanisms disclosed herein are useable with other engine types, such as overhead valve ("OHV") and overhead cam ("OHC") engines of a vertical or horizontal crankshaft type, for example. In the exemplary side valve engine of FIG. 1, the valve actuating structures are shown in form of cam followers; however, as discussed below, in engines having other types of valve trains, the valve actuating structures may include lifters, push rods, rocker arms, bucket tappets, etc.

Figure 2:
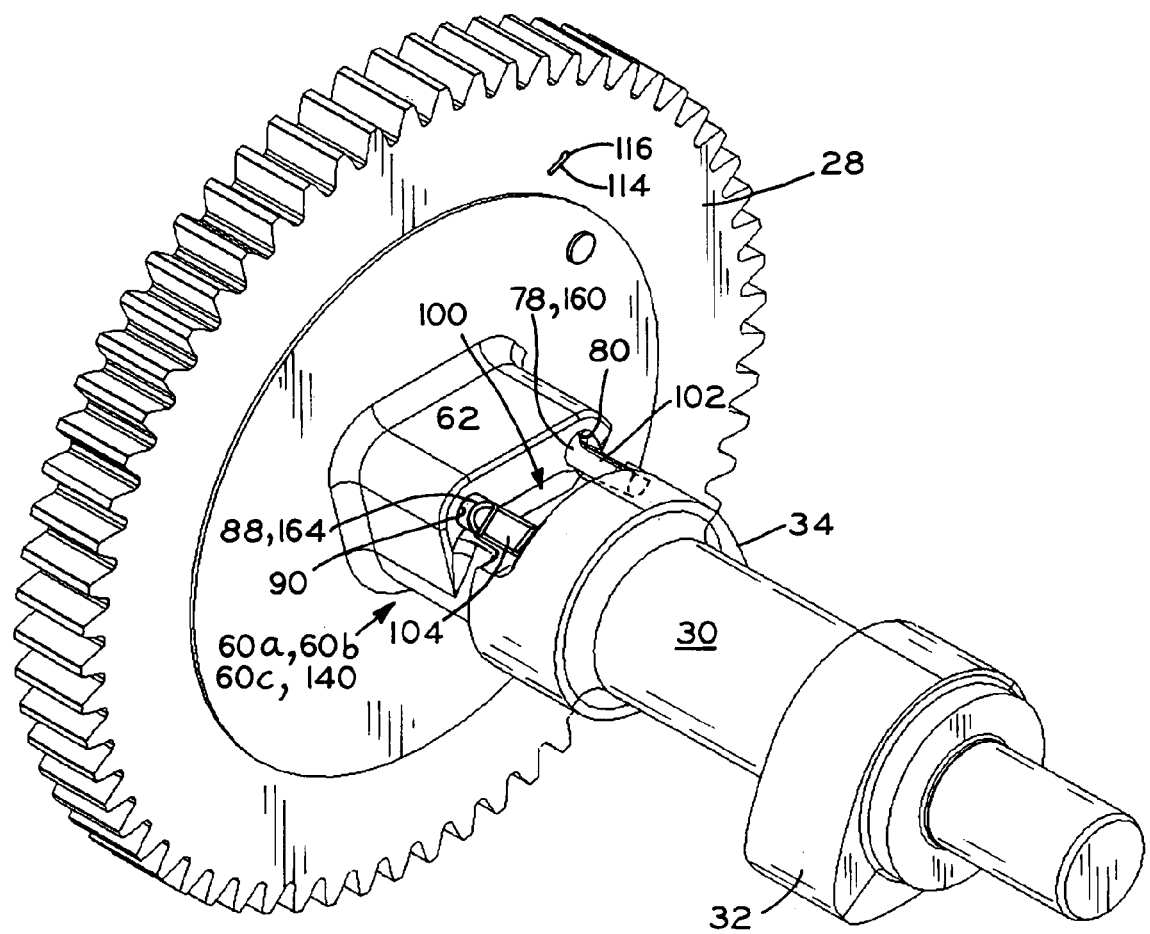
FIG. 2 is a first perspective view of the camshaft and cam gear assembly of the engine of FIG. 1.

Referring to FIG. 2, intake lobe 32 is shown as the outboard lobe furthest removed relative to camshaft gear 28, and exhaust lobe 34 is shown inboard with respect to camshaft gear 28 and lobe 32. The exhaust valve train is shown in FIG. 1 and includes cam follower 38 having face 42 adapted to bear tangentially against, and remain in a continuous abutting relationship with, peripheral surface 44 of the base circle of exhaust camshaft lobe 34. Referring to FIG. 1, cam follower 38 slides in guide boss 48 of crankcase 50, and its upper end pushes against tip 46 of valve 26. In operation, cam follower 38 lifts stem 52 of exhaust valve 26 which lifts face 53 from valve seat 55. Valve spring 54 encircles stem 52 between valve guide 56 and spring retainer 58. Spring 54 biases valve 26 closed and also biases cam follower 38 into tracking contact with exhaust lobe 34. Although the valve train or valve assembly shown in FIGS. 1 and 2 includes a camshaft having lobes which directly actuate the intake and exhaust valves, other engines in which the present invention may be used may include different valve trains or valve assemblies, such as, for example, an overhead camshaft driven from the crankshaft via linkage and including lobes for opening and closing the intake and exhaust valves; a camshaft driven from the crankshaft and including lobes for actuating push rods connected to rocker arms which in turn open and close the intake and exhaust valves; or a camshaft having a single cam lobe actuating rocker arms which in turn open and close the intake or exhaust valves. Other valve train or valve assemblies are also possible in engines in which the present invention may be used.

To aid in starting engine 10, several embodiments of mechanical compression and vacuum release mechanisms, described below, are provided. Generally, while the mechanisms are in their second or inoperative position, which is designated as the "run" position of the engine, the rotation of outboard lobe 34 with camshaft 30 at "running speed" causes normal operation of valve 26, so that valve 26 opens and closes in timed and periodic relation with the travel of piston 14 according to conventional engine timing practice. Thus, exhaust lobe 34 is adapted to open valve 26 near the end of the power stroke and to hold the same open during ascent of the piston on the exhaust stroke until the piston has moved slightly past top dead center. As camshaft lobe 34 continues to rotate, spring 58 forces cam follower 38 downwardly and valve 26 is reseated. Valve 26 is held closed during the ensuing intake, compression and power strokes. Intake camshaft lobe 32 is likewise of conventional fixed configuration to control the intake valve such that it completely closes shortly after the piston begins its compression stroke and remains closed throughout the subsequent power and exhaust strokes, and reopening to admit the fuel mixture on the intake stroke.

Since in a conventional engine the intake and exhaust valves are normally closed for the major portion of the power stroke, cranking of the engine is impeded because the piston must pull against a vacuum in the combustion chamber. Such vacuum may be created in the combustion chamber by the operation of a conventional compression release mechanism during engine starting. However, by incorporating any of the compression and vacuum release mechanisms of the present invention, compression and vacuum relief is automatically obtained at cranking speeds to greatly reduce cranking effort and thereby facilitate starting. Moreover, a conventional engine need not be physically altered to effect compression and vacuum release with the mechanism of the present invention incorporated therein. The compression and vacuum release mechanism is responsive to engine speed such that it is automatically rendered inoperative at engine running speeds to prevent compression loss or loss of efficiency of the engine when it is running under its own power.

Figure 3:
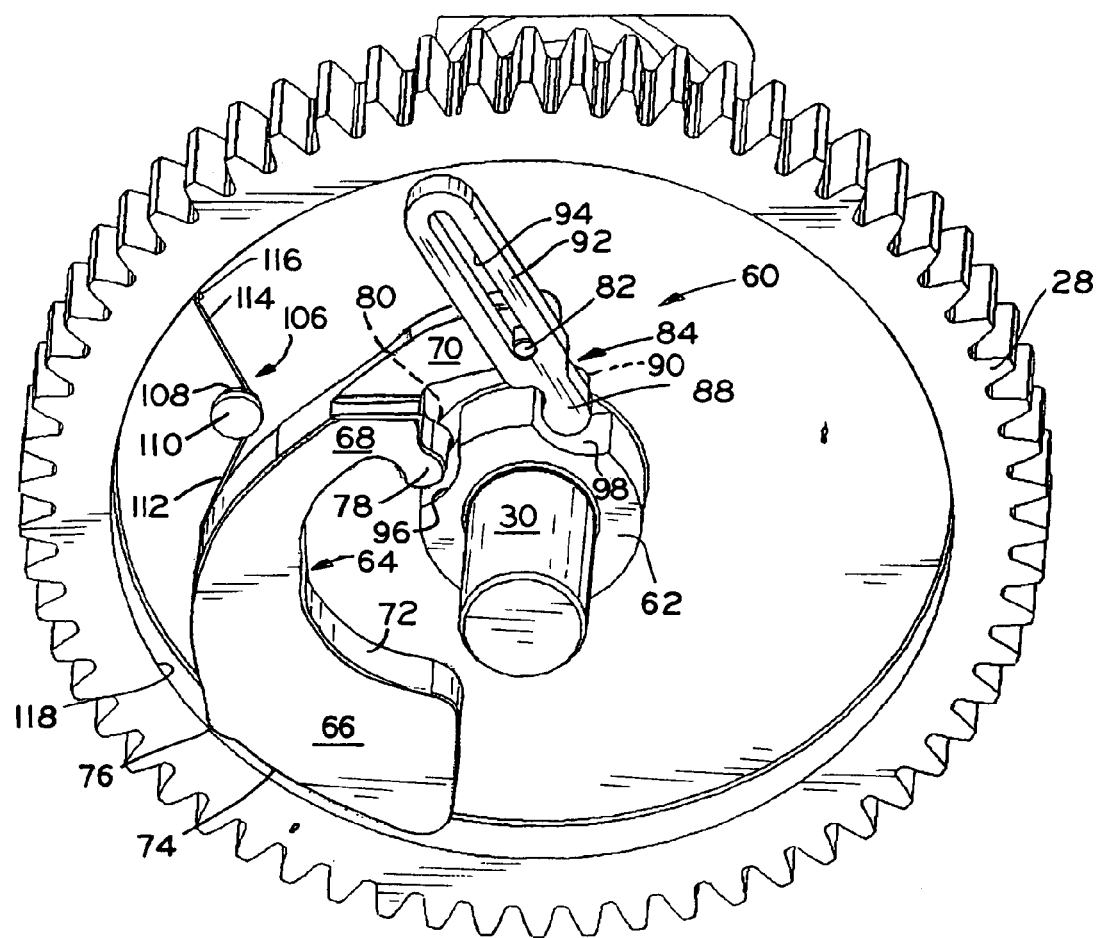
FIG. 3 is a second perspective view of the camshaft and cam gear assembly of the engine of FIG. 1, showing components of a mechanical compression and vacuum release mechanism according to the first embodiment.

Referring to FIGS. 2 and 3, a first embodiment of a mechanical compression and vacuum release mechanism of the present invention is shown. Compression and vacuum release mechanism 60a includes a hub 62 preferably formed as an integral portion with camshaft gear 28, and which extends therefrom on opposite sides of camshaft gear 28 as shown in FIGS. 2 and 3. Referring to FIG. 3, flyweight 64 is pivotally mounted to camshaft gear 28 and generally includes body portion 66, head portion 68, and extension portion 70. Body portion 66 comprises most of the mass of flyweight 64 and includes radial inner surface 72 and radial outer surface 74 having stop projection 76. Head portion 68 includes a vacuum release pin 78 extending substantially parallel to camshaft 30 and closely yet rotatably fitted within a bore 80 in hub 62, and flyweight 64 is pivotally mounted to camshaft gear 28 about vacuum release pin 78. Extension portion 70 extends from head portion 68 and includes a pin 82.

Mechanical compression and vacuum release mechanism 60a also includes compression release lever 84, which includes compression release pin 88 extending rotatably through bore 90 in hub 62 via a close fit and aligned substantially parallel to camshaft 30 and vacuum release pin 78. Compression release lever 84 also includes coupling portion 92 extending orthogonally from compression release pin 88 and including slot 94 therein in which pin 82 of extension portion 70 of flyweight 64 is slidably received to operably couple flyweight 64 and compression release lever 84. Flyweight 64 and compression release lever 84 may each be formed from a rigid plastic or suitable metal, for example, and preferably each comprise single components including vacuum and compression release pins 78 and 88, respectively, integrally formed with the remainder of their structures. Referring to FIG. 3, hub 62 includes recesses 96 and 98 to accommodate vacuum and compression release pins 78 and 88, respectively and, as shown in FIG. 2, exhaust cam lobe 34 includes recess 100 in which vacuum and compression release cams 102 and 104 at the ends of vacuum and compression release pins 78 and 88, respectively, are disposed. Vacuum and compression release cams 102 and 104 each include flat portions, as shown in FIG. 2.

Referring to FIG. 3, a tension spring 106 includes coil portion 108 mounted to camshaft gear 28 by fastener 110, such as a rivet or screw, for example, and also includes first arm 112 in engagement with flyweight 64, and second arm 114 extending through aperture 116 of camshaft gear 28 to anchor second arm 114 to camshaft gear 28. Spring 106 normally biases flyweight 64 to the start position shown in FIG. 4, in which inner radial surface 72 of flyweight 64 abuts hub 62.

Figure 4:
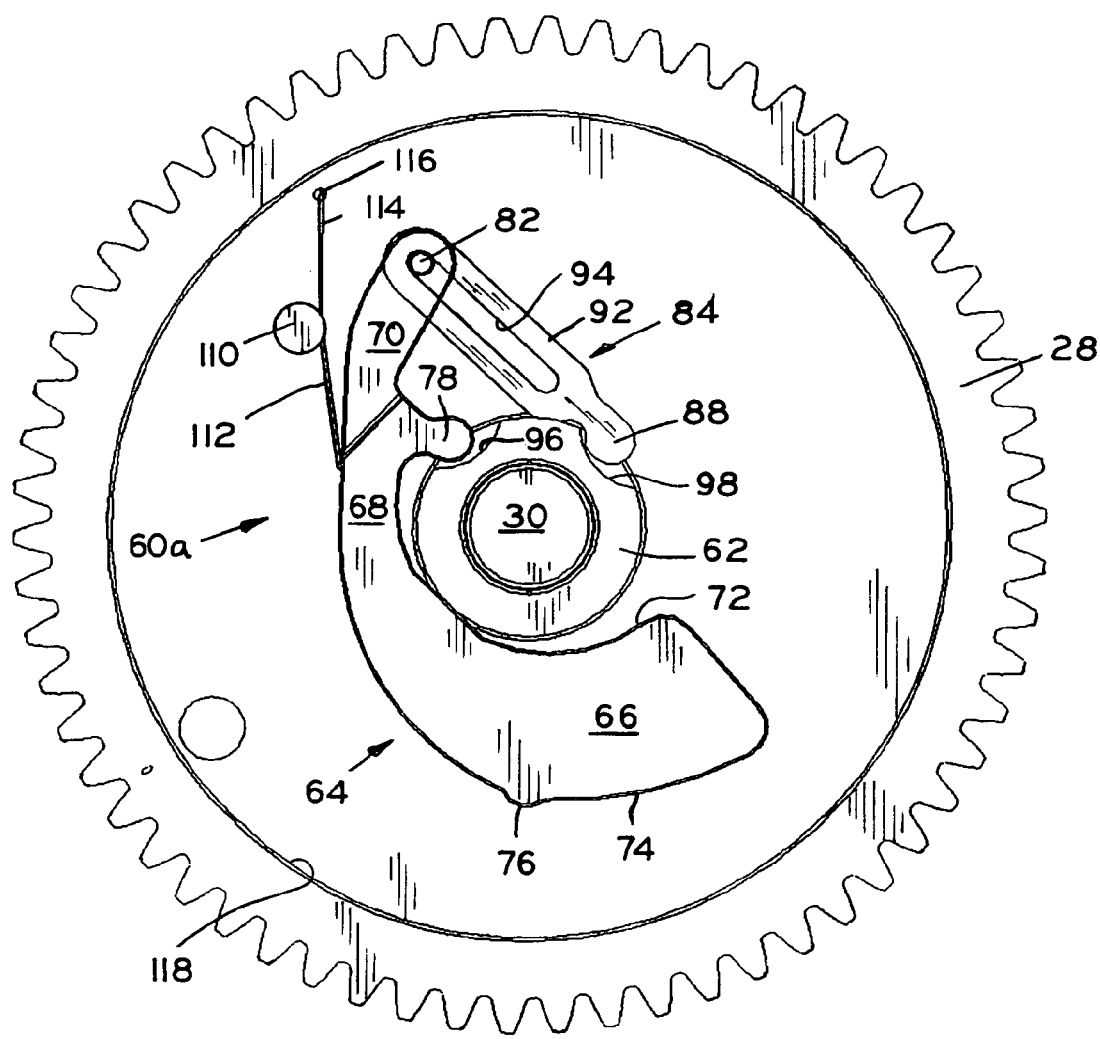
FIG. 4 is an end view of the cam gear, showing the components of the mechanical compression and vacuum release mechanism of the first embodiment in a first or start position.
Figure 5:
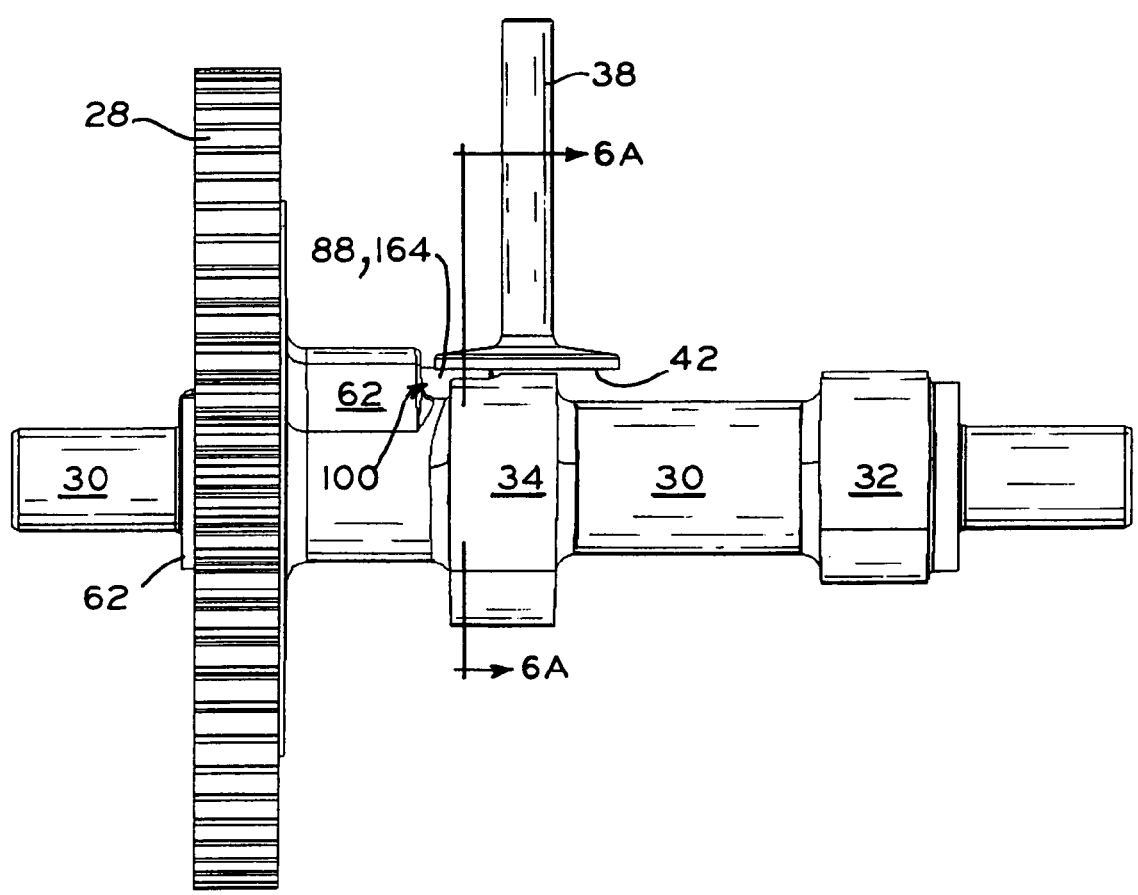
FIG. 5 is an elevational view of the camshaft and cam gear, showing the components of the mechanical compression and vacuum release mechanism in the first or start position.

With reference to FIGS. 4-9, operation of compression and vacuum release mechanism 60a will now be described. Compression and vacuum release mechanism 60a is shown in a first or start position in FIGS. 4 and 5, which corresponds to engine 10 being stopped or to engine 10 being cranked for starting during which a minimal amount of centrifugal force is imposed upon camshaft 30, camshaft gear 28, and mechanical compression and vacuum release mechanism 60a. As shown in FIG. 4, in the start position, spring 106 biases flyweight 64 towards a radially inward position in which inner radial surface 72 of flyweight 64 abuts hub 62, and vacuum and compression release pins 78 and 88 are rotatably oriented within bores 80 and 90 of hub 62 such that vacuum and compression release cams 102 and 104 each extend beyond the base circle of exhaust cam lobe 34, as best shown in FIGS. 5 and 6A. In this position, upon cranking of engine 10, vacuum and compression release cams 102 and 104 will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting. Advantageously, contact loads from the contact between surface 42 of cam follower 38 and vacuum and compression release cams 102 and 104 is transferred through vacuum and compression release pins 78 and 88 to hub 62 due to the close fit of vacuum and compression release pins 78 and 88 within bores 80 and 90 of hub 62.

Figure 7:
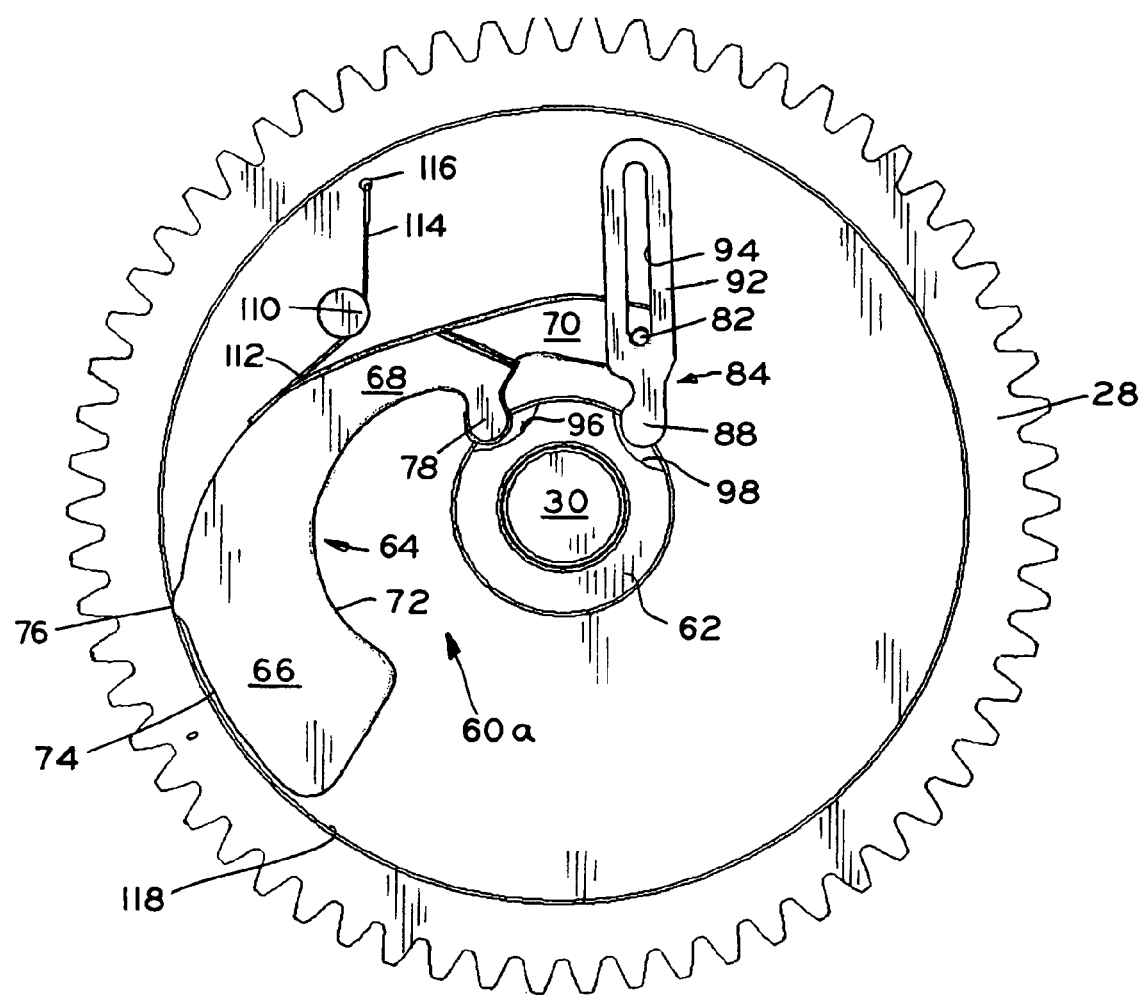
FIG. 7 is an end view of the cam gear, showing the components of the mechanical compression and vacuum release mechanism of the first embodiment in a second or run position.
Figure 8:
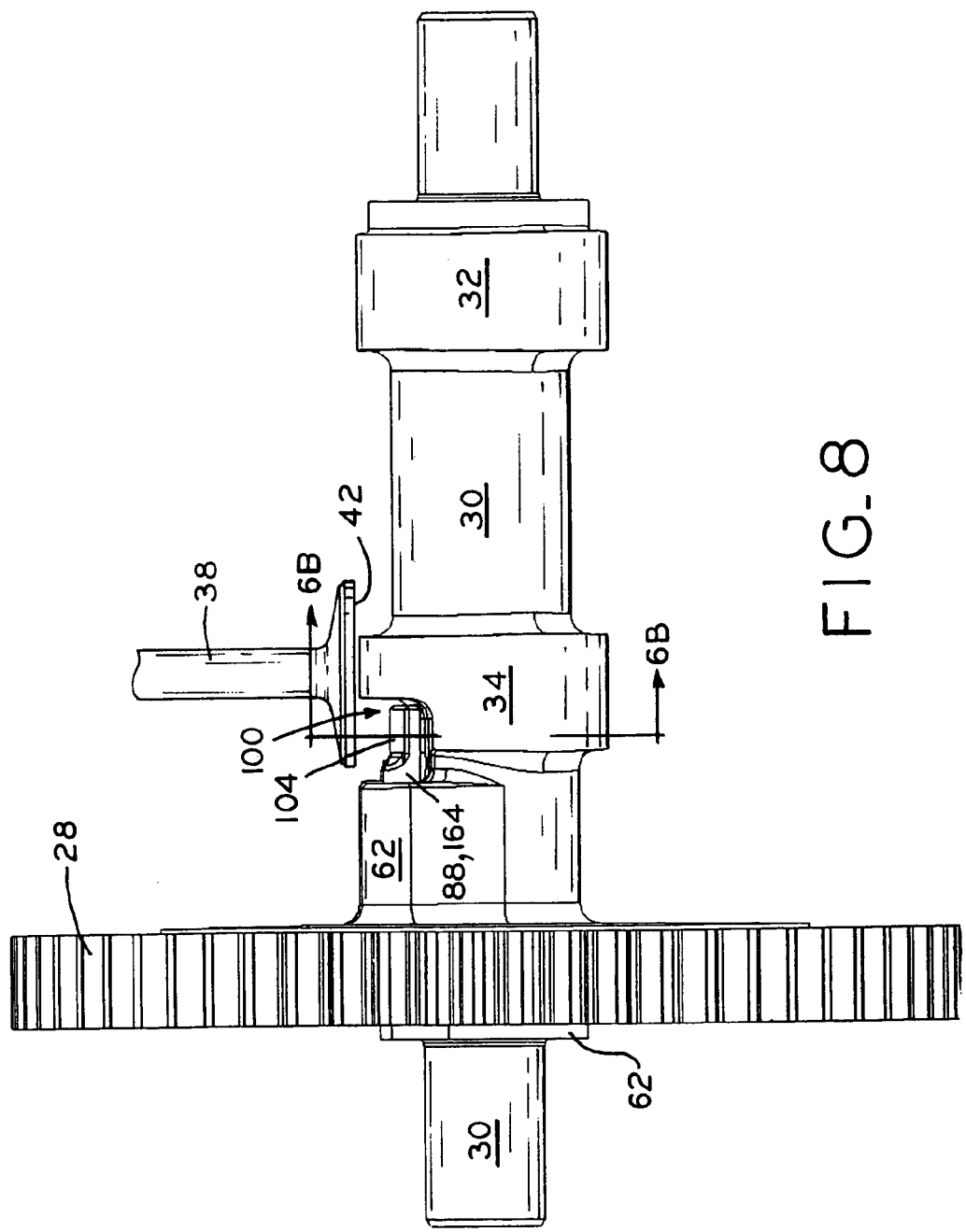
FIG. 8 is an elevational view of the camshaft and cam gear, showing the components of the mechanical compression and vacuum release mechanism in the second or run position.

After engine 10 starts and the rotational speed of camshaft 30 and camshaft gear 28 rapidly increases, a much greater amount of centrifugal force is imposed upon flyweight 64, thereby urging flyweight 64 against the bias of spring 106 centrifugally outwardly to the position shown in FIG. 7, in which radial outer surface 74 is disposed adjacent rim 118 of camshaft gear 28 and stop projection 76 of flyweight 64 is in engagement with rim 118. In this position, vacuum release pin 78 is rotated along with flyweight 64, and compression release pin 88 is rotated concurrently with vacuum release pin 78 via the sliding engagement of pin 82 of flyweight extension portion 70 within slot 94 of compression release lever 84 to the positions shown in FIG. 8, in which the flat surfaces of vacuum and compression release cams 102 and 104 are oriented such that same do not extend beyond the base circle of exhaust cam lobe 34, as shown in FIG. 6B. In this manner, the vacuum and compression release effects are terminated after engine 10 starts and, at engine running speeds, engine 10 operates according to a conventional four-stroke timing sequence.

Figure 9:
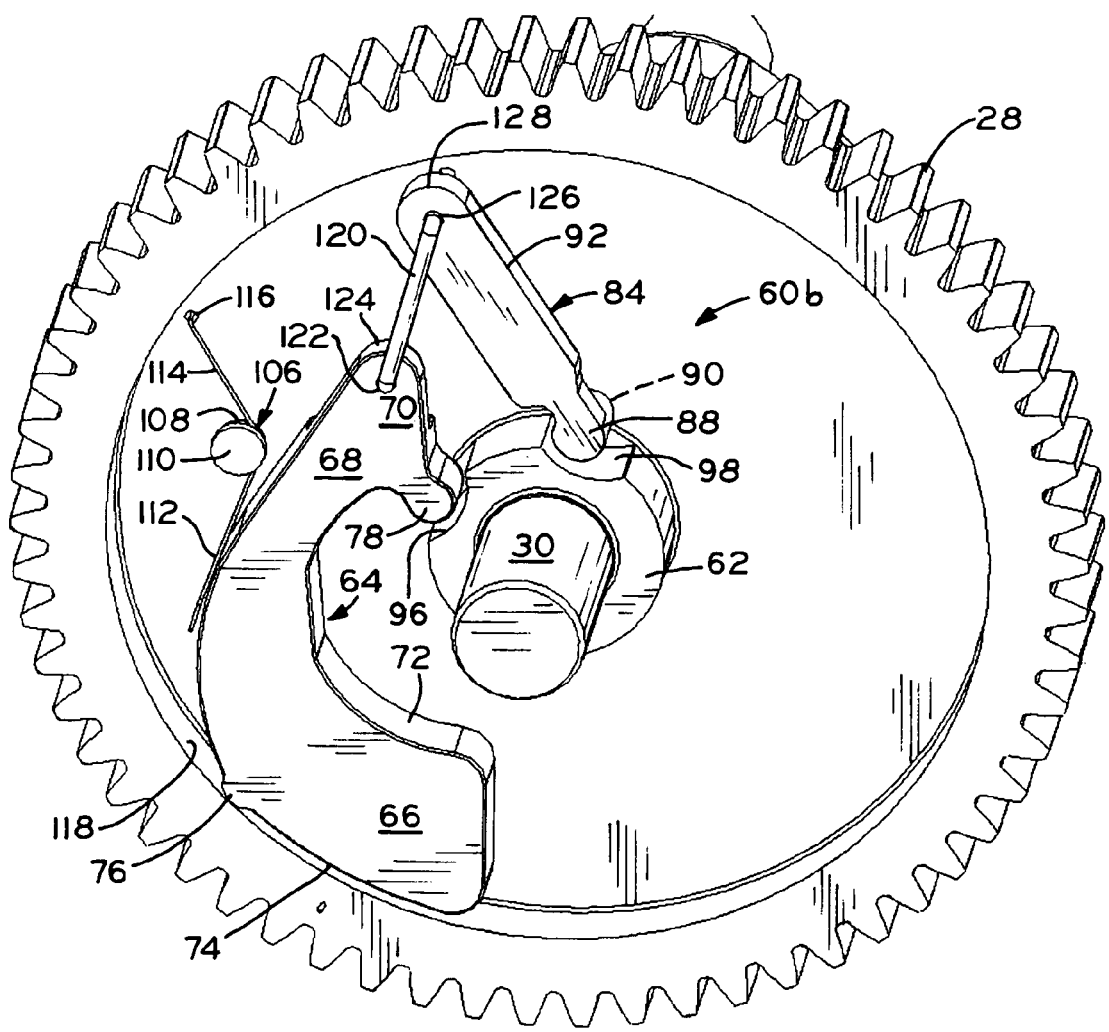
FIG. 9 is a perspective view of the camshaft and cam gear assembly of the engine of FIG. 1, showing components of a mechanical compression and vacuum release mechanism according to a second embodiment.
Figure 10:
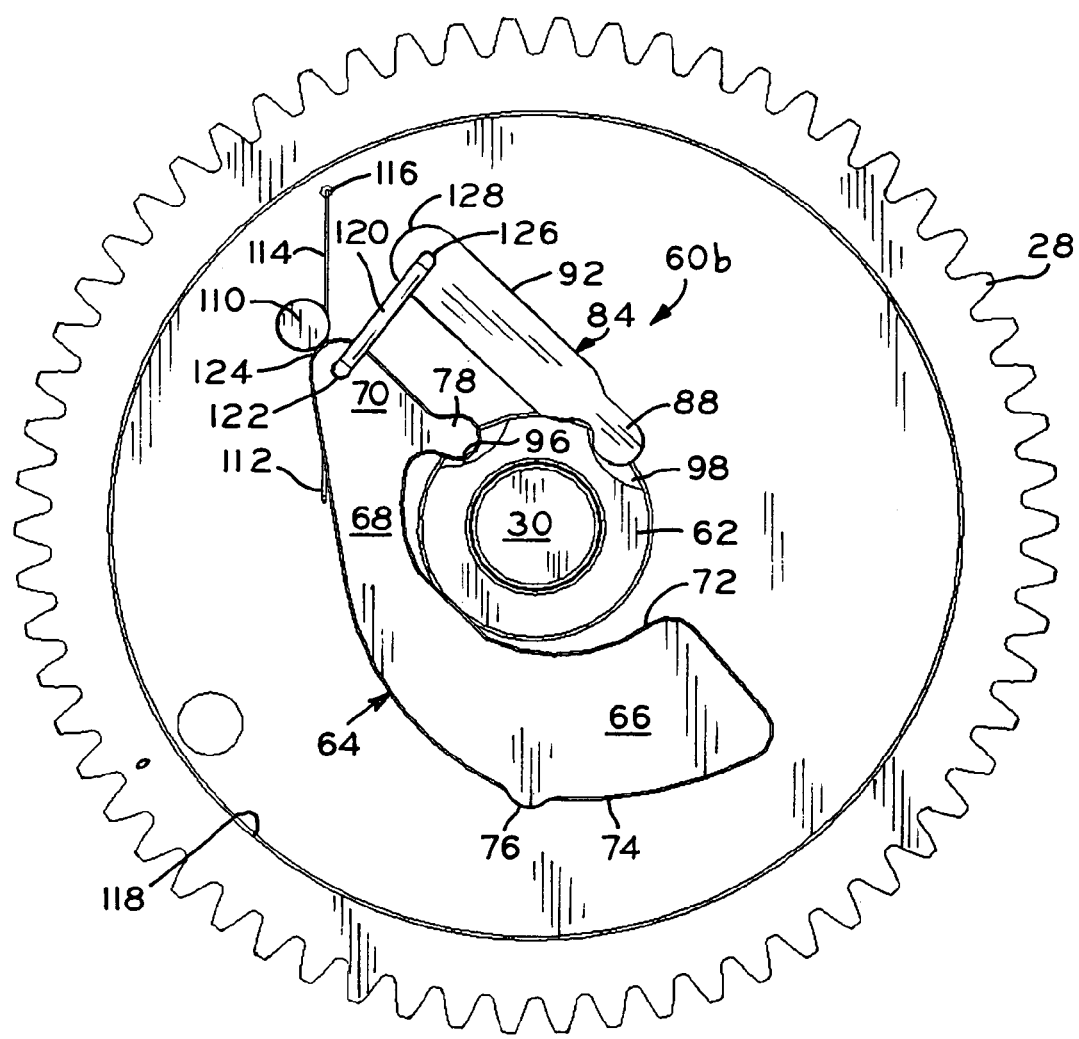
FIG. 10 is an end view of the cam gear of FIG. 9, showing the components of the mechanical compression and vacuum release mechanism of the second embodiment in a first or start position.
Figure 11:
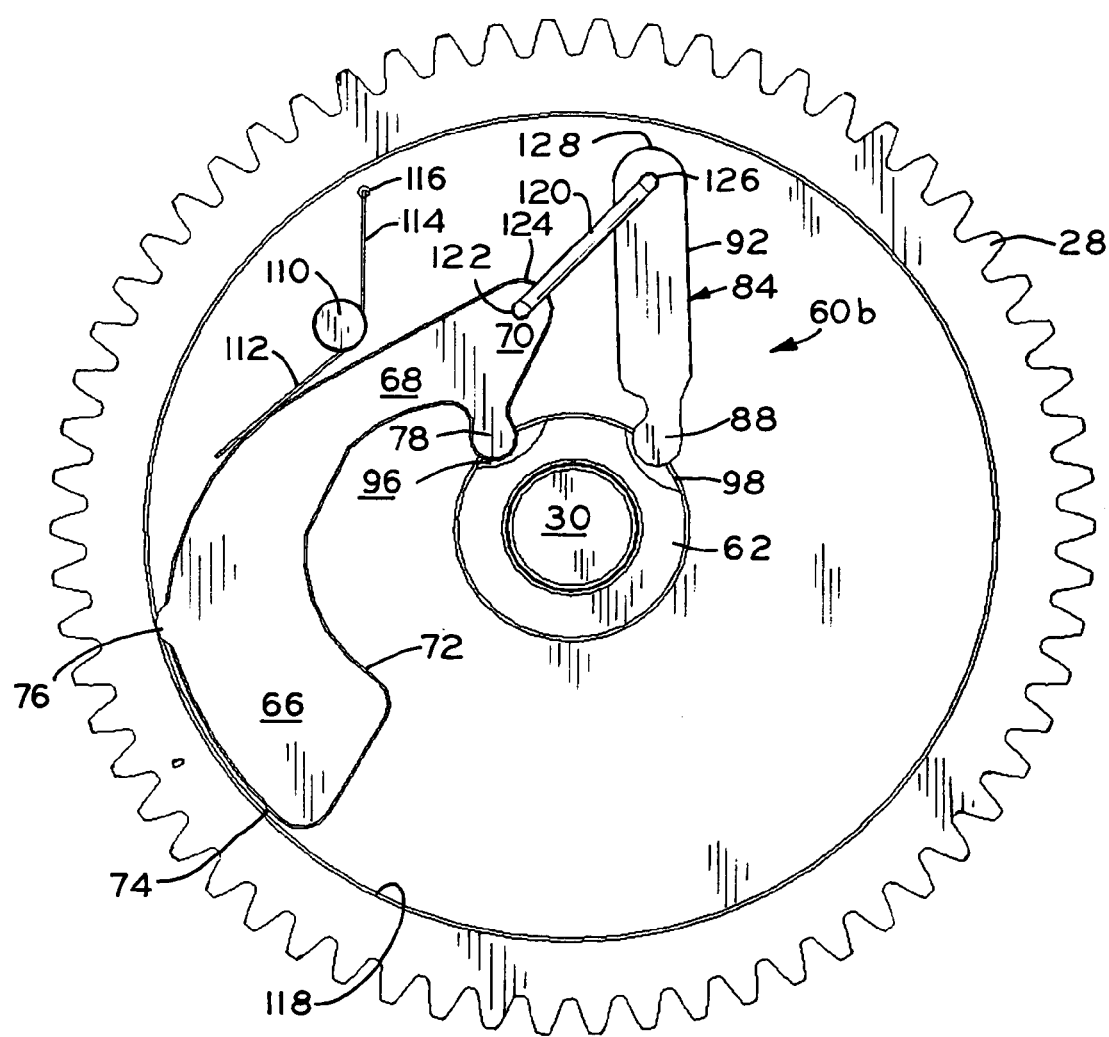
FIG. 11 is an end view of the cam gear of FIG. 9, showing the components of the mechanical compression and vacuum release mechanism of the second embodiment in a second or run position.

Referring to FIGS. 9-11, a second embodiment of a mechanical compression and vacuum release mechanism of the present invention is shown. Mechanical compression and vacuum release mechanism 60b includes several components which are identical or substantially identical to those of mechanical compression and vacuum release mechanism 60a of the first embodiment, and the same reference numerals have been used to identify identical or substantially identical components therebetween. In addition, except as described below with respect to FIGS. 9-11, the operation of mechanical compression and vacuum release mechanism 60b of the second embodiment is substantially similar to that of mechanical compression and release mechanism 60a of the first embodiment described above with reference to FIGS. 1, 2, 5, 6A, 6B, and 8.

Referring to FIG. 9, flyweight 64 is pivotally mounted to camshaft gear 28 and generally includes body portion 66, head portion 68, and extension portion 70. Head portion 68 includes a vacuum release pin 78 extending substantially parallel to camshaft 30 and closely yet rotatably fitted within a bore 80 in hub 62. Extension portion 70 extends from head portion 68 and is engaged by one end of rod-linkage member 120. Rod-linkage member 120 is pivotally mounted in aperture 122 located near end 124 of flyweight extension portion 70. Mechanical compression and vacuum release mechanism 60b also includes compression release lever 84 having compression release pin 88 that includes coupling portion 92 extending orthogonally from compression release pin 88. Release lever 84 is engaged by the opposite end of rod-linkage member 120 to operably couple flyweight 64 and compression release lever 84. The end of rod-linkage member 120 is pivotally mounted in aperture 126 positioned near end 128 of compression release lever 84.

Flyweight 64 has a start position shown in FIG. 10 and an operating position shown in FIG. 11, in which vacuum and compression release pins 78 and 88 are rotatably disposed within bores 80 and 90 of hub 62 such that vacuum and compression release cams 102 and 104 each extend beyond the base circle of exhaust cam lobe 34, as best shown in FIGS. 5 and 6A. After engine 10 starts, flyweight 64 is urged against the bias of spring 106 centrifugally outwardly to the position shown in FIG. 11. As flyweight 64 moves centrifugally outwardly, vacuum release pin 78 is rotated along with flyweight 64, and compression release pin 88 is rotated concurrently with vacuum release pin 78 via the rod-linkage engagement of linkage member 120 with flyweight extension portion 70 and compression release lever 84 to the positions shown in FIG. 8, in which the flat surfaces of vacuum and compression release cams 102 and 104 are oriented such that same do not extend beyond the base circle of exhaust cam lobe 34, as shown in FIG. 6B.

Figure 12:
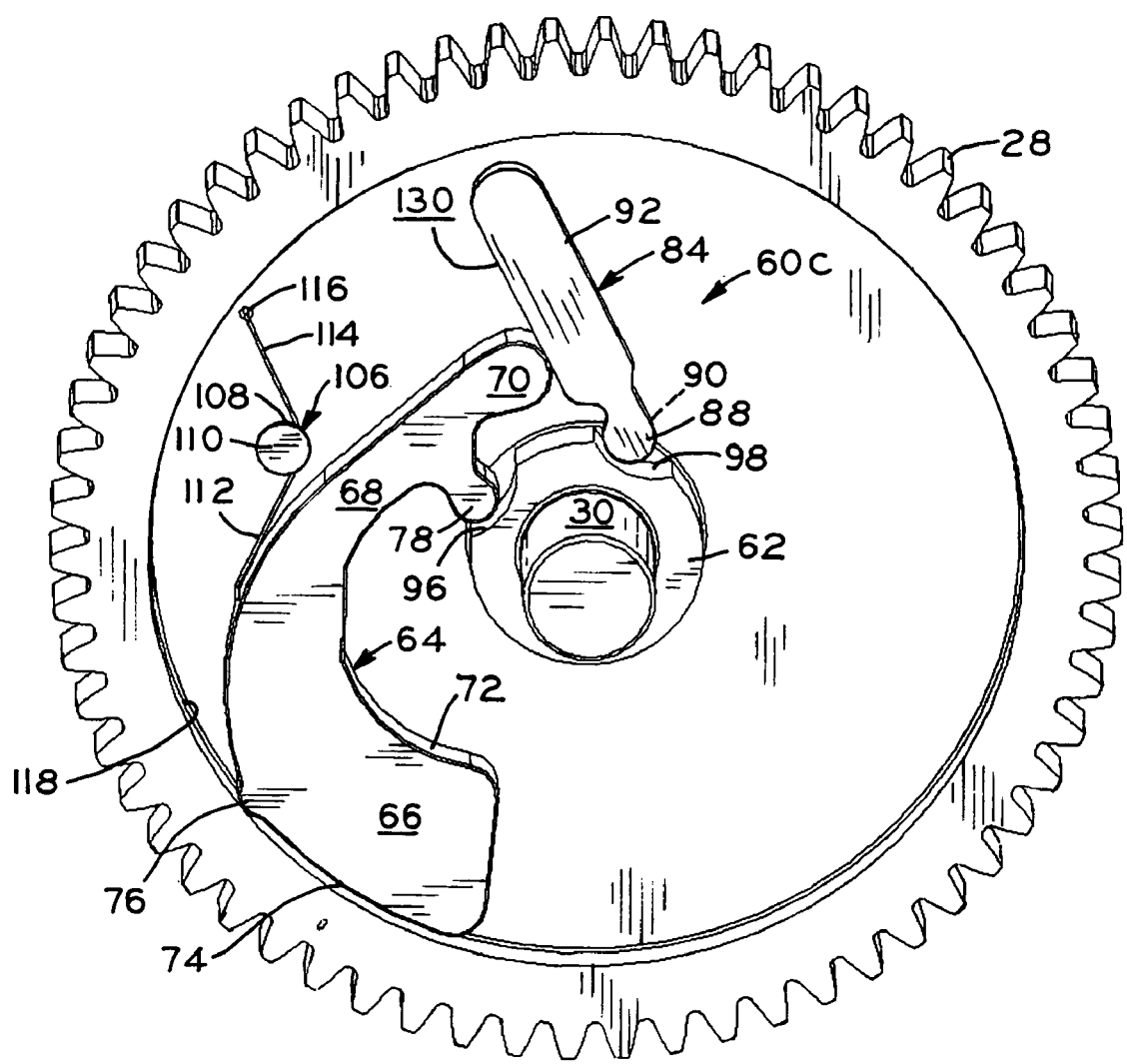
FIG. 12 is a perspective view of the camshaft and cam gear assembly of the engine of FIG. 1, showing components of a mechanical compression and vacuum release mechanism according to a third embodiment.
Figure 13:
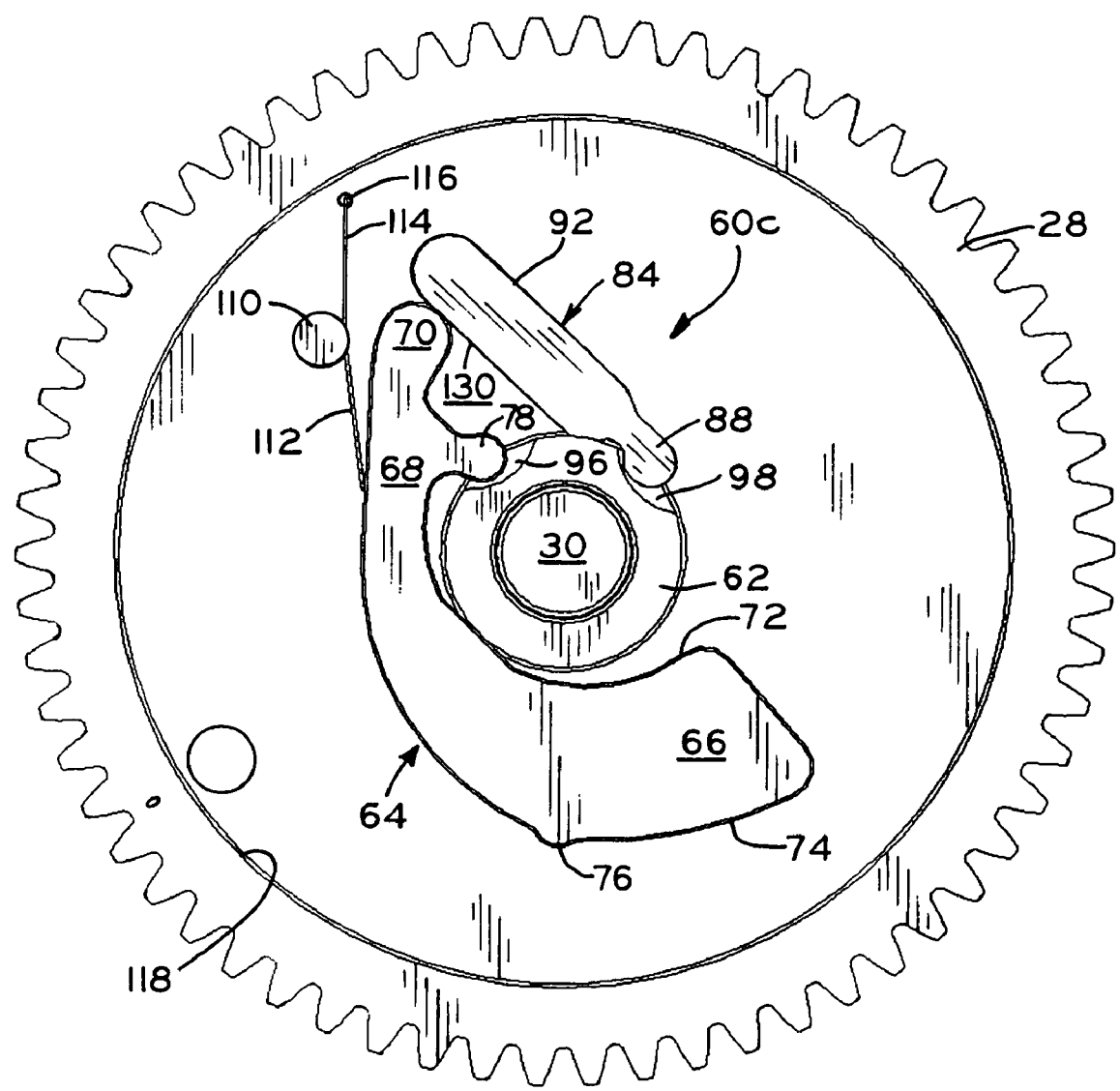
FIG. 13 is an end view of the cam gear of FIG. 12, showing the components of the mechanical compression and vacuum release mechanism of the third embodiment in a first or start position.
Figure 14:
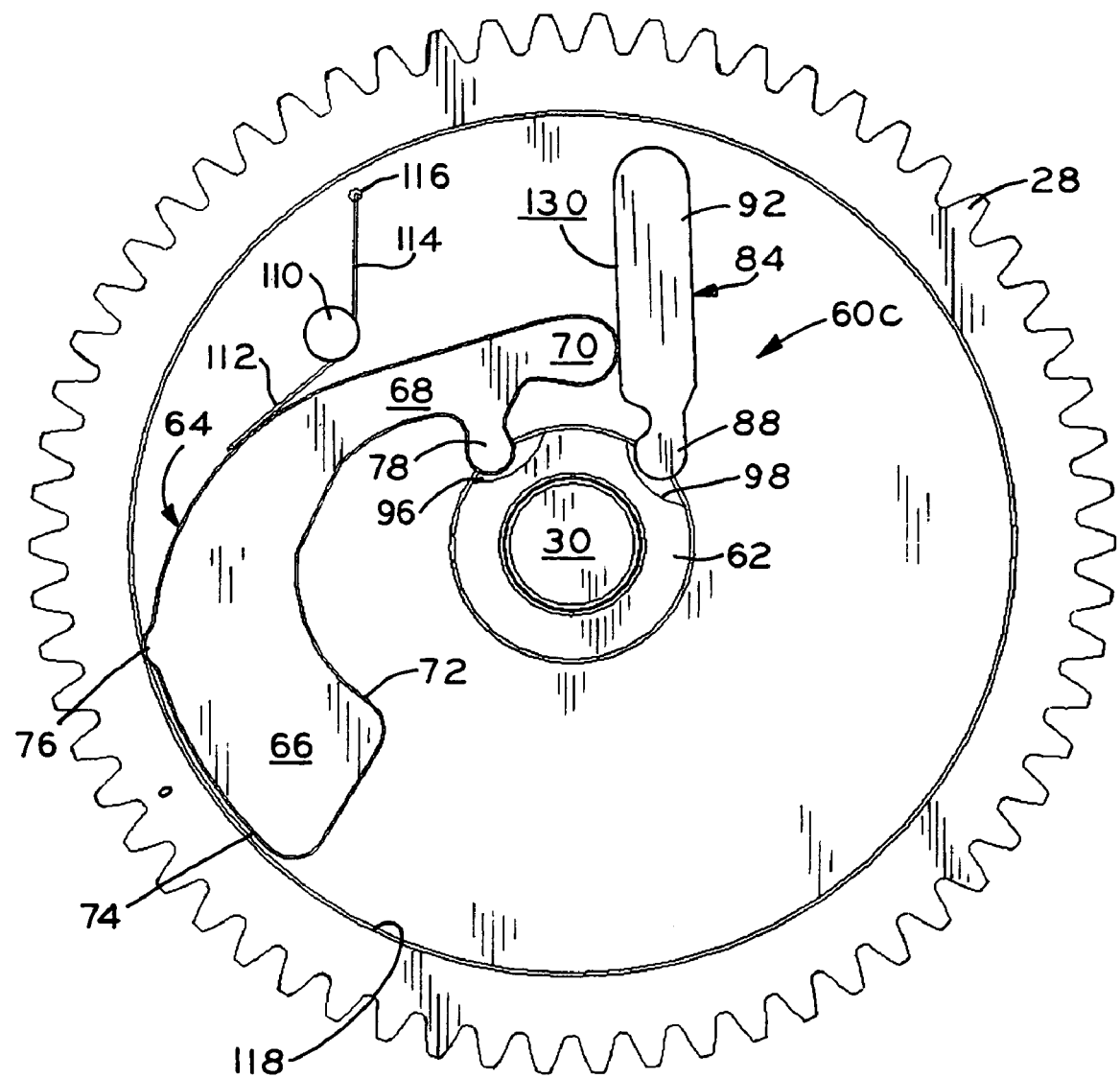
FIG. 14 is an end view of the cam gear of FIG. 12, showing the components of the mechanical compression and vacuum release mechanism of the third embodiment in a second or run position.

Referring to FIGS. 12-14, a third embodiment of a mechanical compression and vacuum release mechanism of the present invention is shown. Mechanical compression and vacuum release mechanism 60c includes several components which are identical or substantially identical to those of mechanical compression and vacuum release mechanisms 60a and 60b of the first and second embodiments, and the same reference numerals have been used to identify identical or substantially identical components therebetween. In addition, except as described below with respect to FIGS. 12-14, it is understood that the operation of mechanical compression and vacuum release mechanism 60c of the third embodiment is substantially similar to that of mechanical compression and release mechanisms 60a and 60b of the first and second embodiments described above with reference to FIGS. 1, 2, 5, 6A, 6B, and 8.

Referring to FIG. 12 and as with the previously described embodiments of mechanical compression and vacuum release mechanisms 60a and 60b, flyweight 64 is pivotally mounted to camshaft gear 28 and generally includes body portion 66, head portion 68, and extension portion 70. Head portion 68 includes a vacuum release pin 78 extending substantially parallel to camshaft 30 and closely yet rotatably fitted within a bore 80 in hub 62. Mechanical compression and vacuum release mechanism 60c also includes compression release lever 84 having compression release pin 88 that includes coupling portion 92 extending orthogonally from compression release pin 88. Extension portion 70 of flyweight 64 extends from head portion 68 and abuttingly and slidably engages longitudinal side surface 130 of compression release lever 84 to operably couple flyweight 64 and lever 84.

Flyweight 64 has a start position shown in FIG. 13 and an operating position shown in FIG. 14, in which vacuum and compression release pins 78 and 88 are rotatably oriented within bores 80 and 90 of hub 62 such that vacuum and compression release cams 102 and 104 each extend beyond the base circle of exhaust cam lobe 34, as best shown in FIGS. 5 and 6A. In the start position shown in FIG. 13, compression release lever 84 is normally positioned by a spring (not shown) similar to spring 106, in the position shown, in which the radially outward portion thereof abuts extension portion 70 of flyweight 64. After engine 10 starts, flyweight 64 is urged against the bias of spring 106 centrifugally outwardly to the position shown in FIG. 14. As flyweight 64 moves centrifugally outwardly, vacuum release pin 78 is rotated along with flyweight 64, and compression release pin 88 is rotated concurrently with vacuum release pin 78 via the abutting relationship between flyweight extension portion 70 and compression release lever 84 to the positions shown in FIG. 8, in which the flat surfaces of vacuum and compression release cams 102 and 104 are oriented such that same do not extend beyond the base circle of exhaust cam lobe 34, as shown in FIG. 6B. The abutting engagement between flyweight 64 and compression release lever 84 allow flyweight extension portion 70 to slide along lever surface 130 facilitating rotation of compression release pin 88.

Figure 15:
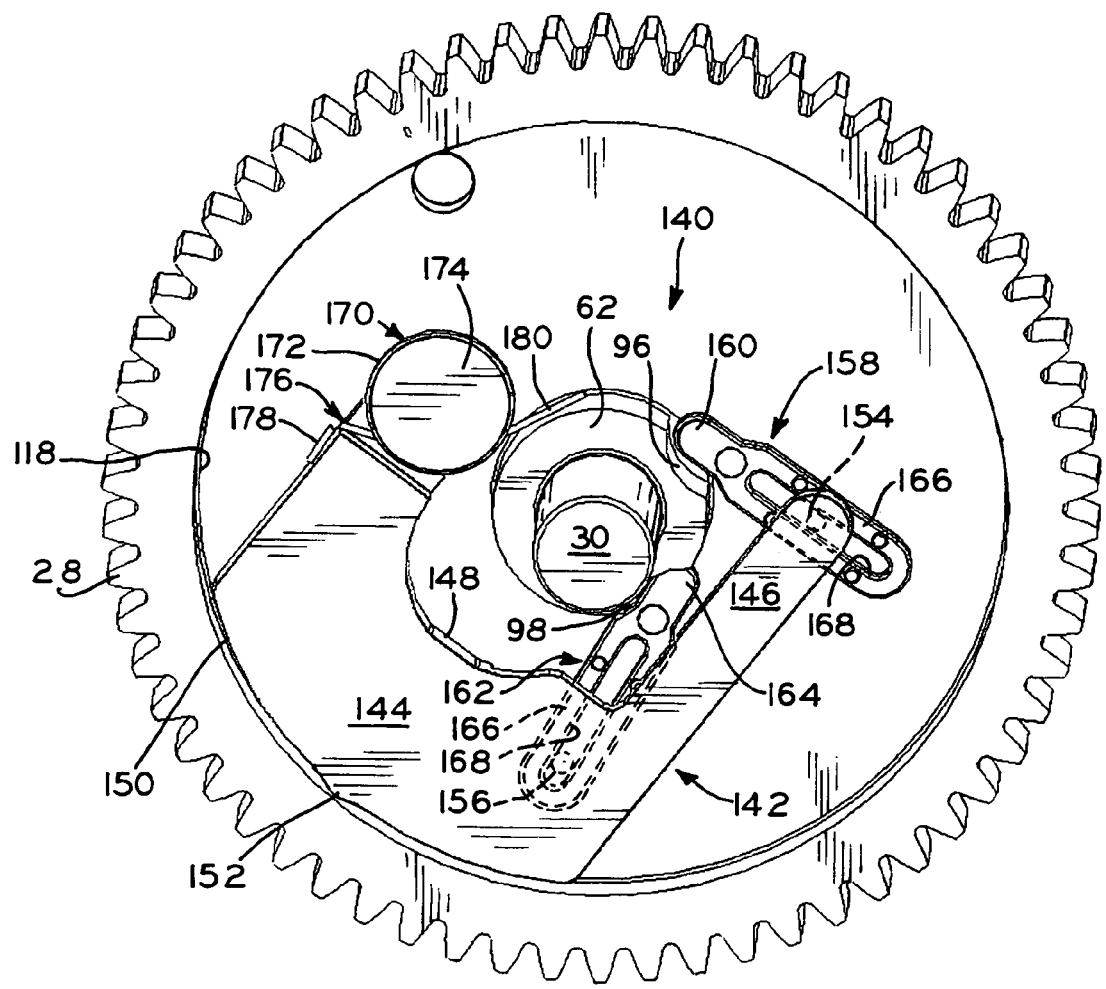
FIG. 15 is a perspective view of the camshaft and cam gear assembly of the engine of FIG. 1, showing components of a mechanical compression and vacuum release mechanism according to a fourth embodiment.
Figure 16:
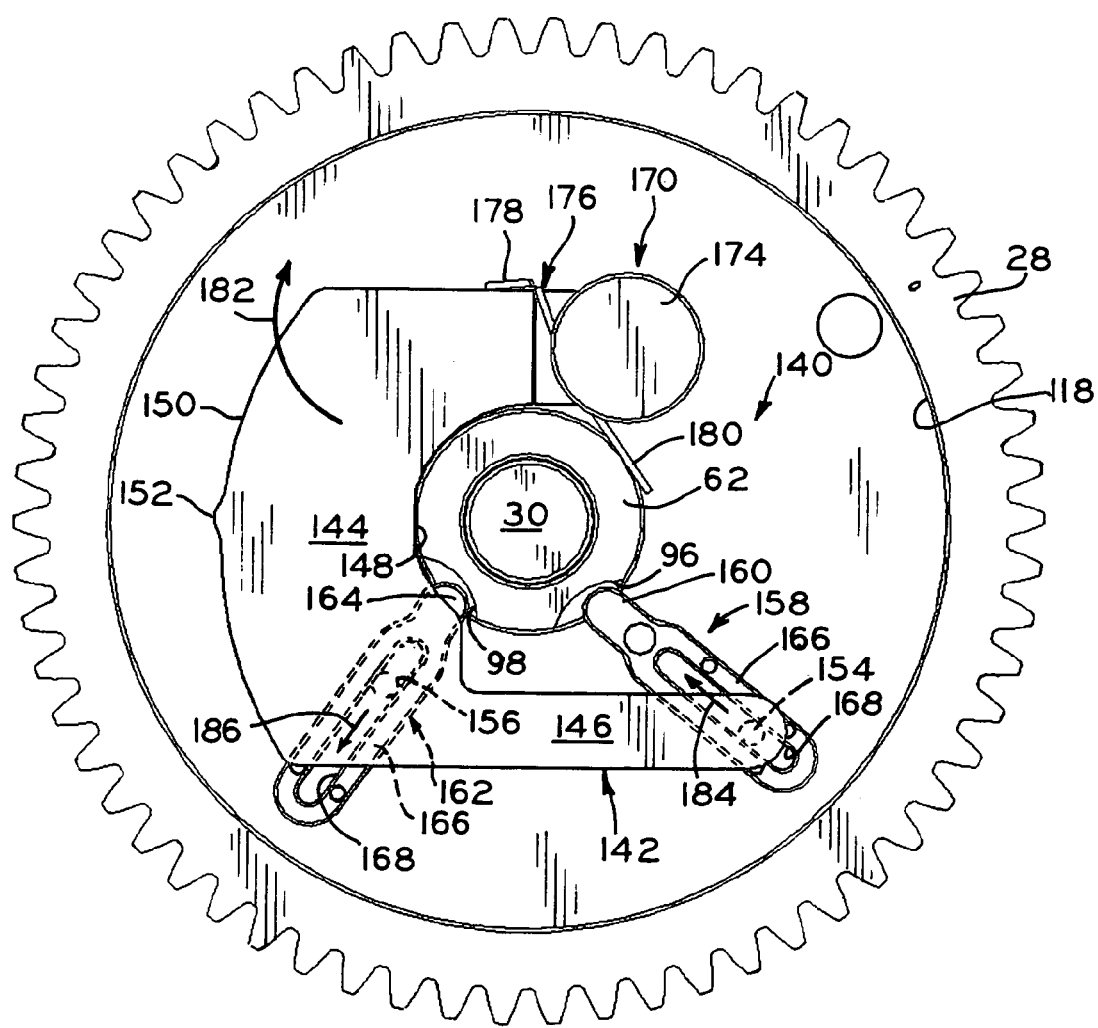
FIG. 16 is an end view of the cam gear of FIG. 15, showing the components of the mechanical compression and vacuum release mechanism of the fourth embodiment in a first or start position.
Figure 17:
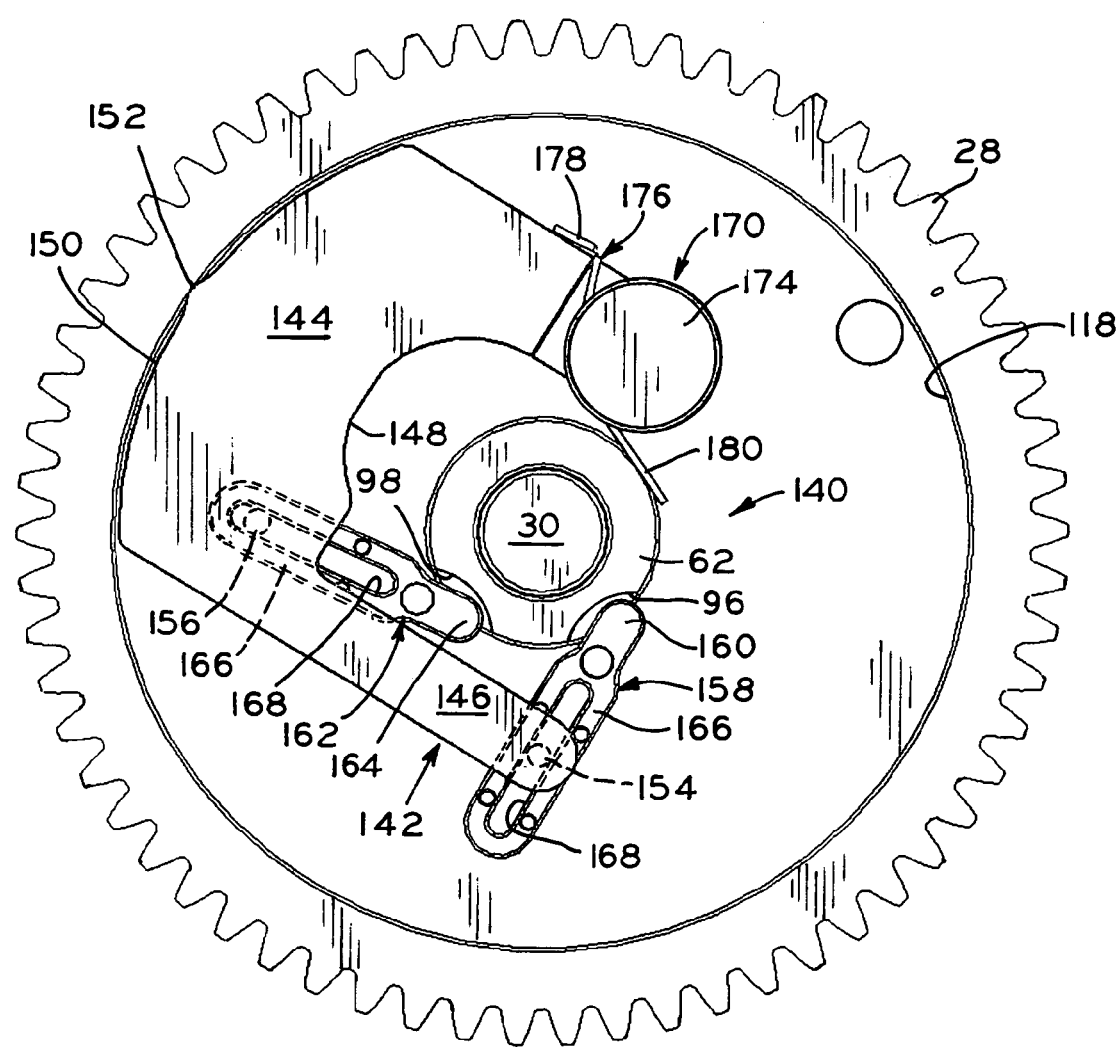
FIG. 17 is an end view of the cam gear of FIG. 15, showing the components of the mechanical compression and vacuum release mechanism of the fourth embodiment in a second or run position.
Figure 18:
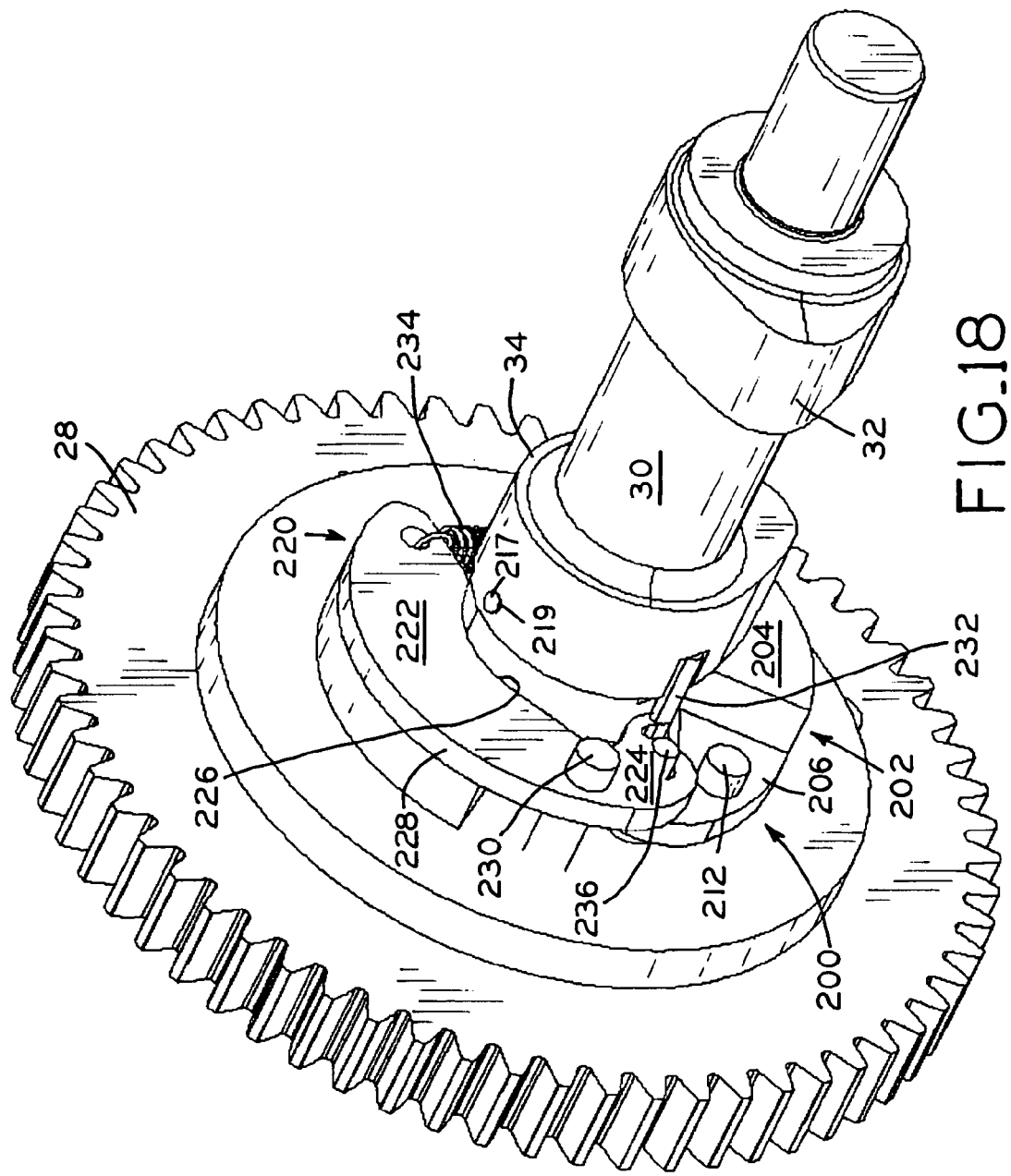
FIG. 18 is a perspective view of the camshaft and cam gear assembly of the engine of FIG. 1, showing components of a mechanical compression and vacuum release mechanism according to a fifth embodiment.

Referring to FIGS. 15-17, a fourth embodiment of a mechanical compression and vacuum release mechanism of the present invention is shown. Mechanical compression and vacuum release mechanism 140 includes a number of components which are identical or substantially identical to those of the mechanical compression and vacuum release mechanisms 60a, 60b, and 60c of the first, second, and third embodiments, respectively, described above with reference to FIGS. 1, 2, 5, 6A, 6B, and 8, and the same reference numerals have been used to identify identical or substantially identical components therebetween.

Compression and vacuum release mechanism 140 includes hub 62 preferably formed as an integral portion with camshaft gear 28, and which extends therefrom on opposite sides of camshaft gear 28 as shown in FIGS. 2 and 15. Referring to FIG. 15, flyweight 142 is pivotally mounted to camshaft gear 28 and generally includes body portion 144 and extension portion 146. Body portion 144 comprises most of the mass of flyweight 142 and includes radial inner surface 148 and radial outer surface 150 having stop projection 152. Body portion 144 includes a first actuation pin 156 fixedly mounted thereto. Extension portion 146 extends from body portion 144 and includes a second actuation pin 154 fixedly mounted thereto.

Mechanical compression and vacuum release mechanism 140 also includes vacuum release lever 158, including vacuum release pin 160 extending substantially parallel to camshaft 30 and closely yet rotatably fitted within a bore 80 in hub 62. Mechanism 140 also includes compression release lever 162, including compression release pin 164 extending rotatably through bore 90 in hub 62 via a close fit and aligned substantially parallel to camshaft 30. Vacuum and compression release levers 158 and 162 each include coupling portion 166 extending orthogonally from vacuum and compression release pins 160 and 164. Slot 168 is formed in each coupling portion 166 in which actuation pins 154 and 156 of flyweight 142 are slidably received to operably couple flyweight 142 and vacuum and compression release levers 158 and 162. Referring to FIGS. 15-17, hub 62 includes recesses 96 and 98 to accommodate vacuum and compression release pins 160 and 164, respectively. As with previous embodiments and as shown in FIG. 2, exhaust cam lobe 34 includes recess 100 in which vacuum and compression release cams 102 and 104, located at the ends of vacuum and compression release pins 160 and 164, respectively, are disposed.

Referring to FIG. 15, a tension spring 170 includes coil portion 172 mounted to camshaft gear 28 by fastener 174, such as a rivet or screw, for example, and also includes first arm 176 having coil end 178 in engagement with flyweight 142, and second arm 180, or reaction arm, in abutting engagement with hub 62 of camshaft gear 28. Spring 170 normally biases flyweight 142 to the start position shown in FIG. 16, in which inner radial surface 148 of flyweight 142 abuts hub 62 of compression and vacuum release mechanism 140.

With reference to FIGS. 5, 6A, 6B, 16, and 17, operation of compression and vacuum release mechanism 140 will now be described. Compression and vacuum release mechanism 140 is shown in a first or start position in FIGS. 5, 6A, and 16, which corresponds to engine 10 being stopped or to engine 10 being cranked for starting during which a minimal amount of centrifugal force is imposed upon camshaft 30, camshaft gear 28, and mechanical compression and vacuum release mechanism 140. As shown in FIG. 16, in the start position, spring 170 biases flyweight 142 towards a radially inward position in which inner radial surface 148 of flyweight 142 abuts hub 62, and vacuum and compression release pins 160 and 164 are rotatably oriented within bores 80 and 90 of hub 62 such that vacuum and compression release cams 102 and 104 each extend beyond the base circle of exhaust cam lobe 34, as best shown in FIGS. 5 and 6A. In this position, upon cranking of engine 10, vacuum and compression release cams 102 and 104 will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting.

After engine 10 starts and the rotational speed of camshaft 30 and camshaft gear 28 rapidly increases, a much greater amount of centrifugal force is imposed upon flyweight 142, thereby urging flyweight 142 against the bias of spring 170 centrifugally outwardly in the direction of arrow 182 (FIG. 16) to the position shown in FIGS. 15 and 17, in which radial outer surface 150 is disposed adjacent rim 118 of camshaft gear 28 and stop projection 152 of flyweight 142 is in engagement with rim 118. During rotation of flyweight 142, actuation pins 154 and 156 slide within slots 168 in the directions of arrows 184 and 186 of FIG. 16, respectively. In this position, vacuum release pin 160 and compression release pin 164 are rotated concurrently along with flyweight 142 via the sliding engagement of actuation pins 154 and 156 of flyweight 142 within slots 168 of vacuum and compression release levers 158 and 162, respectively, to the positions shown in FIG. 8, in which the flat surfaces of vacuum and compression release cams 102 and 104 are oriented such that same do not extend beyond the base circle of exhaust cam lobe 34, as shown in FIG. 6B. In this manner, the vacuum and compression release effects are terminated after engine 10 starts and, at engine running speeds, engine 10 operates according to a conventional four-stroke timing sequence.

In alternate embodiments, the compression and vacuum release mechanisms 60a, 60b, and 60c could be configured such that compression release pin 88 is formed as a portion of flyweight 64 and vacuum release pin is formed as a portion of lever 84. Also, compression and vacuum release mechanisms 60a, 60b, 60c, and 140 could be configured such that vacuum and compression release pins 78, 160 and 88, 164 are operably associated with the intake valve of engine 10, or further, by varying the length of vacuum and compression release pins 78, 160 and 88, 164, one pin could be associated with the exhaust valve and the other with the intake valve, if desired.

Referring to FIGS. 18-24, a fifth embodiment of a mechanical compression and vacuum release mechanism of the present invention is shown. The fifth embodiment generally includes compression and vacuum release members in the form of one pin formed as a portion of a flyweight and another pin extending through the camshaft at an angle respective to a longitudinal axis of the camshaft. Compression and vacuum release mechanism 200 extends from the inboard side of camshaft gear 28. Mechanism 200 includes flyweight 202 pivotally mounted to camshaft gear 28 via pin 212. Flyweight 202 generally includes body portion 204 and head portion 206. Body portion 204 comprises most of the mass of flyweight 202 and includes radial inner surface 208 and radial outer surface 210. Radial inner surface 208 of head portion 204 abuts compression release pin head 216 of compression release member or pin 214 (FIGS. 21 and 24) for actuation thereof, as described below. Compression release pin 214 also includes compression release pin shaft 218 and compression release pin end or cam 217, all of which are at least partially received in throughbore 219 which extends through camshaft 30 at an angle with respect to the longitudinal axis of camshaft 30, as shown in FIGS. 21 and 24, wherein the angle between throughbore 219 and camshaft 30 may be formed as a perpendicular arrangement or any other angle.

Mechanical compression and vacuum release mechanism 200 also includes flyweight 220 which is pivotally mounted to camshaft gear 28 via pin 230. Flyweight 220 generally includes body portion 222 and head portion 224 which overlaps a portion of head portion 206 of flyweight 202. Head portion 224 of flyweight 220 and head portion 206 of flyweight 202 are pivotally coupled to one another via connecting pin 236. Body portion 222 comprises most of the mass of flyweight 220 and includes radial inner surface 226 and radial outer surface 228. Head portion 224 includes vacuum release member or pin 232 extending substantially parallel to camshaft 30. Vacuum release pin or cam 232 includes a curved surface and has a generally circular cross-sectional shape. Body portion 222 of flyweight 220 is connected to body portion 204 of flyweight 202 via spring 234 on a side of camshaft 30 opposite pin 236.

Figure 19:
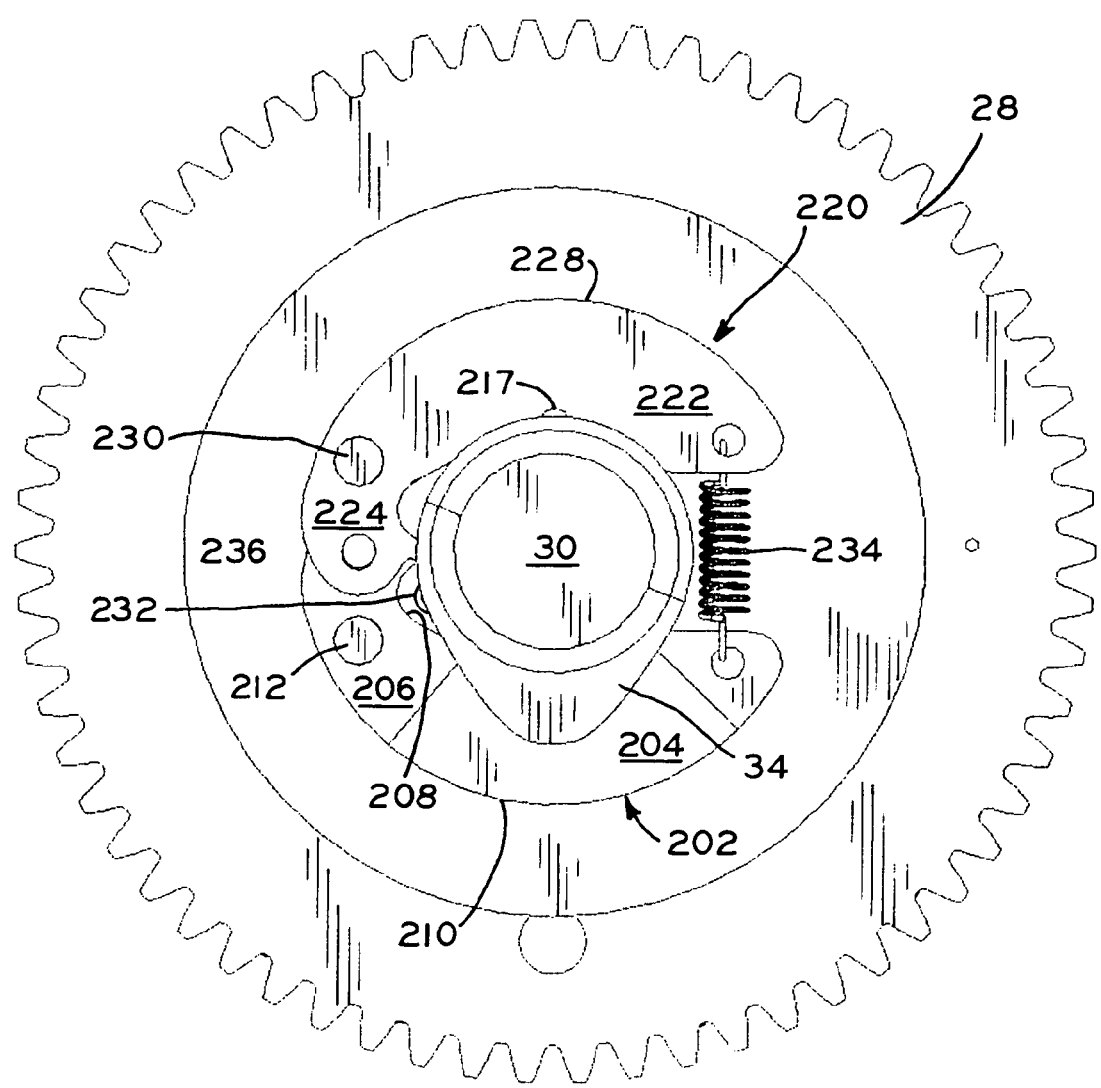
FIG. 19 is an inboard end view of the cam gear of FIG. 18, showing the components of the mechanical compression and vacuum release mechanism of the fifth embodiment in a first or start position.
Figure 20:
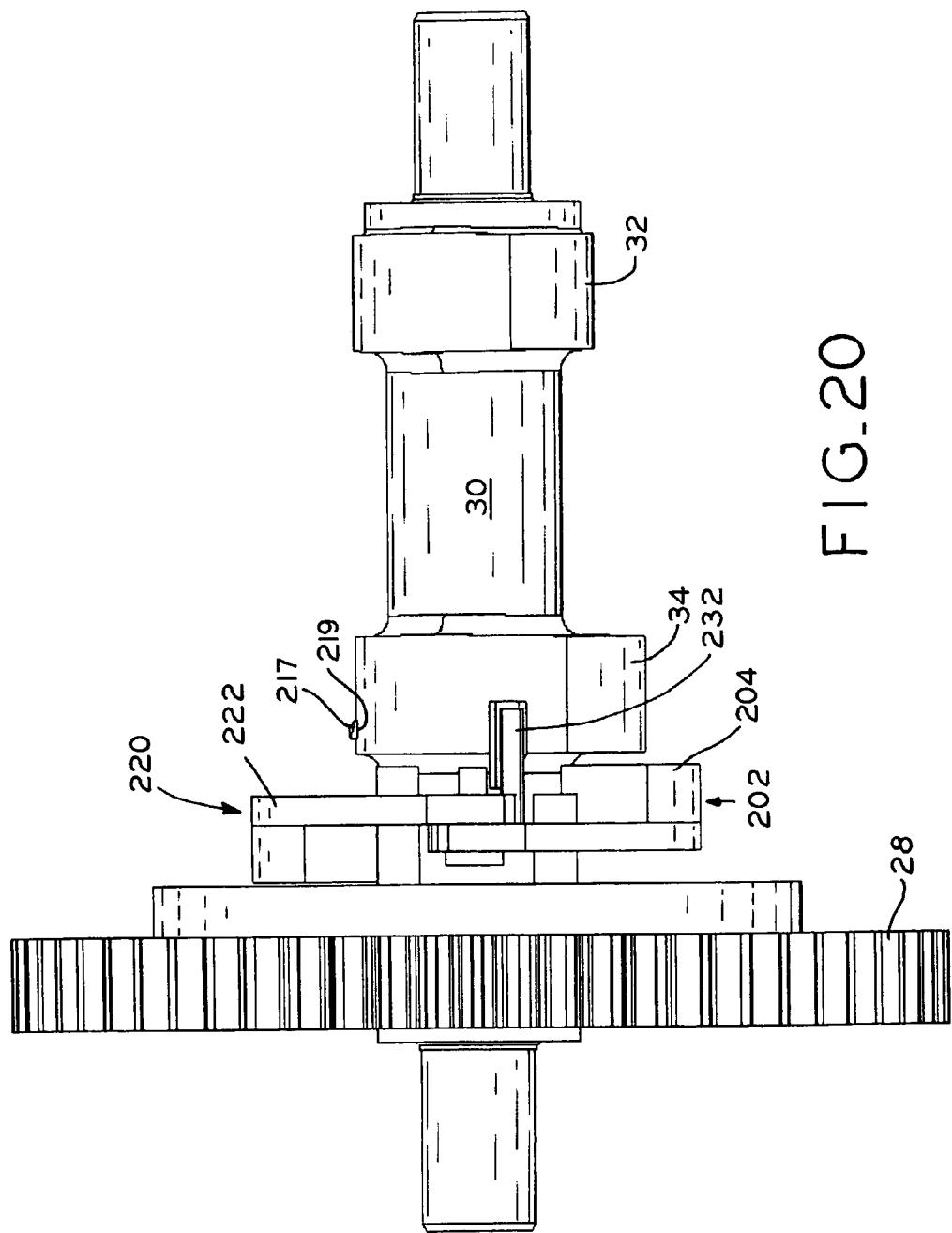
FIG. 20 is an elevational view of the camshaft and cam gear of FIG. 18, showing the components of the mechanical compression and vacuum release mechanism of the fifth embodiment in the first or start position.

Operation of mechanical compression and vacuum release mechanism 200 will now be described. Compression and vacuum release mechanism 200 is shown in a first or start position in FIGS. 18-21, which corresponds to engine 10 being stopped or to engine 10 being cranked for starting during which a minimal amount of centrifugal force is imposed upon camshaft 30, camshaft gear 28, and mechanical compression and vacuum release mechanism 200. As shown in FIG. 19, in the start position, spring 234 biases flyweights 202 and 220 toward a radially inward position in which the inner radial surface 208 of flyweight 202 abuts compression release pin head 216 and forces compression release pin 214 into the position shown in FIG. 21, in which compression release pin end 217 contacts surface 42 of cam follower 38 of exhaust valve 26. In the start position, spring 234 also biases flyweight 220 toward the radially inward position in which the vacuum release pin 232 is rotatably oriented such that vacuum release pin 232 extends beyond the base circle of exhaust cam lobe 34, as shown in FIG. 19. In this position, upon cranking of engine 10, vacuum release pin 232 and compression release pin end 217 will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting.

Figure 22:
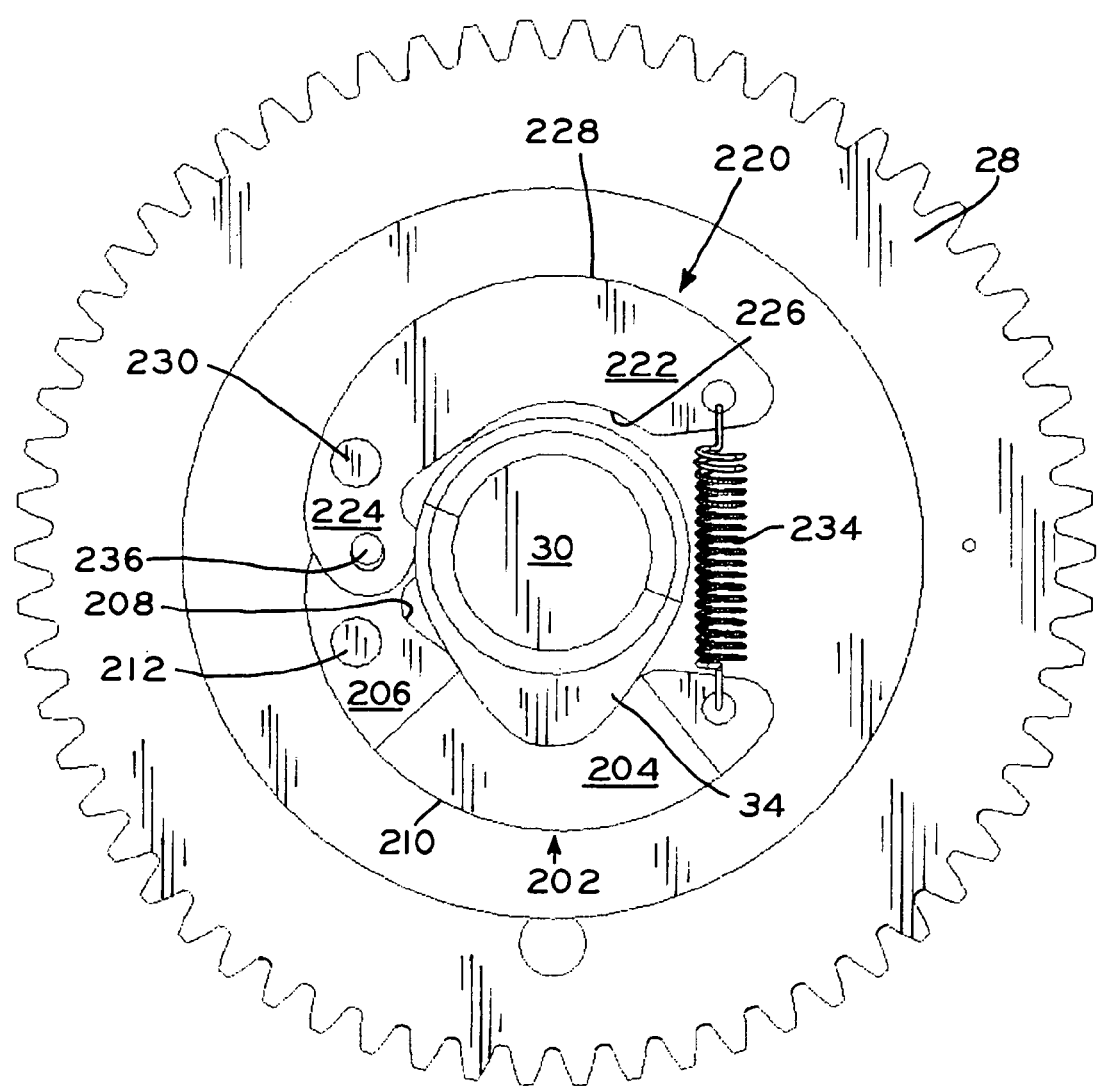
FIG. 22 is an inboard end view of the cam gear of FIG. 18, showing the components of the mechanical compression and vacuum release mechanism of the fifth embodiment in a second or run position.

After engine 10 starts and the rotational speed of camshaft 30 and camshaft gear 28 rapidly increases, a much greater amount of centrifugal force is imposed upon flyweights 220 and 202, thereby urging flyweights 220 and 202 against the bias of spring 234 radially outwardly to the positions shown in FIG. 22. In this position, vacuum release pin 232 is rotated along with flyweight 220, and compression release pin 214 is retracted within throughbore 219 because body portion 204 of flyweight 202 is radially spaced from camshaft 30. Flyweight 202 is radially spaced from camshaft 30 at engine running speeds by centrifugal forces to create a clearance between flyweight 202 and pin 214, thereby retracting compression release pin 214 within throughbore 219 to the position shown in FIGS. 23 and 24. Pin head 216 has a greater mass than the remainder of pin 214 and thus, centrifugal force imparted to camshaft 30 causes the large mass of pin head 216 to move radially outwardly thereby retracting pin 214 within throughbore 219. Once vacuum release pin 232 has rotated along with flyweight 220 and compression release pin 214 has retracted within throughbore 219, vacuum release pin 232 and compression release pin end 217 do not extend beyond the base circle of exhaust cam lobe 34, i.e., the curved surface of pin 232 is substantially flush with, or is disposed within, the base circle of exhaust cam lobe 34, and pin 232 and end 217 thereby will not contact surface 42 of cam follower 38. In this manner, the vacuum and compression release effects are terminated after engine 10 starts and, at running speeds, engine 10 operates according to a conventional four-stroke timing sequence.

Although the fifth embodiment has been described as having a vacuum release member in the form of one pin formed as a portion of a flyweight and having a compression release member in the form of another pin extending through the camshaft at an angle respective to a longitudinal axis of the camshaft, these members may be reversed such that the vacuum release member is in the form of one pin extending through the camshaft at an angle respective to the longitudinal axis of the camshaft and the compression release member is in the form of another pin formed as a portion of a flyweight.

Figure 26:
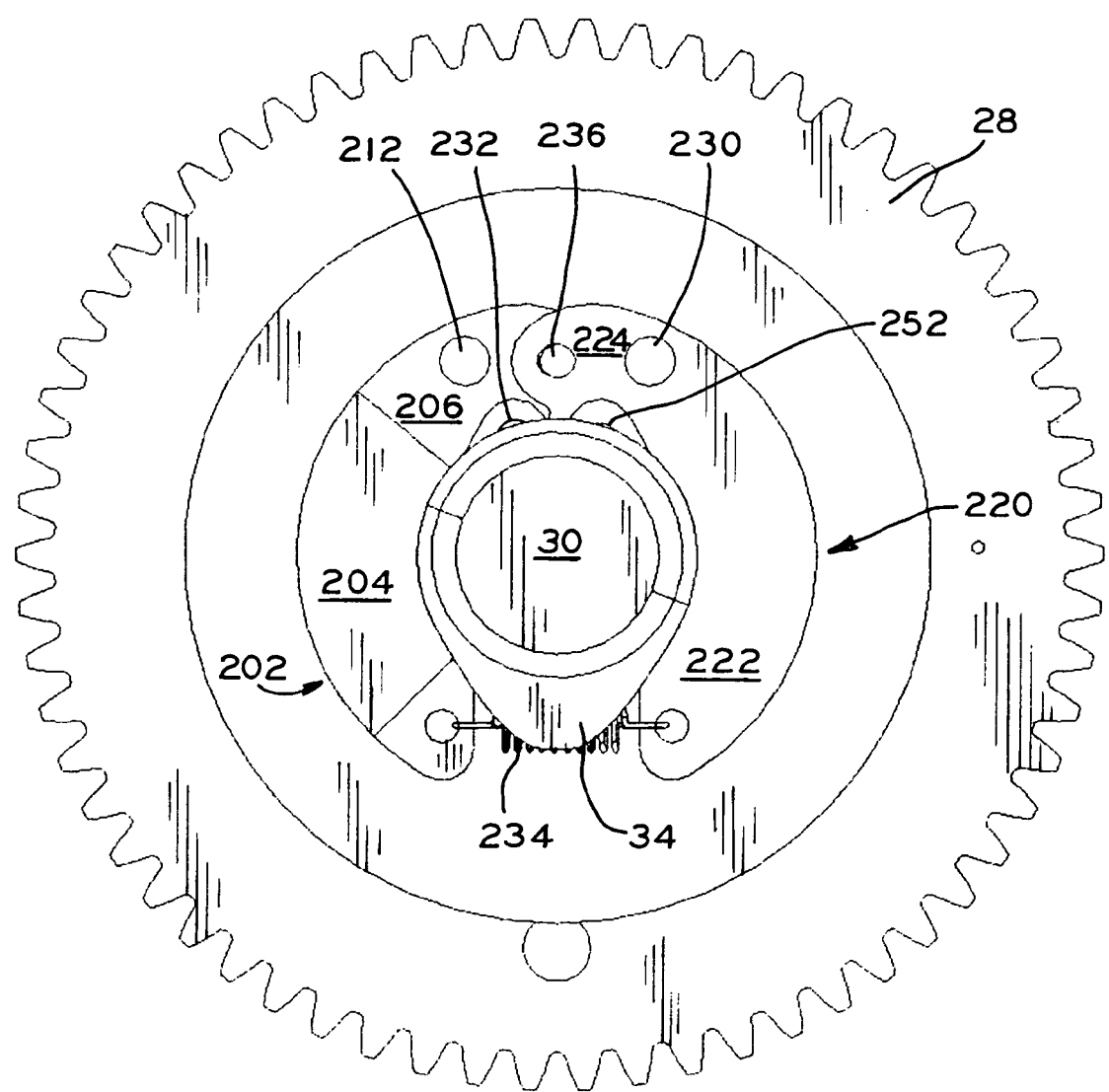
FIG. 26 is an inboard end view of the cam gear of FIG. 25, showing the components of the mechanical compression and vacuum release mechanism of the sixth embodiment in a first or start position.
Figure 27:
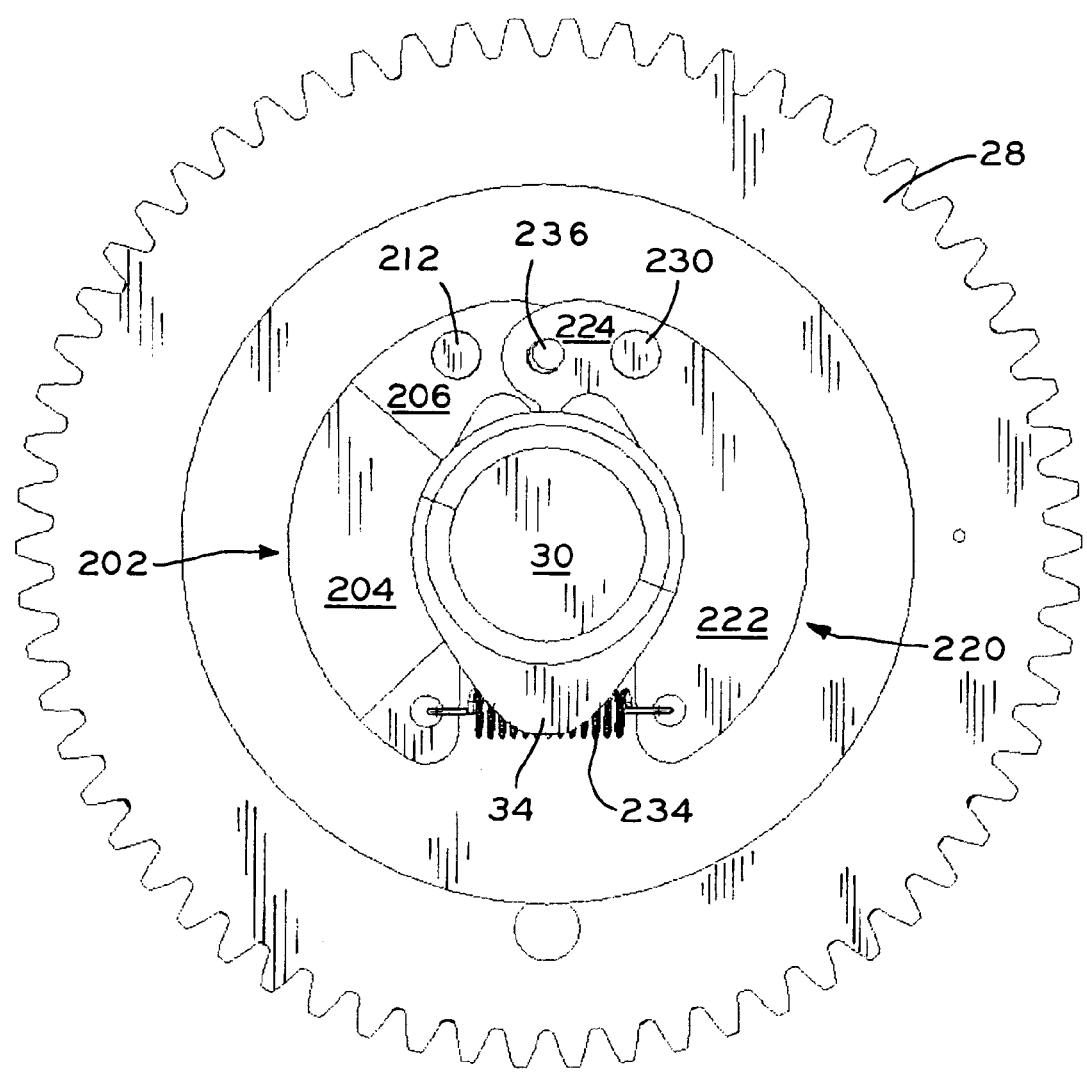
FIG. 27 is an inboard end view of the cam gear of FIG. 25, showing the components of the mechanical compression and vacuum release mechanism of the sixth embodiment in a second or run position.

Referring to FIGS. 25-27, a sixth embodiment of a mechanical compression and vacuum release mechanism of the present invention is shown. The sixth embodiment generally includes compression and vacuum release members in the form of pins formed as portions of a pair of respective flyweights. Mechanical compression and vacuum release mechanism 250 includes several components which are identical or substantially identical to those of mechanical compression and vacuum release mechanism 200 of the fifth embodiment of FIGS. 18-24, and the same reference numerals have been used to identify identical or substantially identical components therebetween. In addition, except as described below with respect to FIGS. 25-27, the operation of mechanical compression and vacuum release mechanism 250 is substantially similar to that of mechanical compression and vacuum release mechanism 200 of the fifth embodiment of FIGS. 18-24.

Flyweight 202 of mechanism 250 includes compression release member or pin 252 positioned near end 206 thereof. Compression release pin or cam 252 has a cross-sectional shape substantially similar to vacuum release pin 232.

Operation of mechanical compression and vacuum release mechanism 250 will now be described. Compression and vacuum release mechanism 250 is shown in a first or start position in FIGS. 25 and 26, which corresponds to engine 10 being stopped or to engine 10 being cranked for starting during which a minimal amount of centrifugal force is imposed upon camshaft 30, camshaft gear 28, and mechanical compression and vacuum release mechanism 250. As shown in FIGS. 25 and 26, in the start position, spring 234 biases flyweights 220 and 202 toward a radially inward position in which compression and vacuum release pins 252 and 232, respectively, are rotatably oriented such that compression and vacuum release pins 252 and 232, respectively, each extend beyond a base circle of exhaust cam lobe 34. In this position, upon cranking of engine 10, compression and vacuum release pins 252 and 232, respectively, will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 is more easily cranked for starting.

After engine 10 starts and the rotational speed of camshaft 30 and camshaft gear 28 rapidly increases, a much greater amount of centrifugal force is imposed upon flyweights 220 and 202, thereby urging flyweights 220 and 202 against the bias of spring 234 radially outward to the positions shown in FIG. 27. In this position, vacuum release pin 232 is rotated along with flyweight 220 and compression release pin 252 is rotated along with flyweight 202 to the positions shown in FIG. 27, in which compression and vacuum release pins 252 and 232, respectively, are oriented such that the same do not extend beyond the base circle of exhaust cam lobe 34, i.e., the surfaces of pins 252 and 232 are substantially flush with, or are disposed within, the base circle of exhaust cam lobe 34, and pins 252 and 232 thereby will not contact surface 42 of cam follower 38. In this manner, the compression and vacuum release effects are terminated after engine 10 starts and, at engine running speeds, engine 10 operates according to a conventional four-stroke timing sequence.

Although the sixth embodiment has been described as having a vacuum release member in the form of one pin formed as a portion of a first flyweight and having a compression release member in the form of another pin formed as a portion of a second flyweight, these members may be reversed such that the vacuum release member is in the form of one pin formed as a portion of the second flyweight and the compression release member is in the form of another pin formed as a portion of the first flyweight.

Referring to FIGS. 28-31, a seventh embodiment of a mechanical compression and vacuum release mechanism of the present invention is shown. The seventh embodiment generally includes compression and vacuum release members in the form of a segment formed with a shaft extending at least partially through the camshaft and one pin extending through the camshaft at an angle respective to a longitudinal axis of the camshaft.

Mechanical compression and vacuum release mechanism 300 includes flyweight 302 pivotally mounted to the inboard side of camshaft gear 28 via pin 305. Flyweight 302 generally includes body portion 304, central portion 306, and extension portion 308. Body portion 304 comprises most of the mass of flyweight 302 and includes radial inner surface 307. Central portion 306 includes two protruding fingers 310 which extend substantially perpendicular to central portion 306 and in a direction generally parallel to camshaft 30. Fingers 310 receive vacuum release actuator 318 of vacuum release subassembly 312 therebetween. Vacuum release subassembly 312 includes plate 313 secured to vacuum release shaft 314 which extends into and is rotatable relative to camshaft 30. Plate 313 of vacuum release subassembly 312 includes segment 315 having vacuum release cam 316. Mechanism 300 also includes compression release member or pin 322. Radial inner surface 307 of head portion 304 of flyweight 302 abuts compression release pin 322 for actuation thereof, as described below. Compression release pin 322 is substantially identical to compression release pin 214, as described above with reference to FIGS. 18-24, and is received in throughbore 326 which may extend through camshaft 30 at an angle relative to the longitudinal axis of camshaft 30, similar to throughbore 219 described above with reference to FIGS. 18-24. Anchor pin 311 is mounted to cam gear 28 and spring 328 is connected between pin 311 and body portion 304 of flyweight 302.

Figure 28A:
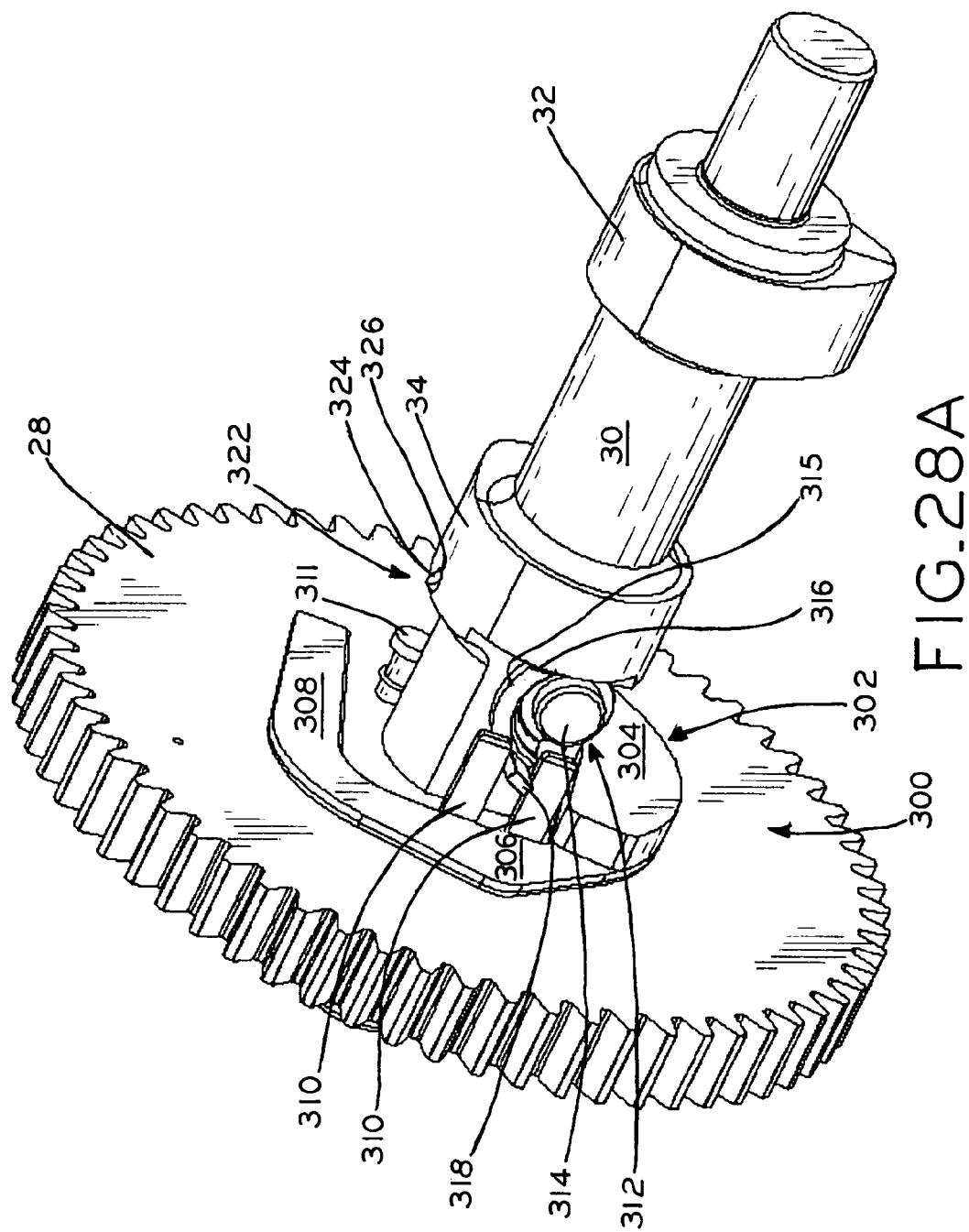
FIG. 28A is a perspective view of the camshaft and cam gear assembly of the engine of FIG. 1, showing components of a mechanical compression and vacuum release mechanism according to a seventh embodiment in a first or start position.
Figure 28B:
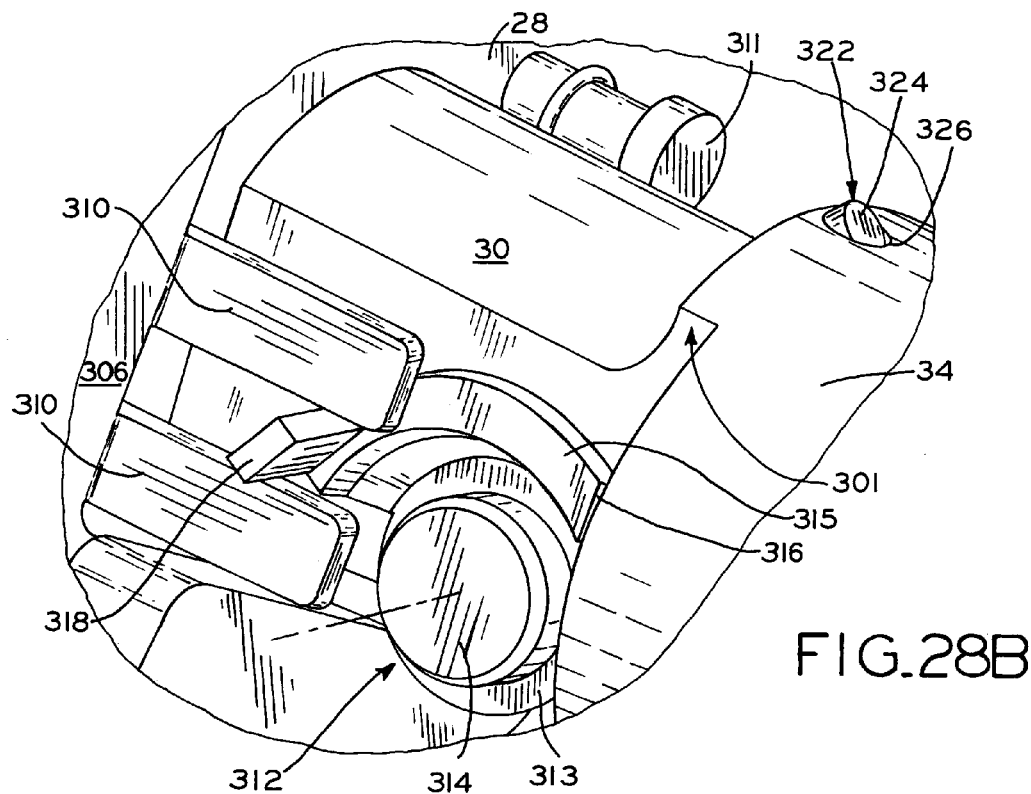
FIG. 28B is a fragmentary perspective view of a portion of the mechanical compression and vacuum release mechanism of FIG. 28A.
Figure 29:
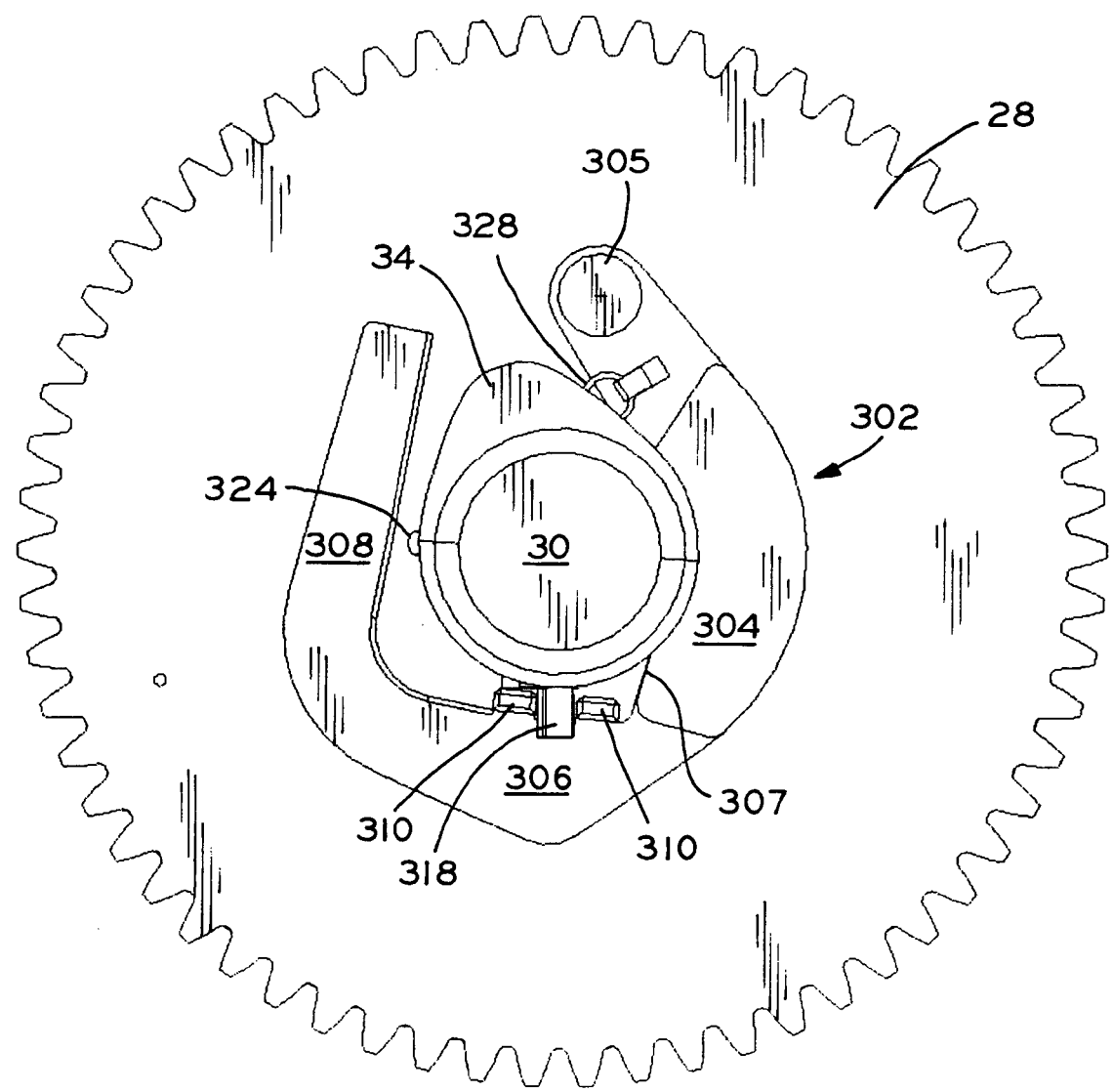
FIG. 29 is an inboard end view of the cam gear of FIG. 28A, showing the components of the mechanical compression and vacuum release mechanism of the seventh embodiment in the first or start position.

Operation of mechanical compression and vacuum release mechanism 300 will now be described. Compression and vacuum release mechanism 300 is shown in a first or start position in FIGS. 28A, 28B, and 29, which corresponds to engine 10 being stopped or to engine 10 being cranked for starting during which a minimal amount of centrifugal force is imposed upon camshaft 30, camshaft gear 28, and mechanical compression and vacuum release mechanism 300. As shown in FIGS. 28A, 28B, and 29, in the start position, spring 328 biases flyweight 302 toward a radially inward position in which the inner radial surface 307 of flyweight 302 abuts compression release pin 322 and forces compression release pin 322 into the position shown in FIGS. 28A, 28B, and 29, in which compression release pin end 324 of compression release pin 322 extends slightly beyond the base circle of exhaust cam lobe 34 and contacts surface 42 of cam follower 38 of exhaust valve 26. Furthermore, when flyweight 302 is in the radially inward position, vacuum release subassembly 312 is rotatably oriented via interaction of vacuum release actuator 318 and fingers 310 such that vacuum release cam 316 extends beyond the base circle of exhaust cam lobe 34. As shown in detail in FIG. 28B, vacuum release cam 316 is situated in cam lobe recess 301 of cam lobe 34 and extends slightly beyond the base circle of exhaust cam lobe 34. In this position, upon cranking of engine 10, compression release pin end 324 and vacuum release cam 316 will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting.

Figure 30B:
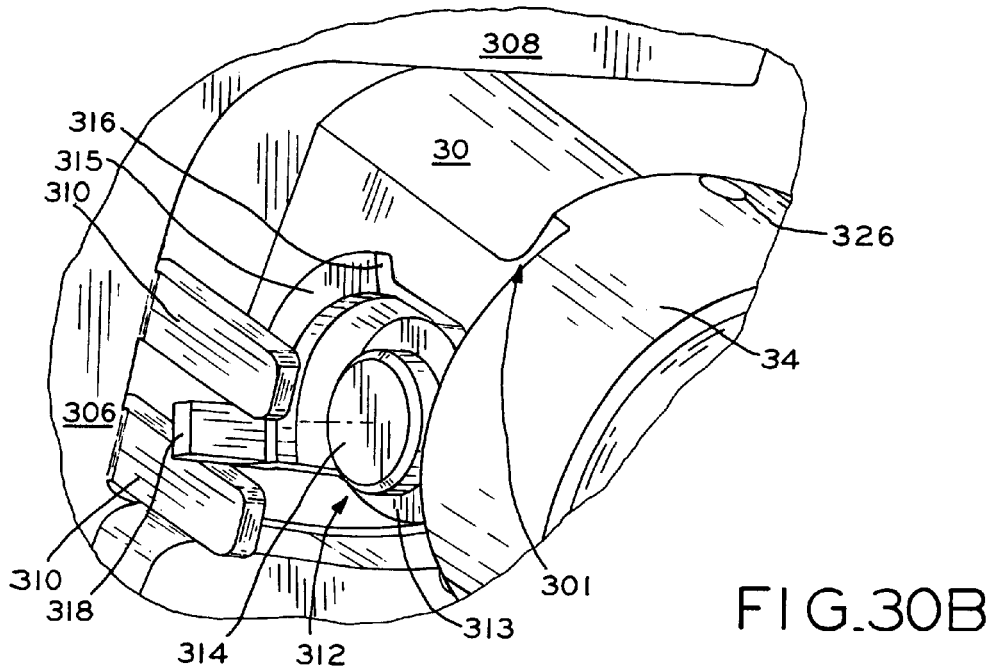
FIG. 30B is a fragmentary perspective view of a portion of the mechanical compression and vacuum release mechanism of FIG. 30A.
Figure 30A:
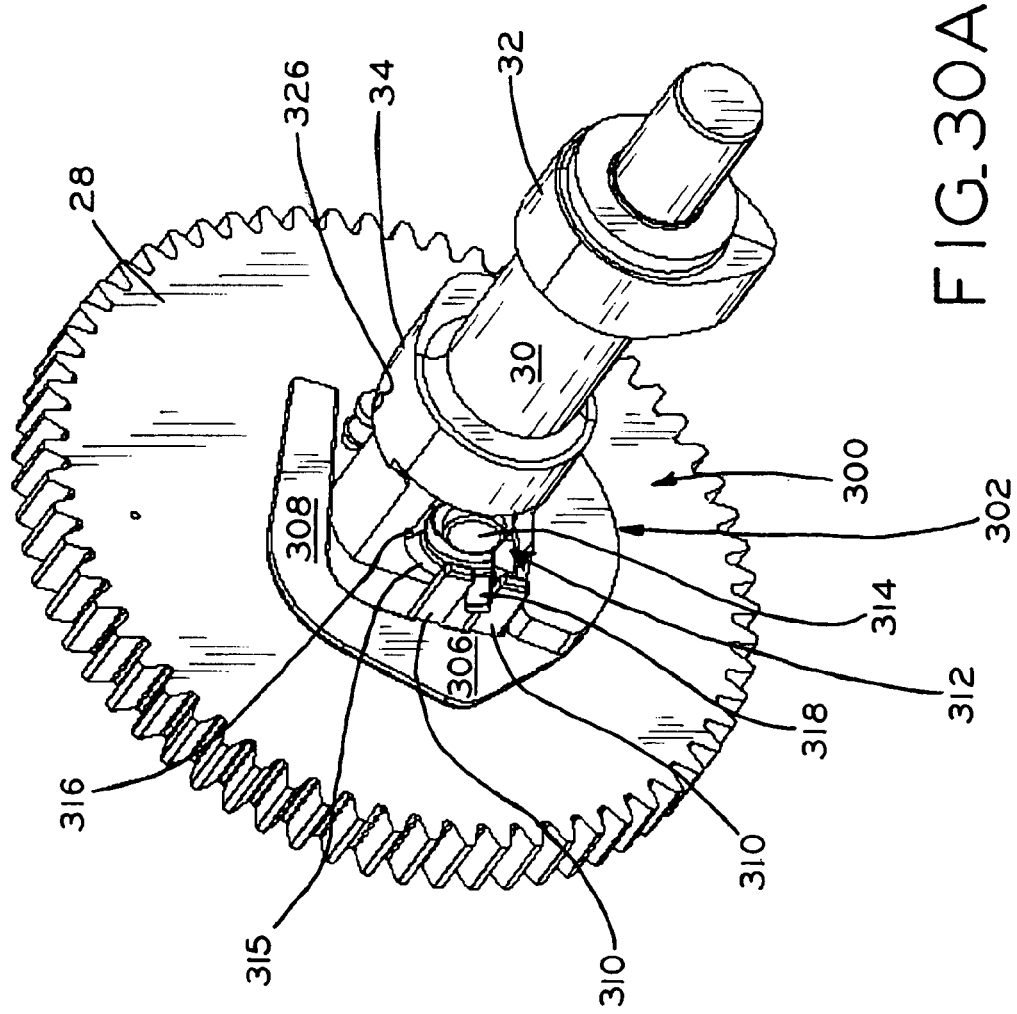
FIG. 30A is a perspective view of the camshaft and cam gear assembly of the engine of FIG. 1, showing components of the mechanical and vacuum release mechanism of the seventh embodiment in a second or run position.

After engine 10 starts and the rotational speed of camshaft 30 and camshaft gear 28 rapidly increases, a much greater amount of centrifugal force is imposed upon flyweight 302, thereby urging flyweight 302 against the bias of spring 328 radially outwardly to the position shown in FIGS. 30A, 30B, and 31. Extension portion 308 of flyweight 302 abuts camshaft 30 to prevent any further radially outward movement of flyweight 302. In this position, the movement of flyweight 302 towards a radially outward position causes rotation of shaft 314 of vacuum release subassembly 312 via interaction of vacuum release actuator 318 and fingers 310. As shown in detail in FIG. 30B, in this position, vacuum release cam 316 shifts out of position within cam lobe recess 301 of cam lobe 34. Furthermore, at engine running speeds, flyweight 302 is radially spaced from camshaft 30 to create a clearance between flyweight 302 and compression release pin 322, thereby permitting compression release pin 322 to be retracted within throughbore 326. Pin 322 includes a heavy mass (not shown) located at the opposite end of pin 322 from pin end 324, similar to pin head 216 (FIGS. 21 and 24), and thus, centrifugal force imparted to camshaft 30 causes the large mass to move radially outwardly thereby retracting pin 322 within throughbore 326 to the position shown in FIGS. 30A, 30B, and 31. Once vacuum release subassembly 312 has rotated and compression release pin 322 has retracted within throughbore 326, vacuum release cam 316 and compression release pin end 324 do not extend beyond the base circle of exhaust cam lobe 34 and thereby will not contact surface 42 of cam follower 38. In this manner, the vacuum and compression release effects are terminated after engine 10 starts and, at running speeds, engine 10 operates according to a conventional four-stroke timing sequence.

Although the seventh embodiment has been described as having a vacuum release member in the form of a segment formed with a shaft extending at least partially through the camshaft and having a compression release member in the form of one pin extending through the camshaft at an angle respective to a longitudinal axis of the camshaft, these members may be reversed such that the vacuum release member is in the form of one pin extending through the camshaft at an angle respective to a longitudinal axis of the camshaft and the compression release member is in the form of a segment formed with a shaft extending at least partially through the camshaft.

Referring to FIGS. 32-37, an eighth embodiment of a mechanical compression and vacuum release mechanism of the present invention is shown. The eighth embodiment generally includes compression and vacuum release members in the form of segments formed as part of a shaft extending through the camshaft. Mechanical compression and vacuum release mechanism 350 includes several components which are identical or substantially identical to those of mechanical compression and vacuum release mechanism 300 of the seventh embodiment of FIGS. 28-31, and the same reference numerals have been used to identify identical or substantially identical components therebetween. In addition, except as described below with respect to FIGS. 32-37, the operation of mechanical compression and vacuum release mechanism 350 is substantially similar to that of mechanical compression and vacuum release mechanism 300 of FIGS. 28-31.

In the eighth embodiment, shaft 314 of vacuum release subassembly 312 extends completely through camshaft 30 and further includes compression release plate 354 located on an opposite end of shaft 314 relative to plate 313. Compression release subassembly 352 includes plate 354 with compression release segment 355 having compression release cam 356.

Figure 32B:
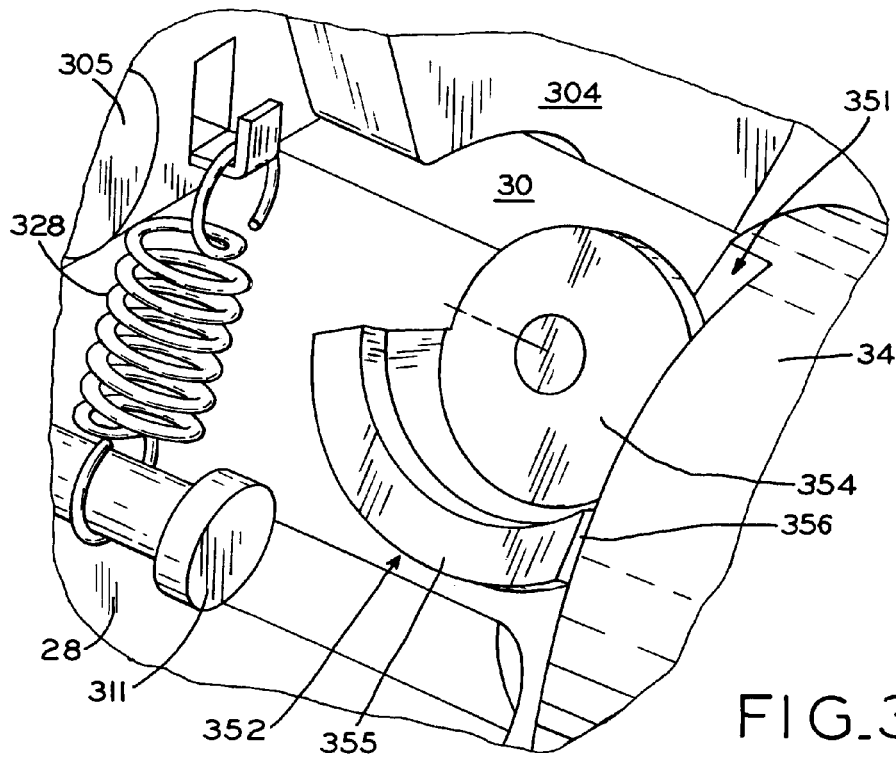
FIG. 32B is a fragmentary perspective view of a portion of the mechanical compression and vacuum release mechanism of FIG. 32A.
Figure 33:
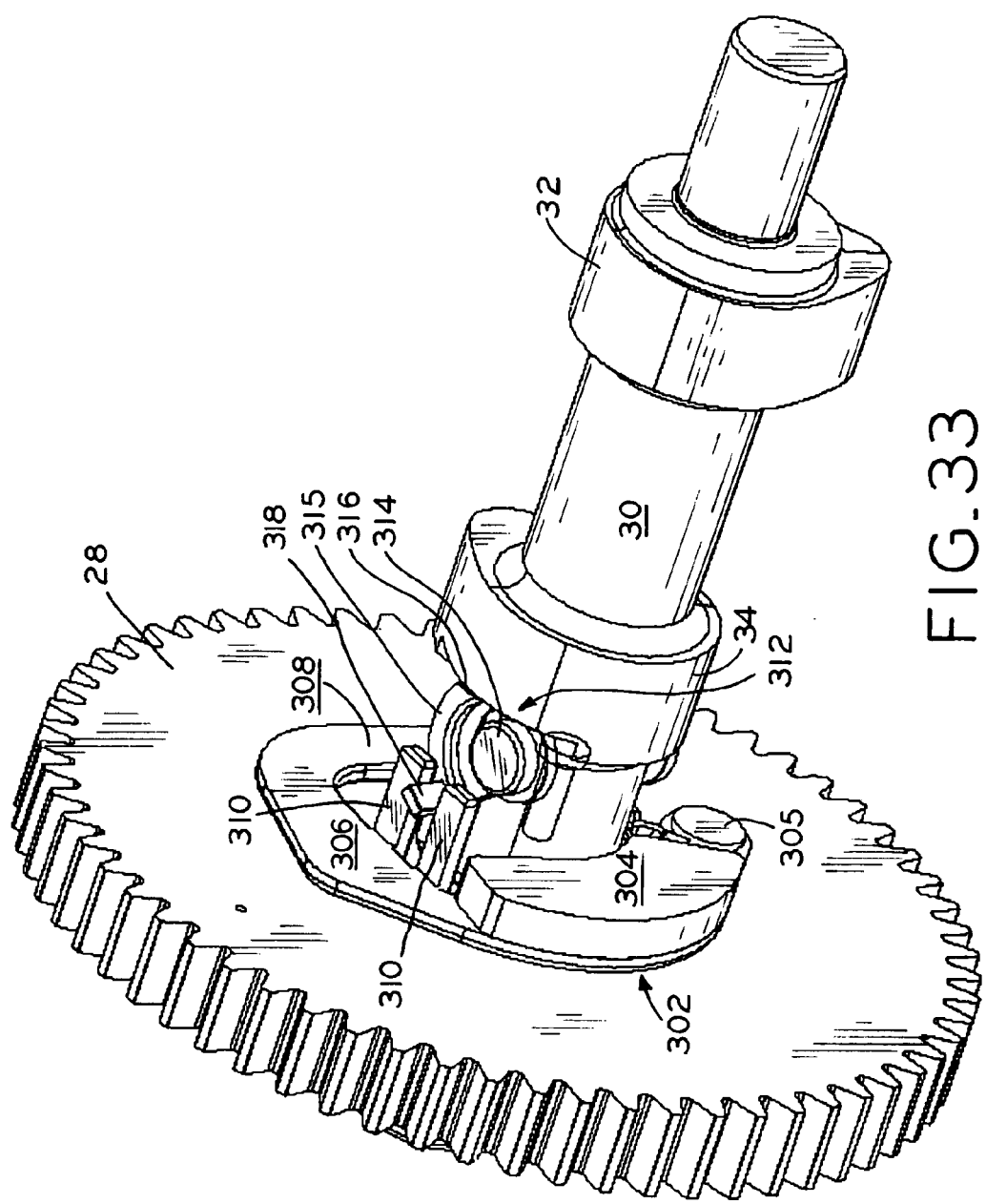
FIG. 33 is a perspective view of the camshaft and cam gear assembly of the engine of FIG. 1, showing additional components of the mechanical compression and vacuum release mechanism according to the eighth embodiment in the first or start position.
Figure 34:
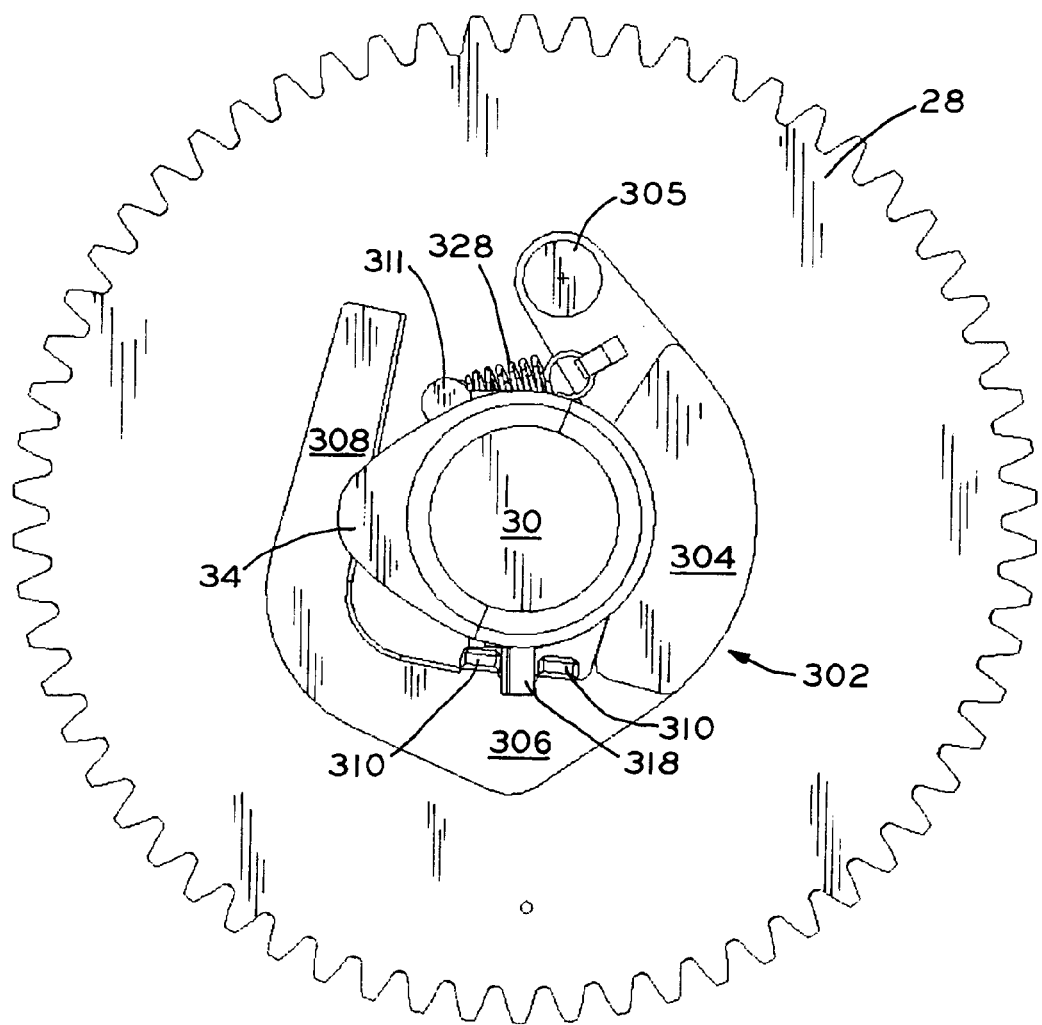
FIG. 34 is an inboard end view of the cam gear of FIGS. 32A and 33, showing the components of the mechanical compression and vacuum release mechanism of the eighth embodiment in the first or start position.

Operation of mechanical compression and vacuum release mechanism 350 will now be described. Compression and vacuum release mechanism 350 is shown in a first or start position in FIGS. 32-34, which corresponds to engine 10 being stopped or to engine 10 being cranked for starting during which a minimal amount of centrifugal force is imposed upon camshaft 30, camshaft gear 28, and mechanical compression and vacuum release mechanism 350. As shown in FIGS. 32-34, in the start position, spring 328 biases flyweight 302 toward a radially inward position which causes rotation of shaft 314 of vacuum release subassembly 312 via interaction of vacuum release actuator 318 and fingers 310. In this position, vacuum release subassembly 312 is rotatably oriented such that vacuum release cam 316 extends beyond the base circle of exhaust cam lobe 34 (see FIG. 28B). Also, in this position, compression release plate 354 is rotatably oriented such that compression release cam 356 extends beyond the base circle of exhaust cam lobe 34. As shown in detail in FIG. 32B, compression release cam 356 is situated in cam lobe recess 351 of cam lobe 34 and extends slightly beyond the base circle of exhaust cam lobe 34. In this position, upon cranking of engine 10, compression and vacuum release cams 356 and 316, respectively, will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting.

Figure 36B:
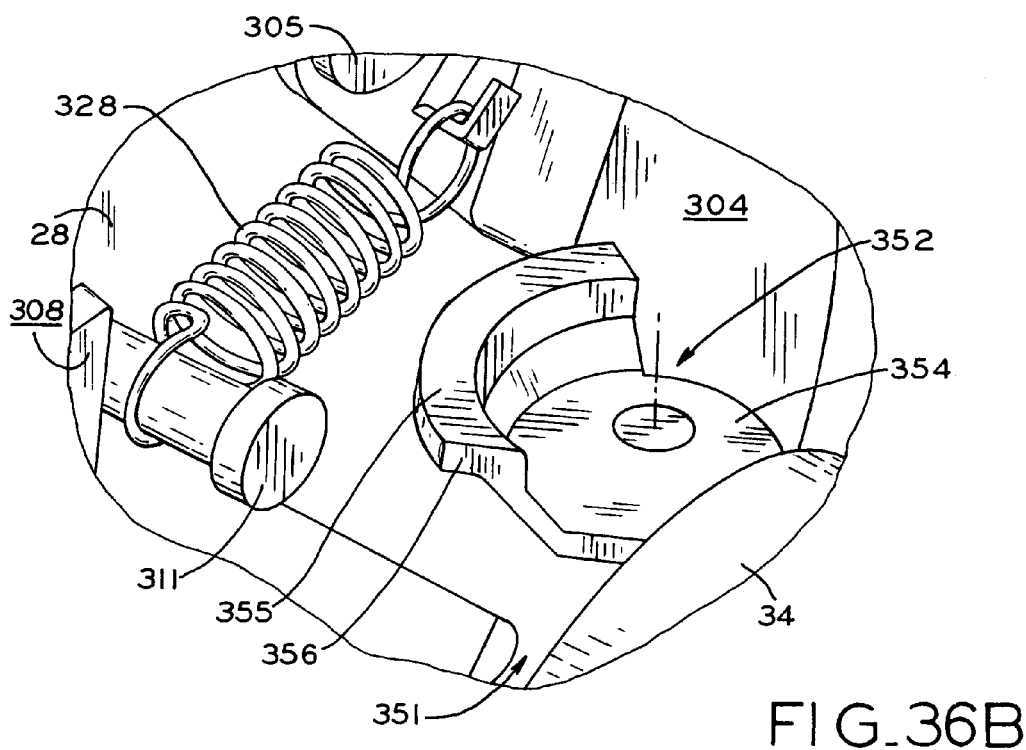
FIG. 36B is a fragmentary perspective view of a portion of the mechanical compression and vacuum release mechanism of FIG. 36A.
Figure 36A:
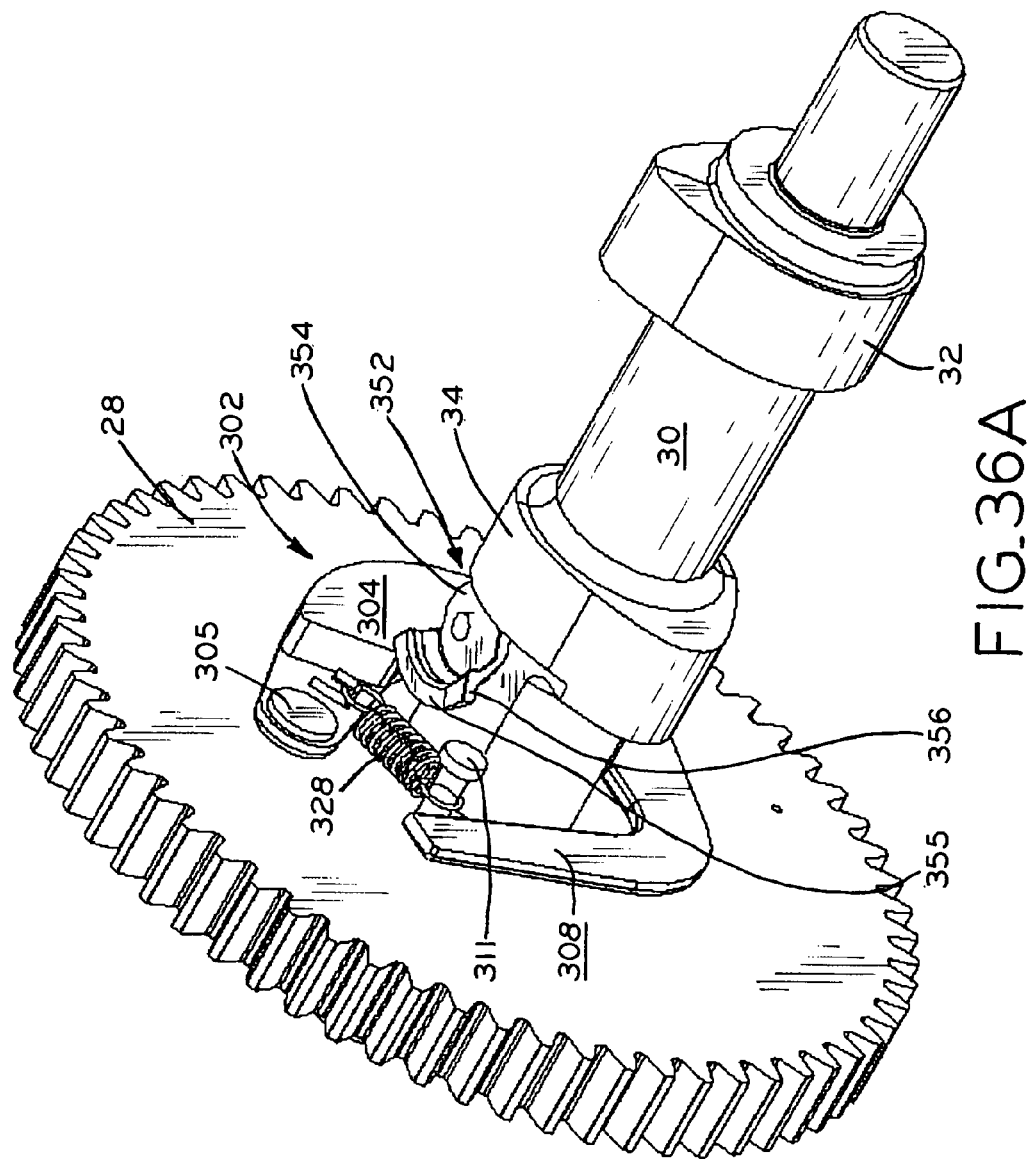
FIG. 36A is a perspective view of the camshaft and cam gear assembly of the engine of FIG. 1, showing additional components of the mechanical compression and vacuum release mechanism according the eighth embodiment in the second or run position.
Figure 37:
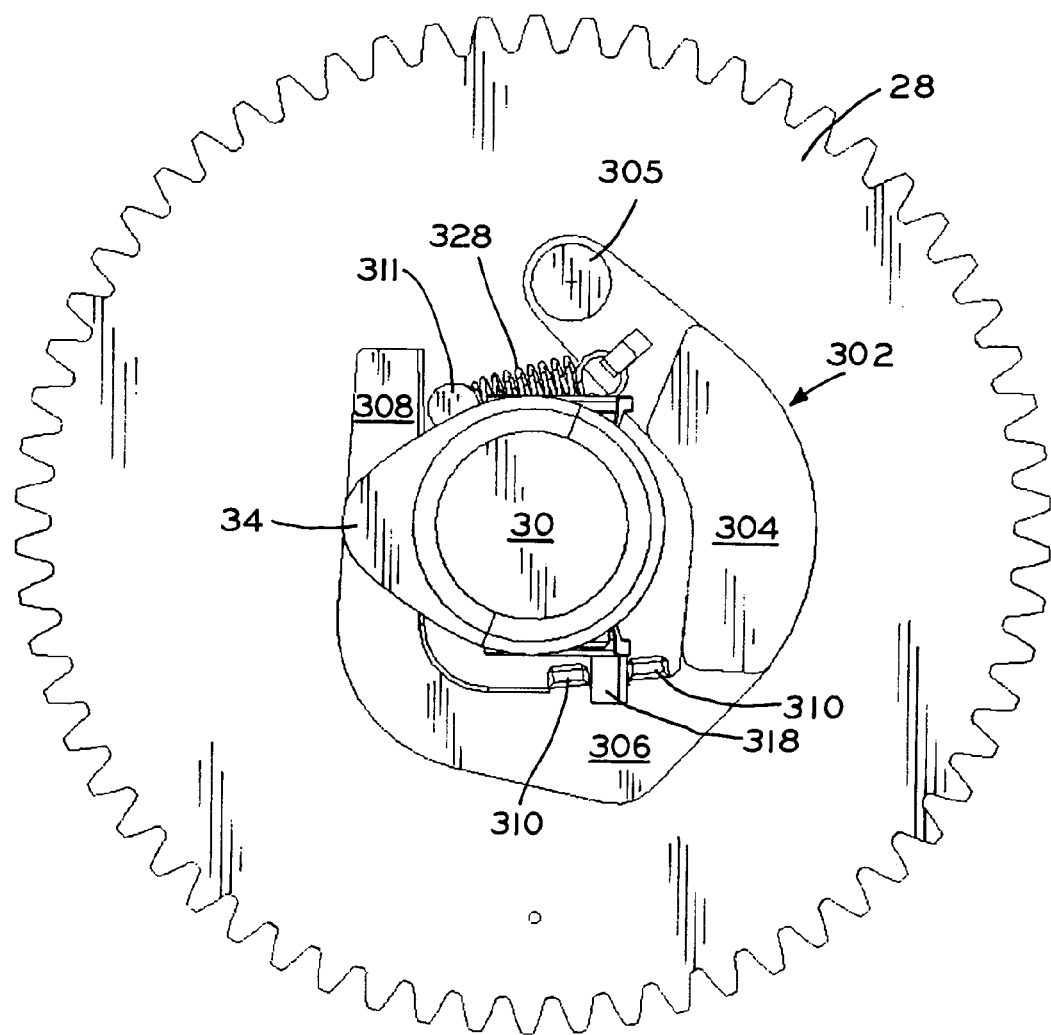
FIG. 37 is an inboard end view of the cam gear of FIGS. 35 and 36A, showing the components of the mechanical compression and vacuum release mechanism of the eighth embodiment in the second or run position.

After engine 10 starts and the rotational speed of camshaft 30 and camshaft gear 28 rapidly increases, a much greater amount of centrifugal force is imposed upon flyweight 302, thereby urging flyweight 302 against the bias of spring 328 radially outwardly to the position shown in FIGS. 35-37. Extension portion 308 of flyweight 302 abuts camshaft 30 to prevent any further radially outward movement of flyweight 302. In this position, vacuum release subassembly 312 and compression release subassembly 352 are rotated via shaft 314 through the interaction of vacuum release actuator 318 and fingers 310. Once shaft 314, and, consequently, plates 313 and 354, have rotated, vacuum release cam 316 (see FIG. 30B) and compression release cam 356 do not extend beyond the base circle of exhaust cam lobe 34 and thereby will not contact surface 42 of cam follower 38. As shown in detail in FIG. 36B, in this position, compression release cam 356 shifts out of position within cam lobe recess 351 of cam lobe 34. In this manner, the vacuum and compression release effects are terminated after engine 10 starts and, at running speeds, engine 10 operates according to a conventional four-stroke timing sequence.

Although the eighth embodiment has been described as having a vacuum release member in the form of a first segment formed as part of a shaft extending through the camshaft and a compression release member in the form of a second segment formed as part of a shaft extending through the camshaft, these members may be reversed such that the vacuum release member is in the form of the second segment and the compression release member is in the form of the first segment.

Referring to FIGS. 38-43, a ninth embodiment of a mechanical compression and vacuum release mechanism of the present invention is shown. The ninth embodiment generally includes compression and vacuum release members in the form of pins extending through the camshaft at an angle respective to a longitudinal axis of the camshaft.

Mechanical compression and vacuum release mechanism 400 includes flyweight 402 pivotally mounted to the inboard side of camshaft gear 28 via pin 405. Flyweight 402 generally includes body portion 404. Body portion 404 comprises most of the mass of flyweight 402 and includes radial inner surface 407. Mechanism 400 also includes compression release member or pin 422 and vacuum release member or pin 424. Radial inner surface 407 of body portion 404 of flyweight 402 abuts compression release pin 422 and vacuum release pin 424 for actuation thereof, as described below. Compression release pin 422 and vacuum release pin 424 are substantially identical to compression release pin 214, as described above with reference to FIGS. 18-24, and are received in throughbores 426 and 428, respectively, which may extend through camshaft 30 at an angle relative to the longitudinal axis of camshaft 30, similar to throughbore 219 described above with reference to FIGS. 18-24. Anchor pin 411 is mounted to cam gear 28 and spring 429 is connected between pin 411 and body portion 404 of flyweight 402.

Figure 38:
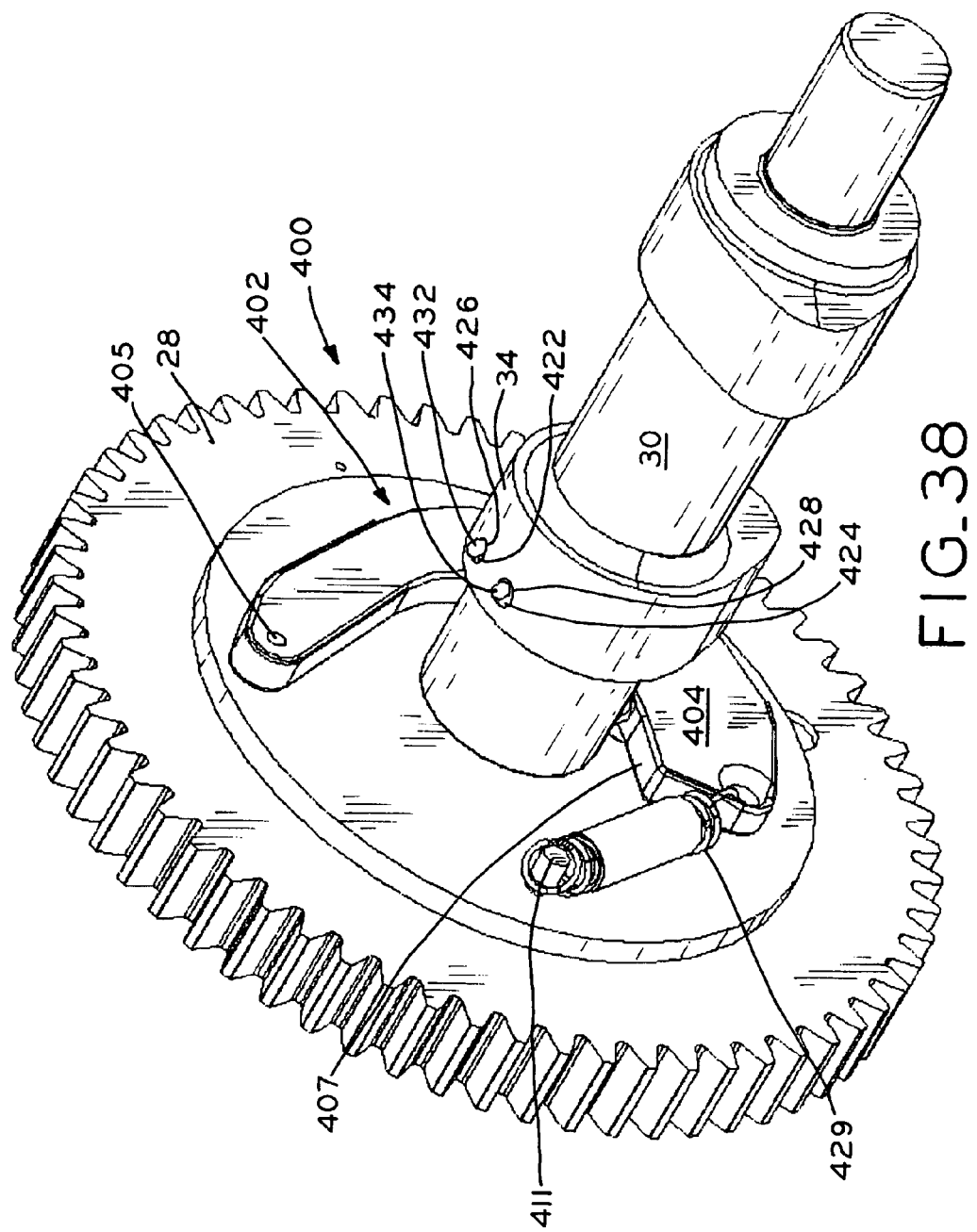
FIG. 38 is a perspective view of the camshaft and cam gear assembly of the engine of FIG. 1, showing components of a mechanical compression and vacuum release mechanism according to a ninth embodiment in a first or start position.
Figure 39:
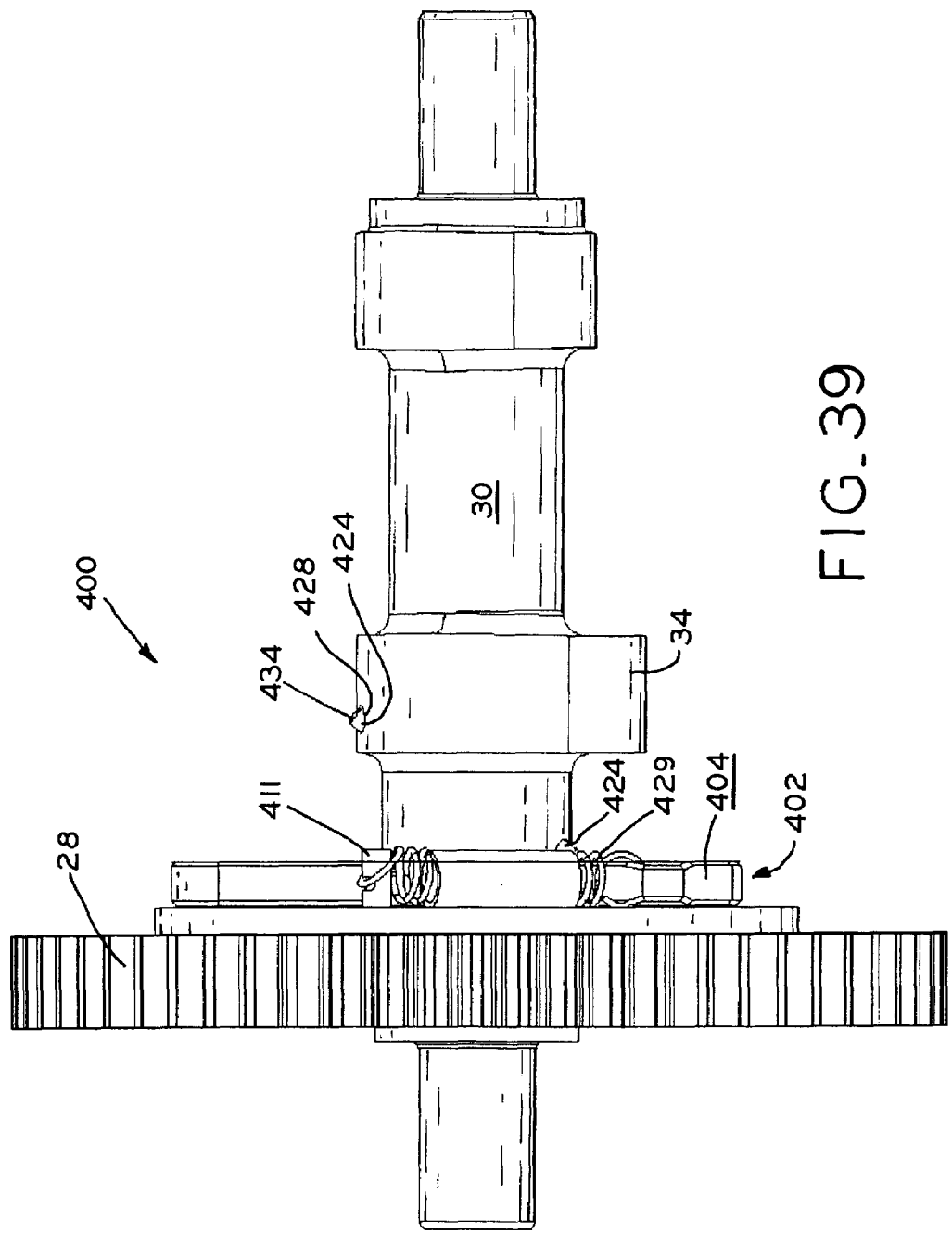
FIG. 39 is an elevational view of the cam gear of FIG. 38, showing components of the mechanical compression and vacuum release mechanism of the ninth embodiment in the first or start position.
Figure 40:
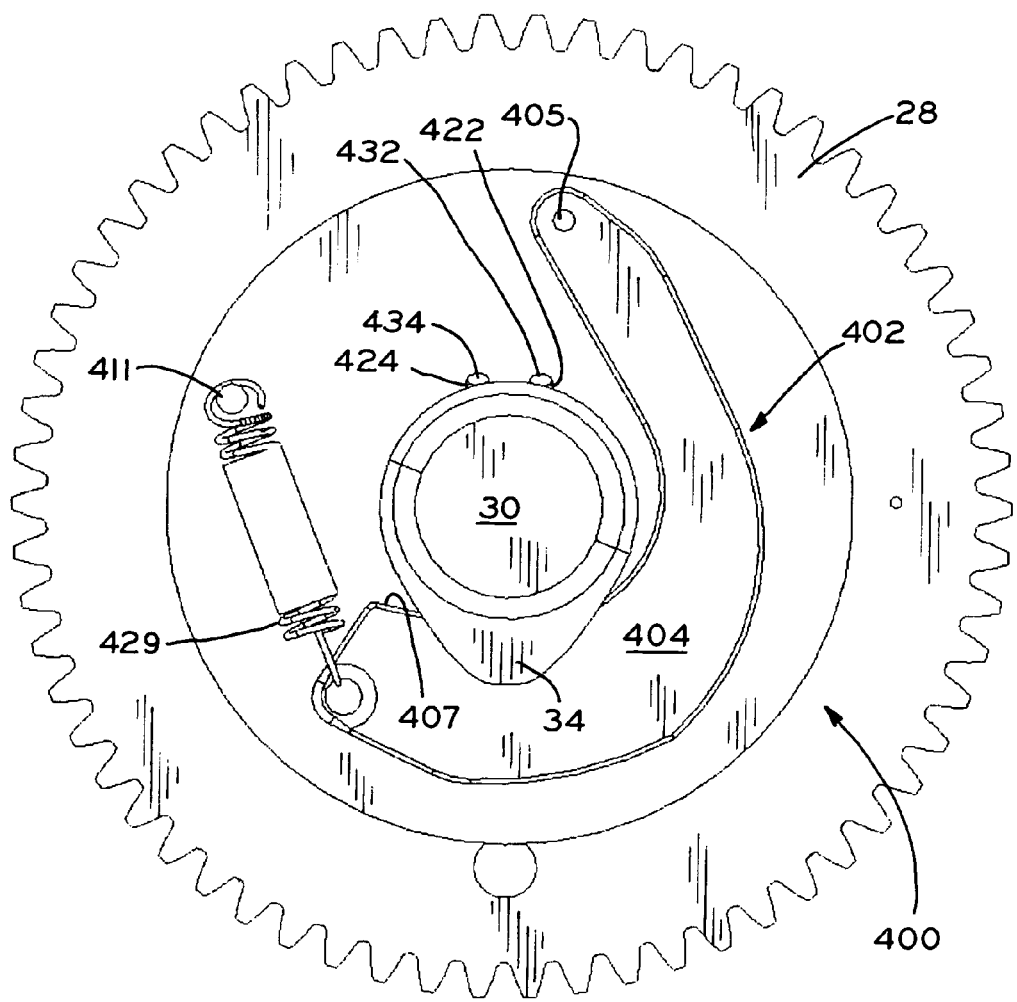
FIG. 40 is an inboard end view of the cam gear of FIG. 38, showing the components of the mechanical compression and vacuum release mechanism of the ninth embodiment in the first or start position.

Operation of mechanical compression and vacuum release mechanism 400 will now be described. Compression and vacuum release mechanism 400 is shown in a first or start position in FIGS. 38-40, which corresponds to engine 10 being stopped or to engine 10 being cranked for starting during which a minimal amount of centrifugal force is imposed upon camshaft 30, camshaft gear 28, and mechanical compression and vacuum release mechanism 400. As shown in FIGS. 38-40, in the start position, spring 429 biases flyweight 402 toward a radially inward position in which the inner radial surface 407 of flyweight 402 abuts compression release pin 422 and vacuum release pin 424 and forces pins 422 and 424 into the positions shown in FIGS. 38-40, in which compression release pin end 432 of compression release pin 422 and vacuum release pin end 434 of vacuum release pin 424 extend slightly beyond the base circle of exhaust cam lobe 34 and contacts surface 42 of cam follower 38 of exhaust valve 26. In this position, upon cranking of engine 10, compression release pin end 432 and vacuum release pin end 434 will each contact surface 42 of cam follower 38 of exhaust valve 26 to slightly open exhaust valve 26 as piston 14 is retreating from, and extending toward, its TDC position, respectively, in order to vent combustion chamber 20. In this manner, engine 10 may be more easily cranked for starting.

Figure 41:
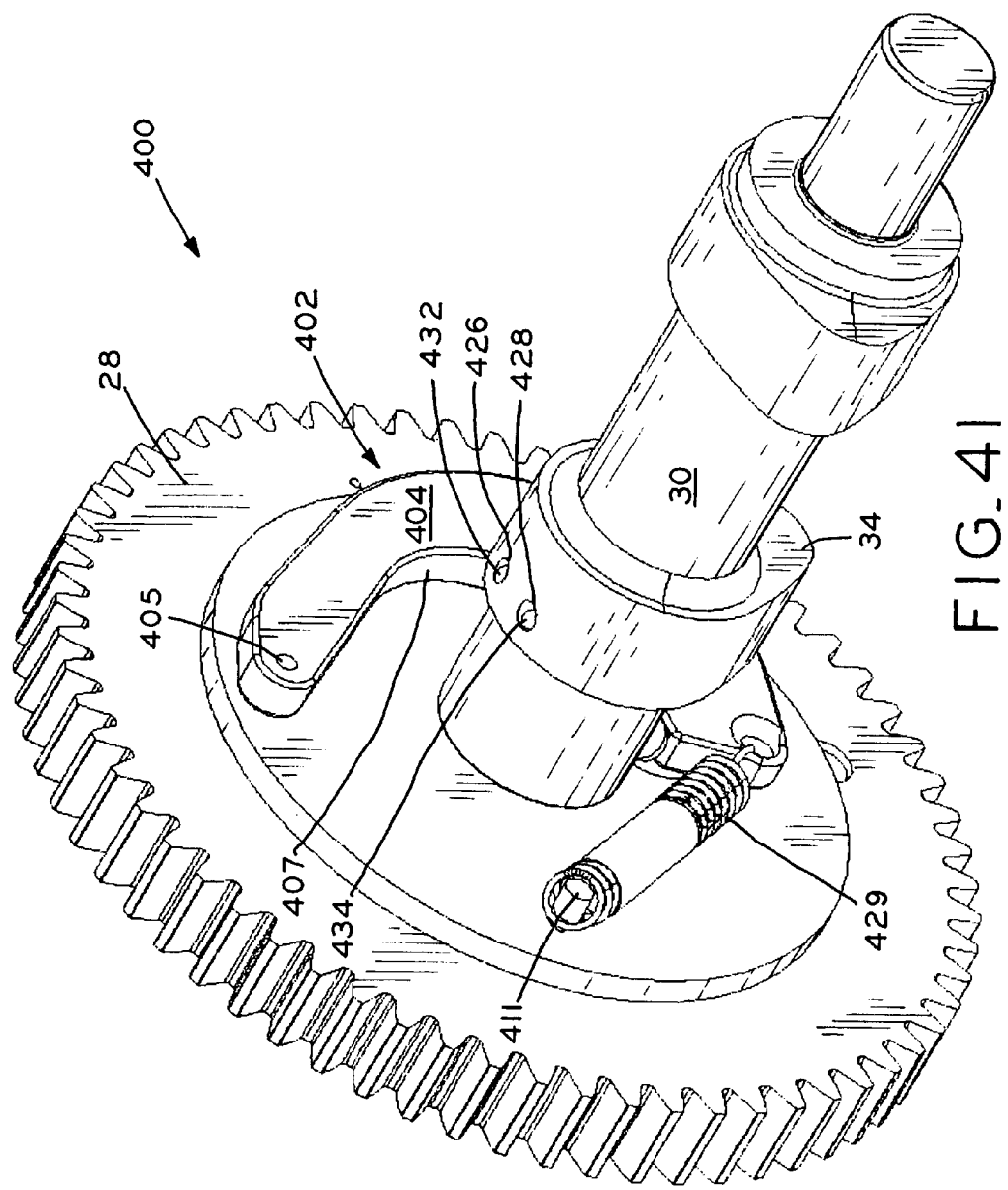
FIG. 41 is a perspective view of the cam gear of FIG. 38, showing components of the mechanical compression and vacuum release mechanism of the ninth embodiment in a second or run position.
Figure 42:
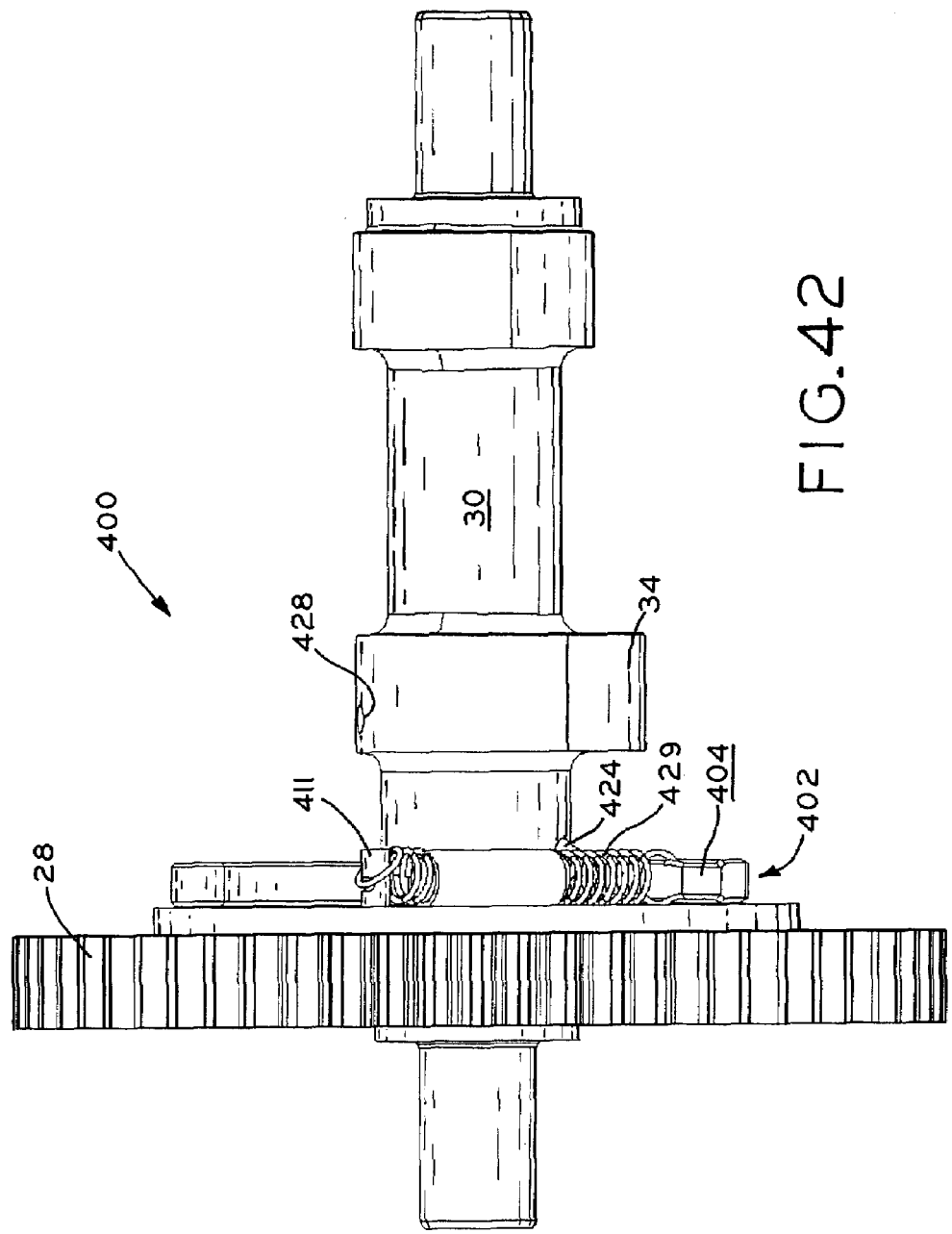
FIG. 42 is an elevational view of the cam gear of FIG. 38, showing components of the mechanical compression and vacuum release mechanism of the ninth embodiment in the second or run position.
Figure 43:
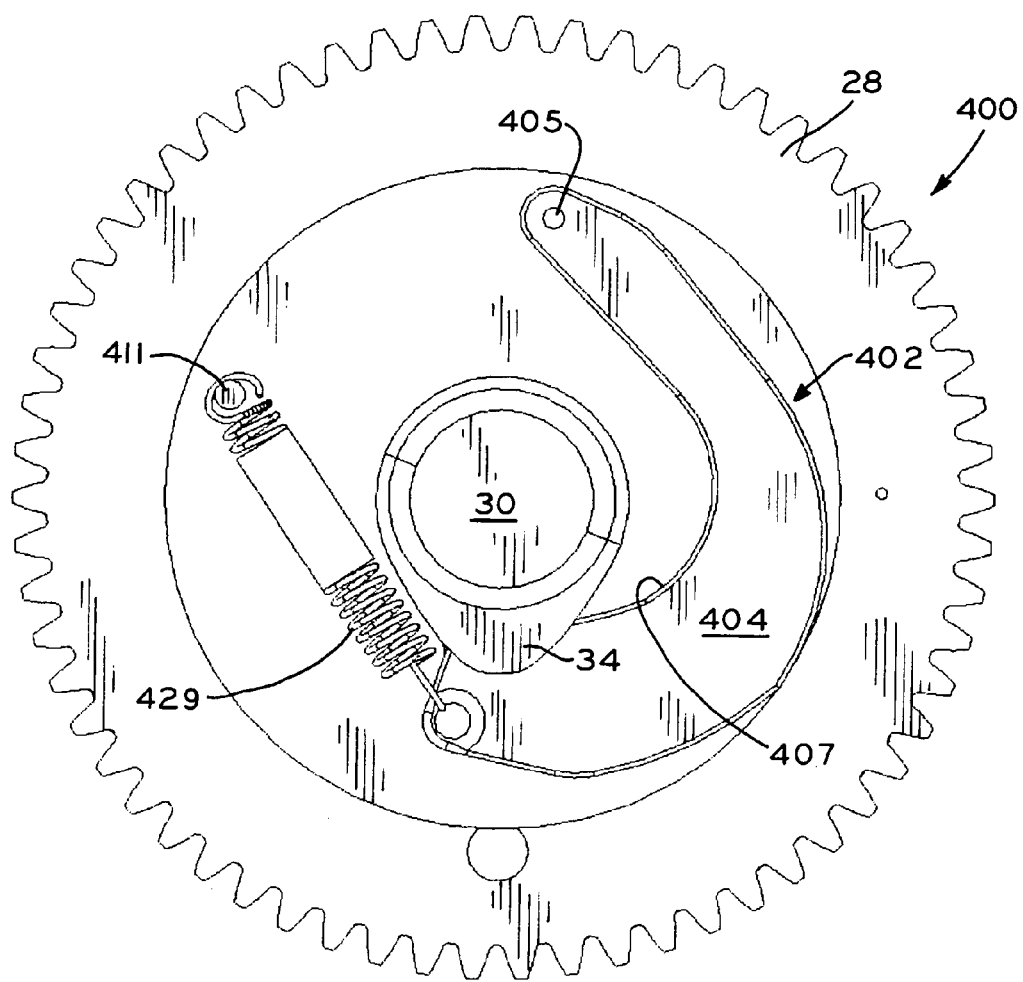
FIG. 43 is an inboard end view of the cam gear of FIG. 38, showing the components of the mechanical compression and vacuum release mechanism of the ninth embodiment in the second or run position.

After engine 10 starts and the rotational speed of camshaft 30 and camshaft gear 28 rapidly increases, a much greater amount of centrifugal force is imposed upon flyweight 402, thereby urging flyweight 402 against the bias of spring 429 radially outwardly to the position shown in FIGS. 41-43. At engine running speeds, flyweight 402 is radially spaced from camshaft 30 to create a clearance between flyweight 402 and compression release pin 422 and vacuum release pin 424, thereby permitting compression release pin 422 to be retracted within throughbore 426 and vacuum release pin 424 to be retracted within throughbore 428. Pins 422 and 424 each include a heavy mass (not shown) located at the opposite end of pins 422 and 424 from pin ends 432 and 434, respectively, similar to pin head 216 (FIGS. 21 and 24), and thus, centrifugal force imparted to camshaft 30 causes the large mass to move radially outwardly thereby retracting pins 422 and 424 within throughbores 426 and 428, respectively, to the positions shown in FIGS. 41-43. Once compression release pin 422 has retracted within throughbore 426 and vacuum release pin 424 has retracted within throughbore 428, compression release pin end 432 and vacuum release pin end 434 do not extend beyond the base circle of exhaust cam lobe 34 and thereby will not contact surface 42 of cam follower 38. In this manner, the vacuum and compression release effects are terminated after engine 10 starts and, at running speeds, engine 10 operates according to a conventional four-stroke timing sequence.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An internal combustion engine, comprising:
an engine housing;
a crankshaft rotatably supported within said engine housing;
a piston coupled to said crankshaft for reciprocation within a cylinder bore between top dead center and bottom dead center positions;
a combustion chamber defined between said piston and said engine housing, said combustion chamber having a relatively smaller volume when said piston is in said top dead center position and a relatively larger volume when said piston is in said bottom dead center position;
a camshaft driven from said crankshaft, said camshaft including a pair of cam lobes periodically engaging valve actuation structure associated with a pair of intake and exhaust valves; and
a compression and vacuum release mechanism, comprising:
a pair of movable flyweights; and a compression release member and a vacuum release member respectively coupled to said flyweights, said compression release member including a compression release cam and said vacuum release member including a vacuum release cam;

said flyweights movable responsive to centrifugal forces between a first position corresponding to engine cranking speeds in which said compression and vacuum release cams are each positioned for operative engagement with said valve actuation structure and a second position corresponding to engine running speeds in which said compression and vacuum release cams are each positioned out of operative engagement with said valve actuation structure, and wherein in said first position, said compression release cam engages said valve actuation structure as said piston moves toward said top dead center position and said vacuum release cam engages said valve actuation structure as said piston moves toward said bottom dead center position.

2. The internal combustion engine of claim 1, wherein said camshaft includes a cam gear, said flyweights pivotally mounted to said cam gear.

3. The internal combustion engine of claim 1, wherein one of said compression and vacuum release members is integrally formed with one of said flyweights.

4. The internal combustion engine of claim 3, wherein one of said compression and vacuum release members extends substantially parallel to said camshaft.

5. The internal combustion engine of claim 3, wherein the other of said compression and vacuum release members is integrally formed with the other of said flyweights.

6. The internal combustion engine of claim 5, wherein both said compression and vacuum release members extend substantially parallel to said camshaft.

7. The internal combustion engine of claim 3, wherein the other of said compression and vacuum release members comprises a pin extending through a throughbore in said camshaft, said pin abuttingly coupled to the other one of said flyweights.

8. The internal combustion engine of claim 7, wherein said throughbore extends at an angle with respect to a longitudinal axis of said camshaft.

9. The internal combustion engine of claim 7, wherein said pin comprises a shaft and a head, said head having a greater mass than said shaft.

10. The internal combustion engine of claim 1, further comprising a spring, said spring connecting said pair of flyweights and biasing said flyweights, and in turn, said compression and vacuum release members, toward said first position.

11. An internal combustion engine, comprising:
an engine housing;
a crankshaft rotatably supported within said engine housing;
a piston coupled to said crankshaft for reciprocation within a cylinder bore between top dead center and bottom dead center positions;
a combustion chamber defined between said piston and said engine housing, said combustion chamber having a relatively smaller volume when said piston is in said top dead center position and a relatively larger volume when said piston is in said bottom dead center position;
a camshaft driven from said crankshaft, said camshaft including a pair of cam lobes periodically engaging valve actuation structure associated with a pair of intake and exhaust valves; and a compression and vacuum release mechanism, comprising:
a flyweight movably mounted to said camshaft;
a shaft extending at an angle with respect to said camshaft and coupled with said flyweight; and
a compression release member and a vacuum release member respectively coupled to said flyweight, at least one of said compression and vacuum release members rotatable with said shaft, said compression release member including a compression release cam and said vacuum release member including a vacuum release cam;

said flyweight movable responsive to centrifugal forces between a first position corresponding to engine cranking speeds in which said compression and vacuum release cams are each positioned for operative engagement with said valve actuation structure and a second position corresponding to engine running speeds in which said compression and vacuum release cams are each positioned out of operative engagement with said valve actuation structure, and wherein in said first position, said compression release cam engages said valve actuation structure as said piston moves toward said top dead center position and said vacuum release cam engages said valve actuation structure as said piston moves toward said bottom dead center position.

12. The internal combustion engine of claim 11, wherein said camshaft includes a cam gear, said flyweight pivotally mounted to said cam gear.

13. The internal combustion engine of claim 11, wherein one of said compression and vacuum release members is integrally formed with said shaft.

14. The internal combustion engine of claim 13, wherein said flyweight is mechanically linked to said shaft, wherein pivotal movement of said flyweight is translated into rotational movement of said shaft.

15. The internal combustion engine of claim 13, wherein the other of said compression and vacuum release members comprises a pin extending through a throughbore in said camshaft, said pin abuttingly coupled to said flyweight.

16. The internal combustion engine of claim 15, wherein said throughbore extends through said camshaft at an angle with respect to a longitudinal axis of said camshaft.

17. The internal combustion engine of claim 15, wherein said pin comprises a shaft and a head, said head having a greater mass than said shaft.

18. The internal combustion engine of claim 13, wherein the other of said compression and vacuum release members is integrally formed with said shaft.

19. The internal combustion engine of claim 18, wherein said compression and vacuum release members each comprise a segment attached to a plate formed as part of said shaft, said segments including said compression and vacuum release cams.

20. The internal combustion engine of claim 11, further comprising a spring, said spring biasing said flyweight, and in turn, said compression and vacuum release members, toward said first position.

21. An internal combustion engine, comprising:
an engine housing;
a crankshaft rotatably supported within said engine housing;
a piston coupled to said crankshaft for reciprocation within a cylinder bore between top dead center and bottom dead center positions;

a combustion chamber defined between said piston and said engine housing, said combustion chamber having a relatively smaller volume when said piston is in said top dead center position and a relatively larger volume when said piston is in said bottom dead center position;

a camshaft driven from said crankshaft, said camshaft including a pair of cam lobes periodically engaging valve actuation structure associated with a pair of intake and exhaust valves; and a compression and vacuum release mechanism, comprising:

a flyweight movably mounted to said camshaft; and a compression release member and a vacuum release member respectively coupled to said flyweight, said compression release member comprising a pin extending at an angle with respect to said camshaft and abuttingly coupled with said flyweight, said vacuum release member comprising a pin extending at an angle with respect to said camshaft and abuttingly coupled with said flyweight, said compression release member including a compression release cam and said vacuum release member including a vacuum release cam;

said flyweight movable responsive to centrifugal forces between a first position corresponding to engine cranking speeds in which said compression and vacuum release cams are each positioned for operative engagement with said valve actuation structure and a second position corresponding to engine running speeds in which said compression and vacuum release cams are each positioned out of operative engagement with said valve actuation structure, and wherein in said first position, said compression release cam engages said valve actuation structure as said piston moves toward said top dead center position and said vacuum release cam engages said valve actuation structure as said piston moves toward said bottom dead center position.

* * * * *